(12) United States Patent
Sailer et al.

(10) Patent No.: US 8,894,031 B2
(45) Date of Patent: Nov. 25, 2014

(54) SEATING SYSTEM FOR A MOTOR VEHICLE

(75) Inventors: Michael Sailer, Whittier, CA (US);
Mark Kisiler, Torrance, CA (US);
Nathan G. Brown, Long Beach, CA (US); David A. Thompson, Bellefontaine, OH (US)

(73) Assignee: Honda Motor Co., Ltd., Tokyo (JP)

( * ) Notice: Subject to any disclaimer, the term of this patent is extended or adjusted under 35 U.S.C. 154(b) by 195 days.

(21) Appl. No.: 13/050,393

(22) Filed: Mar. 17, 2011

(65) Prior Publication Data

US 2012/0235006 A1    Sep. 20, 2012

(51) Int. Cl.
*F16M 13/00*    (2006.01)
*B60N 2/30*    (2006.01)
*B60N 2/06*    (2006.01)
*B60N 2/01*    (2006.01)

(52) U.S. Cl.
CPC ............ *B60N 2/3079* (2013.01); *B60N 2/3047* (2013.01); *B60N 2/06* (2013.01); *B60N 2/01* (2013.01)
USPC ........ 248/429; 248/424; 248/352; 296/65.11; 297/232

(58) Field of Classification Search
CPC ............................... F16M 13/00; B62D 39/00
USPC ................ 248/429, 424, 352, 430; 297/1, 15, 297/16.2, 232, 248, 311, 340, 344.1, 257; 296/63, 64, 65.01, 65.11, 69
See application file for complete search history.

(56) References Cited

U.S. PATENT DOCUMENTS

| 5,492,386 | A |   | 2/1996  | Callum |
|-----------|---|---|---------|--------|
| 5,605,368 | A | * | 2/1997  | Noma et al. .................... 296/64 |
| 5,868,451 | A | * | 2/1999  | Uno et al. ....................... 296/66 |
| 5,911,465 | A | * | 6/1999  | Yamamoto et al. ........ 296/65.03 |
| 5,947,541 | A | * | 9/1999  | Behrens et al. ................. 296/64 |
| 5,979,964 | A | * | 11/1999 | Ban et al. ........................ 296/66 |
| 6,129,405 | A |   | 10/2000 | Miyahara et al. |
| 6,231,101 | B1| * | 5/2001  | Kamida et al. .................. 296/63 |
| 6,299,120 | B1|   | 10/2001 | Girardi et al. |
| 6,406,084 | B1| * | 6/2002  | de Campos et al. ............ 296/66 |
| 6,457,765 | B1| * | 10/2002 | Bergquist et al. .............. 296/64 |
| 6,572,171 | B1|   | 6/2003  | Pautz et al. |
| 6,626,481 | B2| * | 9/2003  | Kawasaki .................. 296/65.01 |
| 6,629,721 | B1| * | 10/2003 | Macey ............................ 297/15 |
| 6,793,265 | B2| * | 9/2004  | Kamida et al. .................. 296/64 |
| 6,817,645 | B2|   | 11/2004 | Taguchi et al. |
| 6,820,911 | B2| * | 11/2004 | Furui ......................... 296/65.01 |
| 6,820,914 | B2| * | 11/2004 | Behrends et al. ............... 296/66 |
| 6,827,388 | B2| * | 12/2004 | Kayumi et al. .................. 296/64 |
| 6,869,138 | B2| * | 3/2005  | Rhodes et al. .................. 297/15 |

(Continued)

FOREIGN PATENT DOCUMENTS

JP    2007210477    8/2007

OTHER PUBLICATIONS

International Search Report and Written Opinion mailed Jun. 1, 2012 in International Application No. PCT/US2012/027817.

*Primary Examiner* — Terrell McKinnon
*Assistant Examiner* — Monica Millner
(74) *Attorney, Agent, or Firm* — Plumsea Law Group, LLC

(57) ABSTRACT

A seating system for a motor vehicle includes three sets of rails mounted to the floor of a motor vehicle. Each set of rails is configured to receive two seats that are capable of sliding in a longitudinal direction on the rails. The motor vehicle also includes storage spaces for storing the seats.

26 Claims, 43 Drawing Sheets

(56) References Cited

U.S. PATENT DOCUMENTS

| | | | |
|---|---|---|---|
| 6,955,386 B2 * | 10/2005 | Rhodes et al. | 296/65.09 |
| 6,962,384 B2 * | 11/2005 | Rhodes et al. | 296/66 |
| 6,997,498 B2 | 2/2006 | Oyama | |
| 7,040,685 B2 * | 5/2006 | Sumida et al. | 296/69 |
| 7,066,519 B2 * | 6/2006 | Rhodes et al. | 296/37.14 |
| 7,073,764 B2 * | 7/2006 | Matsushiro | 248/424 |
| 7,128,358 B2 * | 10/2006 | Perin | 296/65.09 |
| 7,152,900 B2 * | 12/2006 | Trombley et al. | 296/65.09 |
| 7,192,088 B1 * | 3/2007 | Trombley et al. | 297/335 |
| 7,380,859 B2 | 6/2008 | Gardiner | |
| 7,431,366 B2 * | 10/2008 | Sankrithi et al. | 296/26.01 |
| 7,431,372 B2 * | 10/2008 | Imamura et al. | 296/65.09 |
| 7,438,339 B2 * | 10/2008 | Abraham | 296/65.09 |
| 7,441,822 B1 * | 10/2008 | Day | 296/65.11 |
| 7,452,019 B1 * | 11/2008 | Day | 296/65.16 |
| 7,677,629 B2 * | 3/2010 | Akiya et al. | 296/64 |
| 7,686,367 B2 * | 3/2010 | Neale | 296/64 |
| 7,914,077 B2 * | 3/2011 | Linkner et al. | 297/331 |
| 7,954,872 B2 * | 6/2011 | Lindsay | 296/64 |
| 7,988,231 B2 * | 8/2011 | Phinney | 297/257 |
| 8,113,567 B2 * | 2/2012 | Yamashita et al. | 296/65.03 |
| 8,313,146 B2 * | 11/2012 | Wagner et al. | 297/378.1 |
| 2002/0021016 A1 | 2/2002 | Bergquist et al. | |
| 2002/0153740 A1 * | 10/2002 | Miyahara et al. | 296/64 |
| 2006/0175875 A1 * | 8/2006 | Syrowik et al. | 297/15 |
| 2006/0181113 A1 | 8/2006 | Perin | |
| 2007/0132266 A1 | 6/2007 | Ghergheli et al. | |
| 2008/0122279 A1 | 5/2008 | Park | |
| 2008/0284214 A1 | 11/2008 | Neale | |

\* cited by examiner

SEATING SYSTEM FOR A MOTOR VEHICLE

BACKGROUND

The present invention relates generally to a motor vehicle, and in particular to a seating system for a motor vehicle.

Seating systems for motor vehicles have been previously proposed. Some systems include seats that can be moved with respect to the floor of a motor vehicle. These systems include configurations for moving the seats in a longitudinal direction.

SUMMARY

In some embodiments, a motor vehicle includes an interior portion. The interior portion may be associated with different directions including a longitudinal direction extending from a forward portion to a rearward portion of the motor vehicle and a lateral direction extending from a first side portion to a second side portion of the motor vehicle. In some cases, the interior portion includes a first set of rails mounted to a floor of the motor vehicle and generally extending in the longitudinal direction. In some cases, the interior portion may also include a second set of rails mounted to the floor and generally extending in the longitudinal direction. In some cases, the first set of rails is configured to accommodate a first seat such that the first seat can be moved in the longitudinal direction along the first set of rails. In some cases, the first set of rails may be configured to accommodate a second seat such that the second seat can be moved in the longitudinal direction along the first set of rails. In some cases, the second set of rails may be configured to accommodate a third seat such that the third seat can be moved in the longitudinal direction along the second set of rails. In some cases, the second set of rails may be configured to accommodate a fourth seat such that the fourth seat can be moved in the longitudinal direction along the second set of rails. In some embodiments, the motor vehicle can include a first storage space disposed within the floor and rearwardly of the first set of rails as well as a second storage space disposed within the floor and rearwardly of the second set of rails. In some cases, the second seat has a stored position where the second seat is disposed in the first storage space and the fourth seat having a stored position where the fourth seat is disposed in the second storage space. In some cases, the second seat has a deployed position where the second seat is mounted to the first set of rails and the fourth seat having a deployed position where the fourth seat is mounted to the second set of rails. In some cases, the second seat can be disposed in the stored position in the first storage space while the fourth seat is disposed in the deployed position on the second set of rails.

In some embodiments, a motor vehicle includes an interior portion. The interior portion may be associated with different directions including a longitudinal direction extending from a forward portion to a rearward portion of the motor vehicle and a lateral direction extending from first side portion to a second side portion of the motor vehicle. In some cases, the interior portion includes a first set of rails mounted to a floor of the motor vehicle and generally extending in the longitudinal direction. In some cases, the interior portion can also include a second set of rails mounted to the floor and generally extending in the longitudinal direction. In some cases, the interior portion includes a third set of rails mounted to the floor and generally extending in the longitudinal direction. In some cases, the first set of rails may be configured to accommodate a first seat such that the first seat can be moved in the longitudinal direction along the first set of rails. Also, in some cases, the first set of rails may be configured to accommodate a second seat such that the second seat can be moved in the longitudinal direction along the first set of rails. In some cases, the second set of rails may be configured to accommodate a third seat such that the third seat can be moved in the longitudinal direction along the second set of rails. In some cases, the second set of rails may be configured to accommodate a fourth seat such that the fourth seat can be moved in the longitudinal direction along the second set of rails. In some cases, the third set of rails may be configured to accommodate a fifth seat such that the fifth seat can be moved in the longitudinal direction along the third set of rails. In some cases, the third set of rails may be configured to accommodate a sixth seat such that the sixth seat can be moved in the longitudinal direction along the third set of rails. In some cases, any one seat is configured to move independently from any other seat.

In some embodiments, a motor vehicle includes an interior portion, where the interior portion is associated with a longitudinal direction extending from a forward portion to a rearward portion of the motor vehicle and a lateral direction extending from first side portion to a second side portion of the motor vehicle. In some cases, the interior portion includes a first set of rails mounted to a floor of the motor vehicle and generally extending in the longitudinal direction. In some cases, the interior portion includes a second set of rails mounted to the floor and generally extending in the longitudinal direction. In some cases, the interior portion includes a third set of rails mounted to the floor and generally extending in the longitudinal direction. In some cases, the first set of rails may be configured to accommodate a first seat such that the first seat can be moved in the longitudinal direction along the first set of rails. In some cases, the first set of rails may be configured to accommodate a second seat such that the second seat can be moved in the longitudinal direction along the first set of rails. In some cases, the second set of rails may be configured to accommodate a third seat such that the third seat can be moved in the longitudinal direction along the second set of rails. In some cases, the second set of rails may be configured to accommodate a fourth seat such that the fourth seat can be moved in the longitudinal direction along the second set of rails. In some cases, the third set of rails may be configured to accommodate a fifth seat such that the fifth seat can be moved in the longitudinal direction along the third set of rails. In some cases, the third set of rails may be configured to accommodate a sixth seat such that the sixth seat can be moved in the longitudinal direction along the third set of rails. In some cases, the first seat and the second seat can be moved to any position along the first set of rails. Also, the third seat and the fourth seat can be moved to any position along the second set of rails. Also, the fifth seat and the sixth seat can be moved to any position along the third set of rails.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
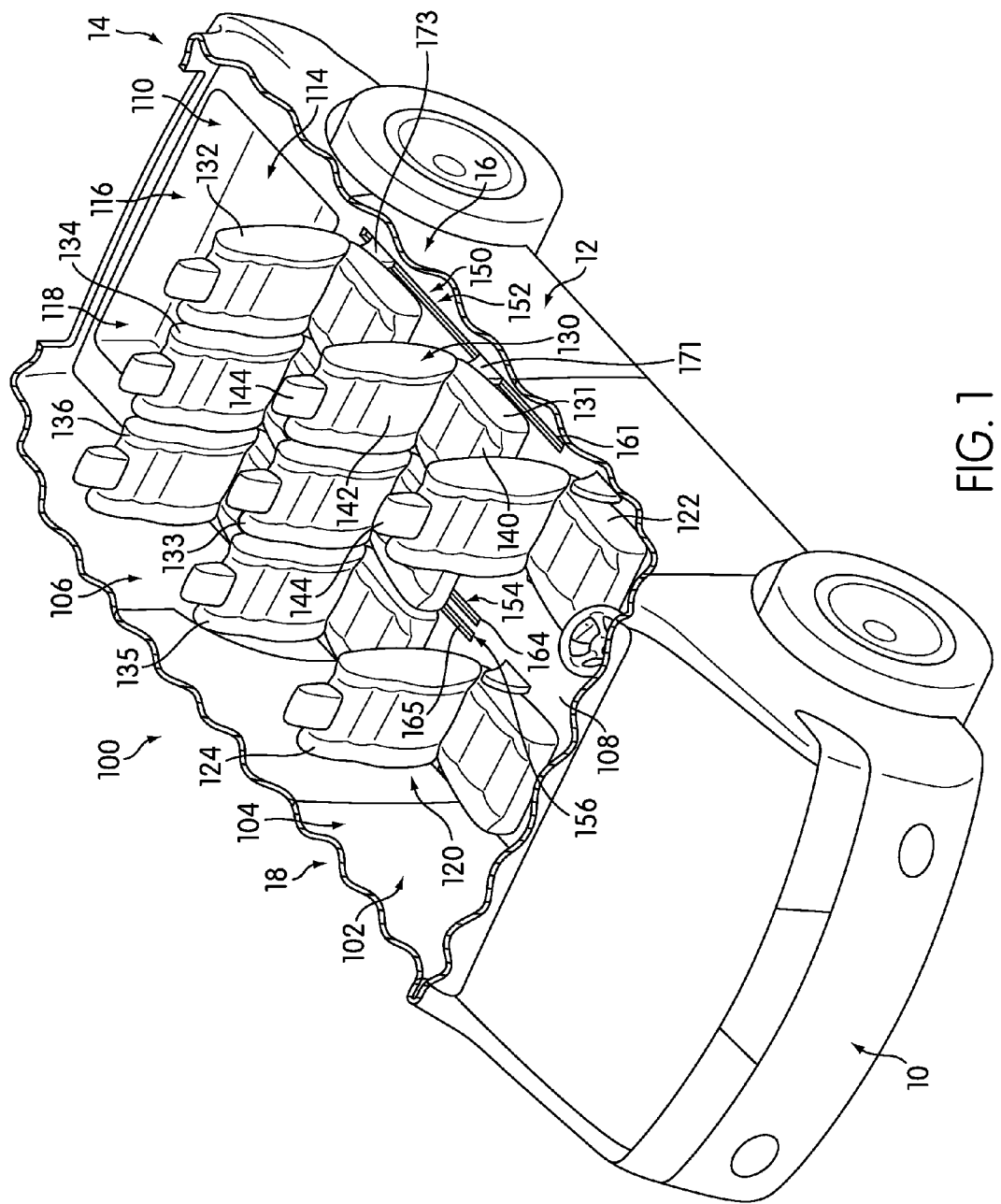
FIG. 1 is a front isometric view of an embodiment of a motor vehicle including a vehicle seating system.
Figure 2:
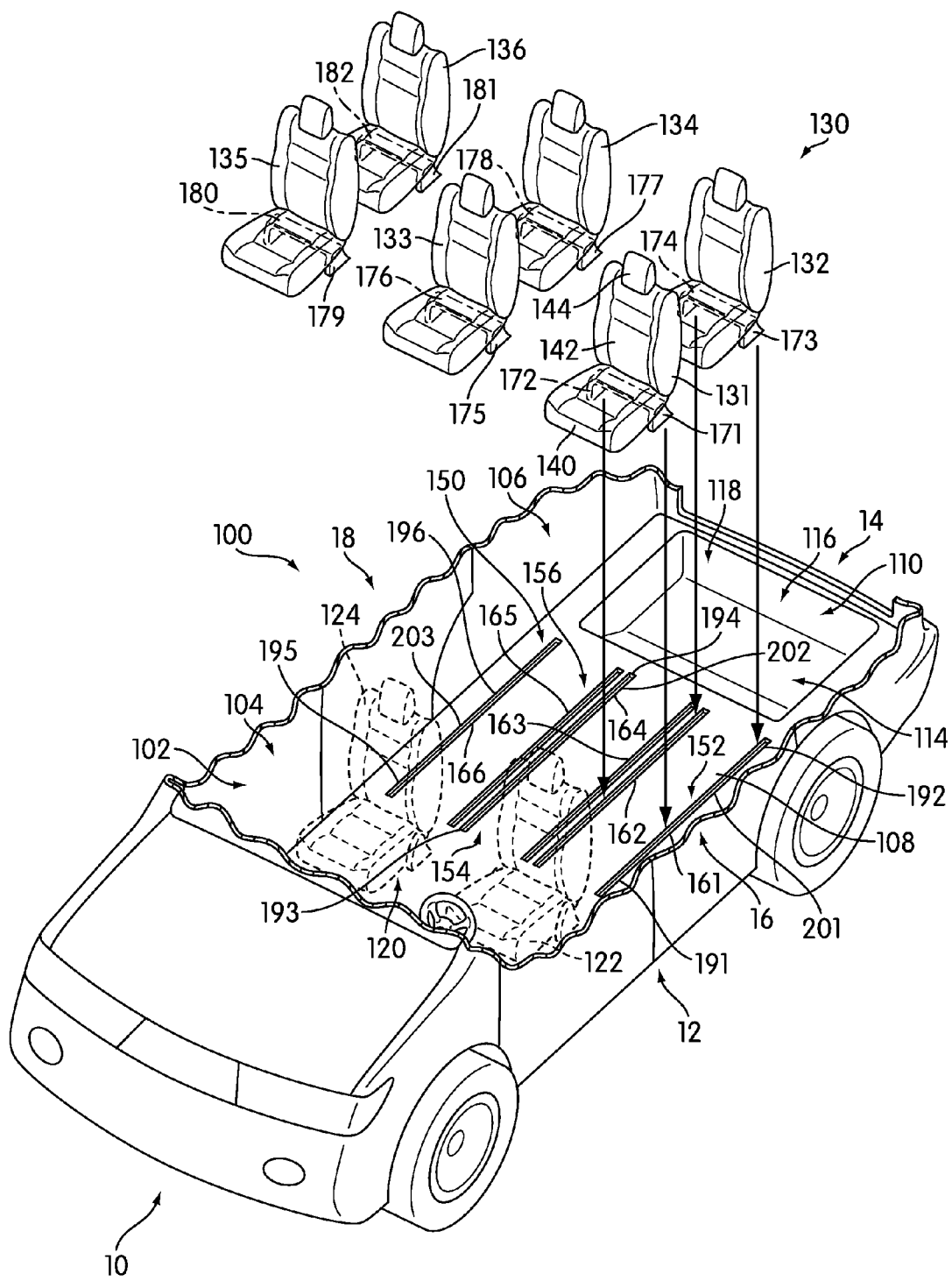
FIG. 2 is an exploded isometric view of the vehicle seating system of FIG. 1.

FIGS. 1 and 2 illustrate a schematic view of a motor vehicle 100 according to a first embodiment of the invention. The term "motor vehicle" as used throughout this detailed description and in the claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drive train is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

Referring to FIGS. 1 and 2, motor vehicle 100 can include forward portion 10, rearward portion 14 and intermediate portion 12 that is disposed between forward portion 10 and rearward portion 14. In addition, motor vehicle 100 can include first side portion 16 and second side portion 18.

For consistency and convenience, directional adjectives are employed throughout this detailed description corresponding to the illustrated embodiments. The term "longitudinal" as used throughout this detailed description and in the claims refers to a direction extending along a length of a motor vehicle. In the current embodiment, the longitudinal direction may extend from forward portion 10 to rearward portion 14 of motor vehicle 100. Also, the term "lateral" as used throughout this detailed description and in the claims refers to a direction extending a width of the motor vehicle. In the current embodiment, the lateral direction may extend from first side portion 16 to second side portion 18 of motor vehicle 100. Furthermore, in some cases the term "vertical" as used throughout this detailed description and in the claims refers to a direction that is generally perpendicular to the lateral direction and the longitudinal direction. In some cases, the vertical direction may extend from a bottom side of a motor vehicle to a top side or roof of the motor vehicle.

Referring to FIGS. 1 and 2, motor vehicle 100 can include interior portion 102 for receiving one or more occupants. Interior portion 102 may further comprise forward interior portion 104 and rearward interior portion 106. Interior portion 102 may also include floor 108 that extends throughout the entirety of interior portion 102 and bounds interior portion 102 from below.

In some embodiments, motor vehicle 100 can include vehicle seating system 120. Vehicle seating system 120 may comprise driver seat 122 as well as front passenger seat 124 that are disposed within forward interior portion 104. In addition, vehicle seating system 120 may comprise plurality of rear seats 130 disposed within rearward interior portion 106. In different embodiments, plurality of rear seats 130 can comprise different numbers of seats. In some cases, plurality of rear seats 130 may comprise two or more seats. In some cases, plurality of rear seats 130 can include four or more seats. Furthermore, plurality of rear seats 130 can include an even number of seats in some embodiments, while other embodiments may include an odd number of seats. In an exemplary embodiment, plurality of rear seats 130 may include six seats. In particular, in the current embodiment, plurality of rear seats 130 includes first seat 131, second seat 132, third seat 133, fourth seat 134, fifth seat 135 and sixth seat 136.

Generally, any types of vehicle seats known in the art can be used with vehicle seating system 120. In some embodiments, each seat of vehicle seating system 120 may be provided with a seat cushion and a seat back for supporting an occupant. As an example, in the current embodiment, first seat 131 comprises seat cushion 140 and seat back 142. In a similar manner, each of the remaining seats of vehicle seating system 120 may be provided with substantially similar seat cushions and seat backs. In other embodiments, seat backs could be optional for one or more seats of vehicle seating system 120. In the current embodiment, each seat of vehicle seating system 120 is shown with a headrest. For example, first seat 131 comprises head rest 144. In a similar manner, each of the remaining seats of vehicle seating system 120 may be provided with substantially similar head rests. However, in other embodiments, only some seats of vehicle seating system 120 may include head rests. In still other embodiments, no seats of vehicle seating system 120 may include head rests. It will be understood that only some possible features of a vehicle seat are illustrated in the current embodiment. In other embodiments, for example, one or more seats of vehicle seating system 120 could be provided with armrests.

In some embodiments, the relative positions of seat cushions and seat backs could be adjustable. For example, in one embodiment, seat back 142 of first seat 131 may be adjustable with respect to seat cushion 140. In some cases, seat back 142 could be configured to recline with respect to seat cushion 140. In some cases, seat back 142 could be configured to tilt forwards with respect to seat cushion 140. In addition, in some cases, seat cushion 140 could be configured to fold upwardly so that both seat cushion 140 and seat back 142 are disposed against one another in an approximately parallel manner. In a similar manner, the seat backs and seat cushions of the remaining seats of vehicle seating system 120 may be similarly adjusted with respect to one another. Some examples of this type of adjustment are discussed in detail below. In some cases, provisions for adjusting seat cushions and/or seat backs could be associated with one or more seats. Examples of various provisions for adjusting seat cushions and/or seat backs include, but are not limited to, mechanical levers and knobs, as well as electric buttons.

In different embodiments, the sizes of one or more seats can be varied. In the current embodiment, the widths of each seat of plurality of rear seats 130 are selected so that three seats can be placed in one or more rows within interior portion 102. In this case, the widths of each seat may be selected so that first seat 131, third seat 133 and fifth seat 135 may fit in a single row between first side portion 16 and second side portion 18. Likewise, the widths of each seat may be selected so that second seat 132, fourth seat 134 and sixth seat 136 may fit in a single row between first side portion 16 and second side portion 18. Similarly, the vertical heights of each seat could be varied in different embodiments. Although the current embodiment illustrates seats of a substantially similar width and height, in other embodiments the widths and/or heights of different seats could vary.

For purposes of convenience and clarity, various seats may be referred to as corresponding to various rows. For example, in some cases, first seat 131, third seat 133 and fifth seat 135 may correspond to a second or middle row while second seat 132, fourth seat 134 and sixth seat 136 may correspond to a third or rear row. However, it should be understood that these designations are only intended to indicate possible locations for each of the seats. In particular, as the longitudinal locations of each seat can be changed, the seats may move to any positions, only some of which may correspond to their original designations as second row or third row seats.

Motor vehicle 100 can include storage region 110. In some embodiments, storage region 110 may be disposed within floor 108. In some cases, storage region 110 may extend below floor 108. For example, in the current embodiment, storage region 110 is associated with depth D1 that extends from floor 108 to lower portion 112 of storage region 110 (see FIG. 3).

Generally, storage region 110 can be used for storing any items. In some cases, storage region 110 could be used for storing one or more seats of vehicle seating system 120. In an exemplary embodiment, storage region 110 may be configured to store at least three seats of plurality of rear seats 130 as discussed in further detail below. In addition, storage region 110 may comprise a single storage space or two or more storage spaces. In the current embodiment, storage region 110 comprises three storage spaces that are continuous with one another. In this embodiment, storage region 110 comprises first storage space 114, second storage space 116 and third storage space 118 that are each sized and configured to fit a seat. In other embodiments, however, storage region 110 could comprise three distinct storage spaces that are separated.

First storage space 114, second storage space 116 and third storage space 118 can be covered or uncovered storage spaces. Although the current embodiment does not include covers, in other embodiments one or more storage spaces could be covered. For example, in another embodiment, one or more storage spaces could be covered with one or more lids.

A motor vehicle can include provisions to increase the number of different seating configurations that may be achieved using a vehicle seating system. In some embodiments, one or more seats can be slidably mounted to rails. In an exemplary embodiment, each seat of a plurality of rear seats can be individually mounted to a set of rails that extend longitudinally throughout a rear interior portion of the motor vehicle.

Motor vehicle 100 can include rail system 150. Rail system 150 may comprise one or more rails that are fixedly mounted to floor 108 of interior portion 102. In different embodiments, rail system can include differing numbers of rails. For example, in some cases, only two rails could be used. In other cases, four or more rails could be used. In still other cases, six or more rails could be used. Moreover, in some cases, an even number of rails could be used while in other cases an odd number of rails could be used. In an exemplary embodiment, rail system 150 can comprise three sets of rails including first set of rails 152, second set of rails 154 and third set of rails 156. In this case, each set of rails further comprises a first rail and a second rail. In this case, first set of rails 152 includes first rail 161 and second rail 162. Second set of rails 154 includes third rail 163 and fourth rail 164. Third set of rails 156 includes fifth rail 165 and sixth rail 166.

Any rails known in the art for use with vehicle seats can be used. In some cases, rails could be mounted to a top surface of a floor of a motor vehicle. In other cases, rails could be integrated into the floor of a motor vehicle. For example, in one embodiment, rails could comprise channels or grooves embedded into the floor of a motor vehicle, rather than rails that are raised above the floor of a motor vehicle, to prevent interference between the rails and any other objects on the floor of the motor vehicle.

In different embodiments, the configuration of rail system 150 could vary. In some cases, rail system 150 may include rails that extend in a generally lateral direction. In other cases, rail system 150 may include rails that extend in a generally longitudinal direction. In still other cases, rail system 150 may include rails that extend in a generally diagonal direction between the lateral direction and the longitudinal direction. In an exemplary embodiment, rail system 150 extends in a substantially longitudinal direction. Furthermore, rail system 150 may extend a substantial majority of the length of rearward interior portion 106. In the current embodiment, rail system 150 may extend from forward interior portion 104 to storage region 110. In particular, forward portion 191 of first set of rails 152 is disposed adjacent to forward interior portion 104, which includes driver seat 122 and front passenger seat 124. Also, rearward portion 192 of first set of rails 152 is disposed adjacent to storage region 110. Furthermore, intermediate portion 201 of first set of rails 152 may be disposed between forward portion 191 and rearward portion 192. In a similar manner, second set of rails 154 and third set of rails 156 both include forward portions disposed adjacent to forward interior portion 104 and rearward portions disposed adjacent to storage region 110. In this case, second set of rails 154 may include forward portion 193, rearward portion 194 and intermediate portion 202 that is disposed between forward portion 193 and rearward portion 194. Also, third set of rails 156 may include forward portion 195 and rearward portion 196 as well as intermediate portion 203 that is disposed between forward portion 195 and rearward portion 196.

Rail system 150 may be configured to receive plurality of rear seats 130. In this case, first rail set 152 may be configured to receive first seat 131 and second seat 132. In particular, first seat 131 and second seat 132 may be mounted to first rail set 152 in a manner that allows first seat 131 and second seat 132 to slide on first rail set 152. Second rail set 154 may be configured to receive third seat 133 and fourth seat 134. In particular, third seat 133 and fourth seat 134 may be mounted to second rail set 154 in a manner that allows third seat 133 and fourth seat 134 to slide on second rail set 154. Third rail set 156 may be configured to receive fifth seat 135 and sixth seat 136. In particular, fifth seat 135 and sixth seat 136 may be mounted to third rail set 156 in a manner that allows fifth seat 135 and sixth seat 136 to move on third rail set 156.

In different embodiments, plurality of rear seats 130 could be mounted to rail system 150 in various manners. In some embodiments, seats of plurality of rear seats 130 could be mounted to rail system 150 in a detachable manner. In other embodiments, plurality of rear seats 130 could be mounted to rail system 150 in a substantially permanent manner. In an exemplary embodiment, plurality of rear seats 130 may be mounted to rail system 150 in a detachable manner that allows each seat of plurality of rear seats 130 to be removed from a corresponding set of rails of rail system 150.

Plurality of rear seats 130 can be configured with one or more sliding mounting portions that attach to rails of rail system 150. The term "sliding mounting portion" as used throughout this detailed description and in the claims refers to any device, component or system for removably attaching a seat to a set of rails in a manner that allows the seat to be slidably mounted to the set of rails. In the current embodiment, first seat 131 may include first sliding mounting portion 171 and second sliding mounting portion 172 for attaching to first rail 161 and second rail 162, respectively. Second seat 132 may include third sliding mounting portion 173 and fourth sliding mounting portion 174 for attaching to first rail 161 and second rail 162, respectively. In a similar manner, third seat 133 may include fifth sliding mounting portion 175 and sixth sliding mounting portion 176 for attaching to third rail 163 and fourth rail 164, respectively. Likewise, fourth seat 134 may include seventh sliding mounting portion 177 and eighth sliding mounting portion 178 for attaching to third rail 163 and fourth rail 164, respectively. Furthermore, fifth seat 135 may include ninth sliding mounting portion 179 and tenth sliding mounting portion 180 for attaching to fifth rail 165 and sixth rail 166, respectively. Finally, sixth seat 136 may include eleventh sliding mounting portion 181 and twelfth sliding mounting portion 182 for attaching to fifth rail 165 and sixth rail 166. With this arrangement, each seat of plurality of rear seats 130 may be mounted to a set of rails in a manner that allows each seat to slide in a generally longitudinal direction throughout rearward interior portion 106. It will be understood that any devices, components or systems for coupling a seat to one or more rails in a manner that allows the seat to slide along the rails can be used.

In some embodiments, the seats of vehicle seating system 120 may be interchangeable so that different seats can be mounted to different sets of rails. For example, in one embodiment, first seat 131 may be mounted to first set of rails 152 or second set of rails 154 or third set of rails 156. In other words, first seat 131 is not restricted to use with a particular set of rails. In a similar manner, second seat 132, third seat 133, fourth seat 134, fifth seat 135 and sixth seat 136 can also be mounted to any of first set of rails 152, second set of rails 154 or third set of rails 156. In other embodiments, however, each seat may be configured to mount to a particular set of rails and may not be interchanged with any other seats.

Generally, driver seat 122 and front passenger seat 124 may be attached to floor 108 in any manner. In some cases, driver seat 122 and front passenger seat 124 may be fixedly mounted to floor 108. In other cases, driver seat 122 and front passenger seat 124 could be mounted to additional sets of rails disposed within forward interior portion 104 of motor vehicle 100. In still other cases, driver seat 122 and front passenger seat 124 could be mounted to rail system 150. For example, in an alternative embodiment, driver seat 122 may be mounted to first set of rails 152, which may extend into forward interior portion 104. Also, in an alternative embodiment, front passenger seat 124 may be mounted to third set of rails 156, which may extend into forward interior portion 104.

Figure 3:
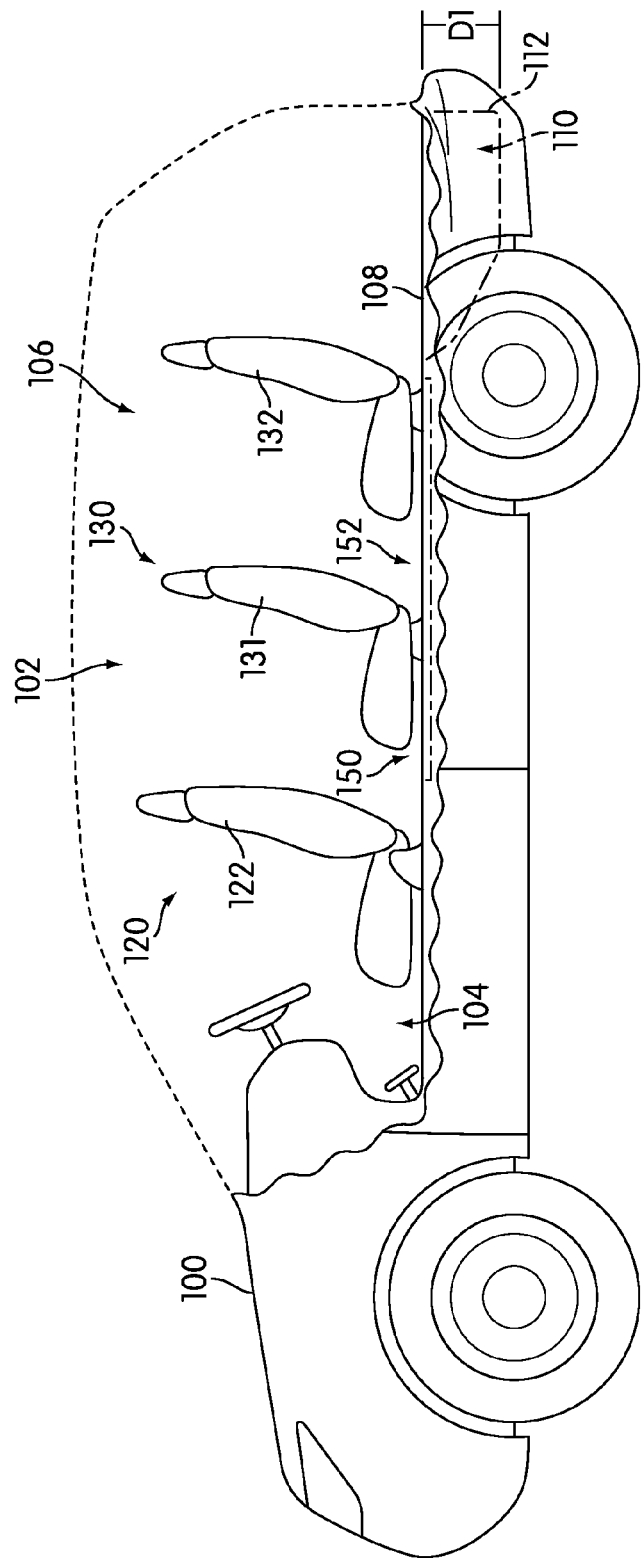
FIG. 3 is a side view of an embodiment of a motor vehicle including a vehicle seating system.

FIG. 3 is a side view of an embodiment of motor vehicle 100. Referring to FIG. 3, floor 108 may have a substantially planar configuration. In other words, floor 108 may be substantially flat throughout interior portion 102. In particular, in some cases, floor portion 108 may be substantially flat throughout rearward interior portion 106. Furthermore, rail system 150 may have a substantially flat or planar configuration that extends continuously over floor 108. This arrangement allows seats of plurality of rear seats 130 to move between the end portions of rail system 150. For example, in the current embodiment, first seat 131 and second seat 132 may be configured to move along the entire length of first set of rails 152. In a similar manner, third seat 133 and fourth seat 134 (see FIGS. 1 and 2) may be configured to move along the entire length of second set of rails 154. Also, fifth seat 135 and sixth seat 136 may be configured to move along the entire length of third set of rails 156. This arrangement improves the number of available seating configurations over systems that use multiple rails over floors of varying heights.

Each seat of plurality of rear seats 130 may be configured in a locked state or a sliding state. In the locked state, a seat may be configured to maintain a fixed position with respect to a corresponding set of rails. In other words, in the locked state a seat may not slide. In the sliding state, a seat may be configured to slide along a set of rails in order to adjust the location of the seat in the longitudinal direction. In different embodiments, a seat can be operated in the locked state or the sliding state using any known provisions. For example, in some cases, a user may pull a lever associated with one or more sliding mounting portions that allows the sliding mounting portions of a seat to slide on a set of rails. In other cases, a user may press a button that operates a motor in one or more sliding mounting portions for automatically sliding the seat along a set of rails. In still other cases, any other provisions can be used for operating a seat in a locked state, in which the position of the seat is temporarily fixed, and a sliding state, in which the position of the seat can be adjusted along a set of rails.

Figure 4:
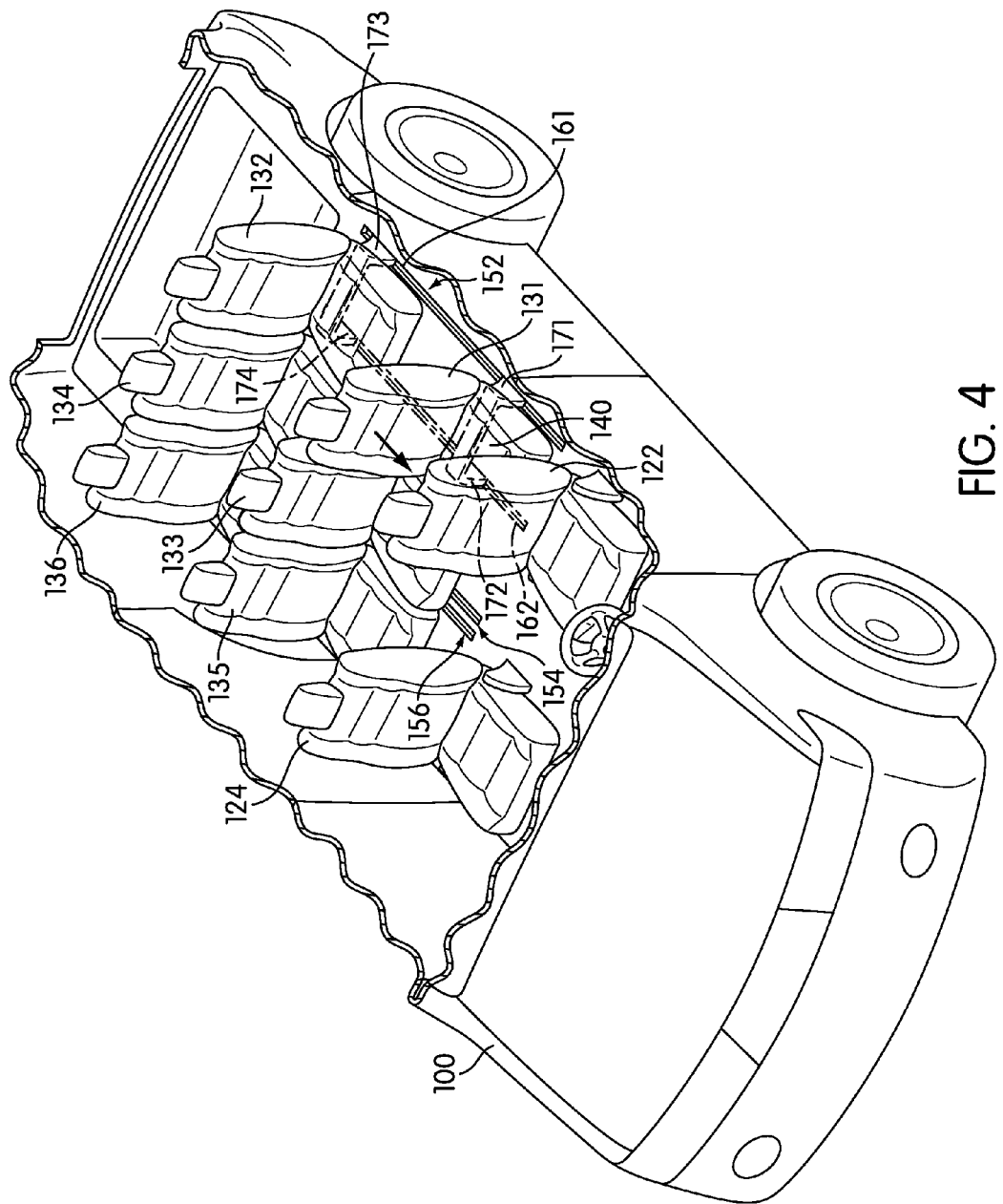
FIG. 4 is a front isometric view of the vehicle seating system of FIG. 1 shown with a second row seat slid forwardly.
Figure 5:
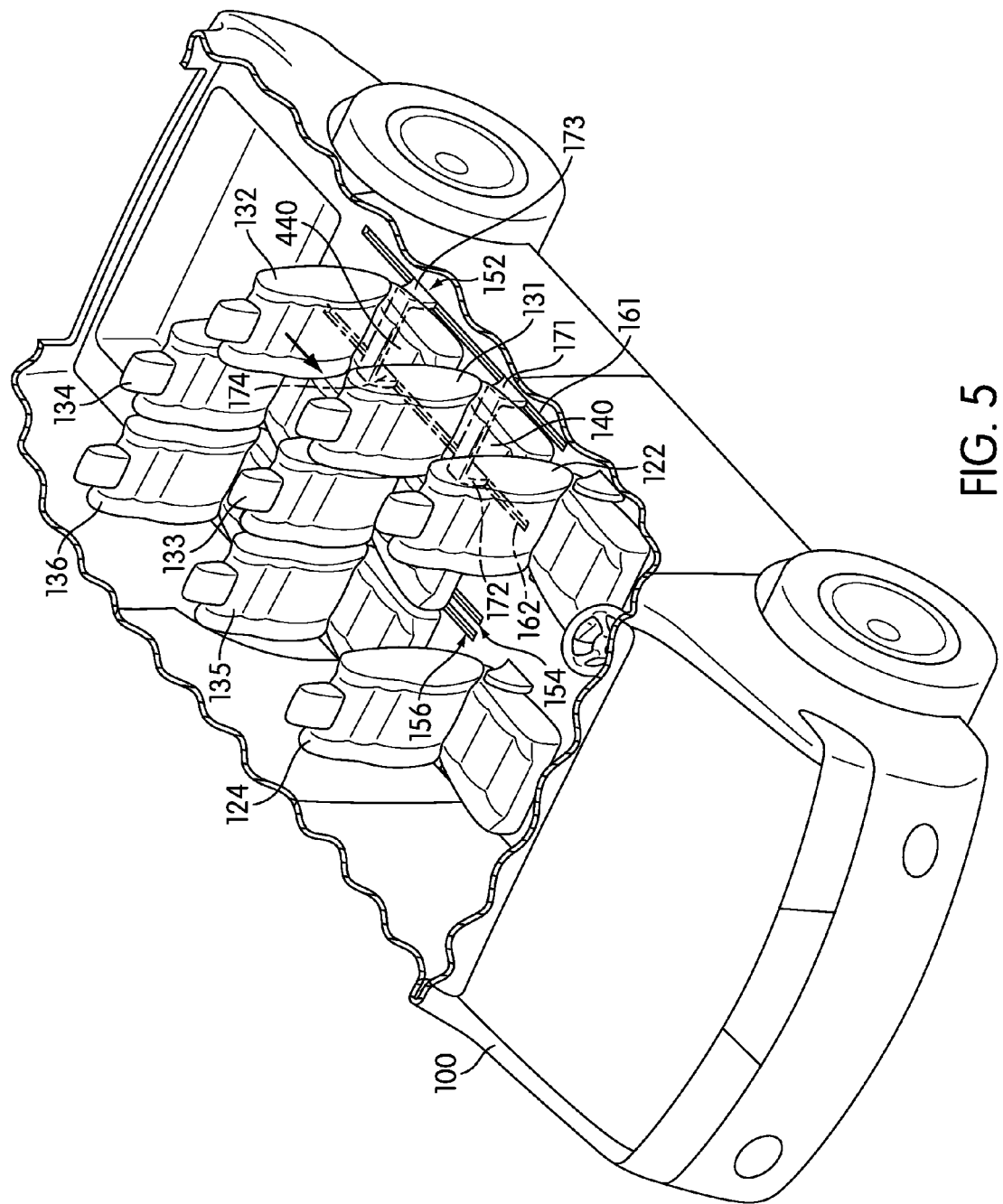
FIG. 5 is a front isometric view of the vehicle seating system of FIG. 1 shown with a second row seat and a third row seat slid forwardly.

FIGS. 4 and 5 illustrate an embodiment of the independent maneuverability of first seat 131 and second seat 132 on first set of rails 152. Referring to FIG. 4, first seat 131 may be moved forwards along first set of rails 152 towards driver seat 122. In particular, first sliding mounting portion 171 and second sliding mounting portion 172 may slide along first rail 161 and second rail 162, respectively. First seat 131 may be moved to any portion of first set of rails 152. In the exemplary embodiment, first seat 131 is moved to a position in which seat cushion 140 is disposed adjacent to driver seat 122. Furthermore, first seat 131 may be moved independently of third seat 133, which was originally adjacent to first seat 131. In order to move first seat 131 on first set of rails 152, first seat 131 may be placed in a sliding state. This can be accomplished by pulling a lever, using a button or with any other known provisions for putting a seat into a sliding state. After first seat 131 has been moved to the desired position, first seat 131 may be placed in a locked state to prevent first seat 131 from sliding along first set of rails 152 unintentionally.

Referring now to FIG. 5, second seat 132 may be moved forwards along first set of rails 152 as well. In particular, third sliding mounting portion 173 and fourth sliding mounting portion 174 may slide alone first rail 161 and second rail 162. In the exemplary embodiment, second seat 132 is moved to a position in which seat cushion 440 of second seat 132 is disposed adjacent to first seat 131. Furthermore, second seat 132 may be moved independently of fourth seat 134, which was originally adjacent to second seat 132. In order to move second seat 132 on first set of rails 152, second seat 132 may be placed in a sliding state. This can be accomplished by pulling a lever, using a button or with any other known provisions for putting a seat into a sliding state. After second seat 132 has been moved to the desired position, second seat 132 may be placed in a locked state to prevent second seat 132 from sliding along first set of rails 152 unintentionally.

In a similar manner to first seat 131 and second seat 132, the remaining seats of plurality of rear seats 130 may be translated to any positions along the corresponding sets of rails. In particular, third seat 133 and fourth seat 134 may be moved to any positions along second set of rails 154. Also, fifth seat 135 and sixth seat 136 may be moved to any positions along third set of rails 156. Furthermore, by providing seats on three distinct sets of rails, any two seats can be moved independently of one another by sliding the seat along the respective set of rails in the longitudinal direction. For example, in the current embodiment, each seat of plurality of rear seats 130 can moved independently of every other seat. This arrangement provides for an increased number of seating configurations over previous designs. In particular, this arrangement increases the number of available six seat configurations behind the driver seat and front passenger seat of a motor vehicle.

It will be understood that the possible positions for first seat 131 in the current seating configuration are restricted by the presence of second seat 132 on first set of rails 152. In other words, first seat 131 may move to any position on first set of rails 152 that is forward of second seat 132. Similarly, second seat 132 may move to any position on first set of rails 152 that is rearward of first seat 131. Likewise, the possible positions for third seat 133 in the current seating configuration are restricted by the presence of fourth seat 134 on second set of rails 154. In other words, third seat 133 may move to any position on second set of rails 154 that is forward of fourth seat 134. Also, fourth seat 134 may move to any position on second set of rails 154 that is rearward of third seat 133. In a similar manner, the possible positions for fifth seat 135 in the current seating configuration are restricted by the presence of sixth seat 136 on third set of rails 156. In other words, fifth seat 135 may move to any position on third set of rails 156 that is forward of sixth seat 136. Also, sixth seat 136 may move to any position on third set of rails 156 that is rearward of fifth seat 135. In other vehicle seating configurations, however, one or more seats may be removed from rail system 150 which may increase the available positions to one or more seats, as discussed in further detail below. In such cases, one or more seats may be configured to move to any position on a corresponding set of rails.

Vehicle seating system 120 can include provisions for increasing the amount of space available within rearward interior portion 106 of motor vehicle 100. In some embodiments, one or more seats of vehicle seating system 120 can be stored within storage region 110. In an exemplary embodiment, seats of vehicle seating system 120 can be independently stored within storage region 110 to provide maximum versatility in the seating configurations for motor vehicle 100.

Seats of vehicle seating system 120 may be disposed in various positions including a deployed position and a stored position. The term "deployed position" as used throughout this detailed description and in the claims refers to any position in which a seat is mounted to a set of rails. In other words, the deployed position is a position of the seat in which the seat may be used by an occupant. In contrast, the term "stored position" as used throughout this detailed description and in the claims refers to any position where a seat is disposed in a storage space. Additionally, in some cases, a seat can be configured in a folded deployed position. The term "folded deployed position" as used throughout this detailed description and in the claims refers to a position in which a seat cushion of the seat is folded upwardly against a seat back of the seat. In the folded deployed position, the seat may also be mounted to a set of rails. This is in contrast to the stored position, in which a seat may be folded and stored inside a storage space.

Figure 6:
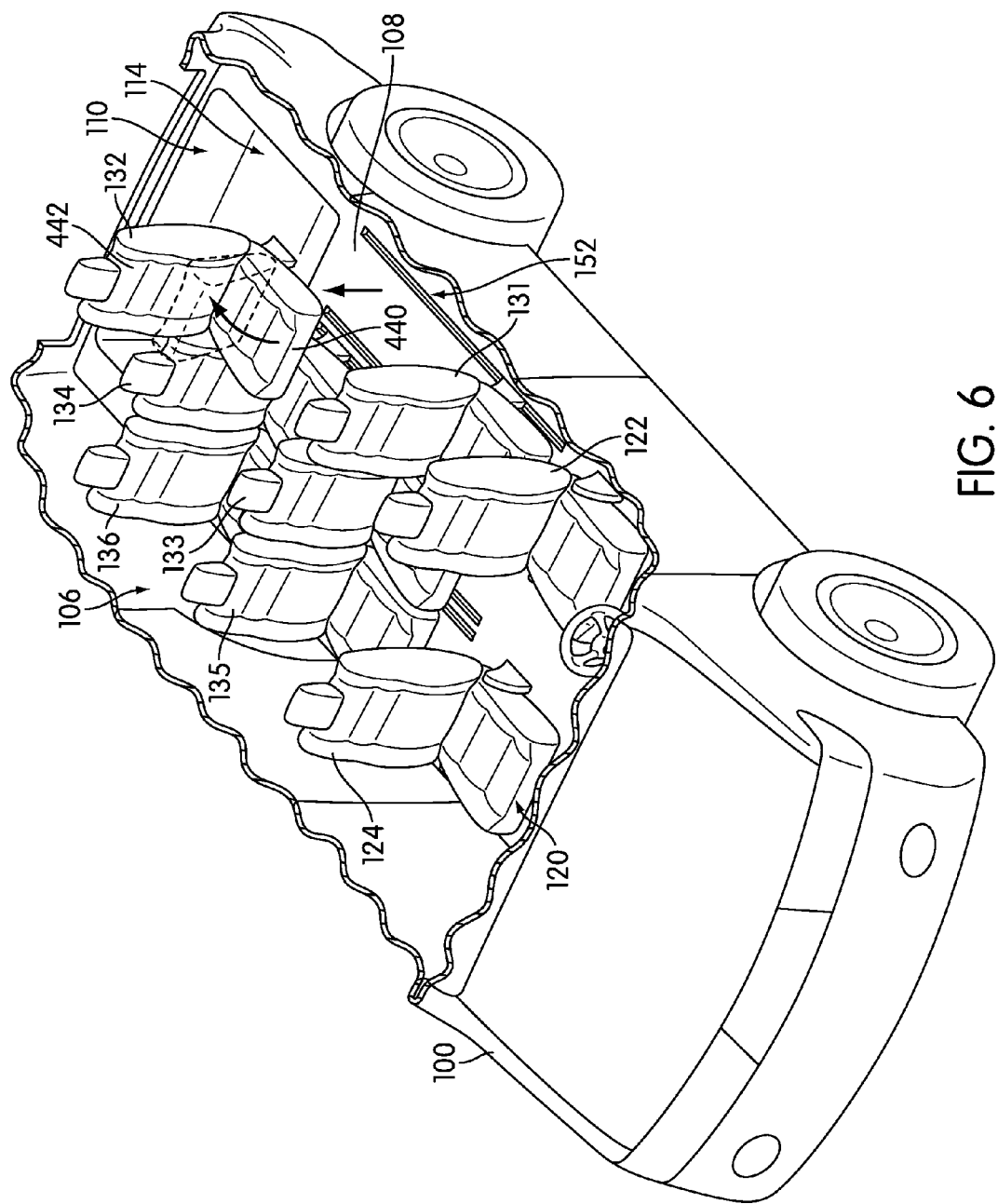
FIG. 6 is a front isometric view of the vehicle seating system of FIG. 1 with a third row seat being removed from a set of rails.
Figure 7:
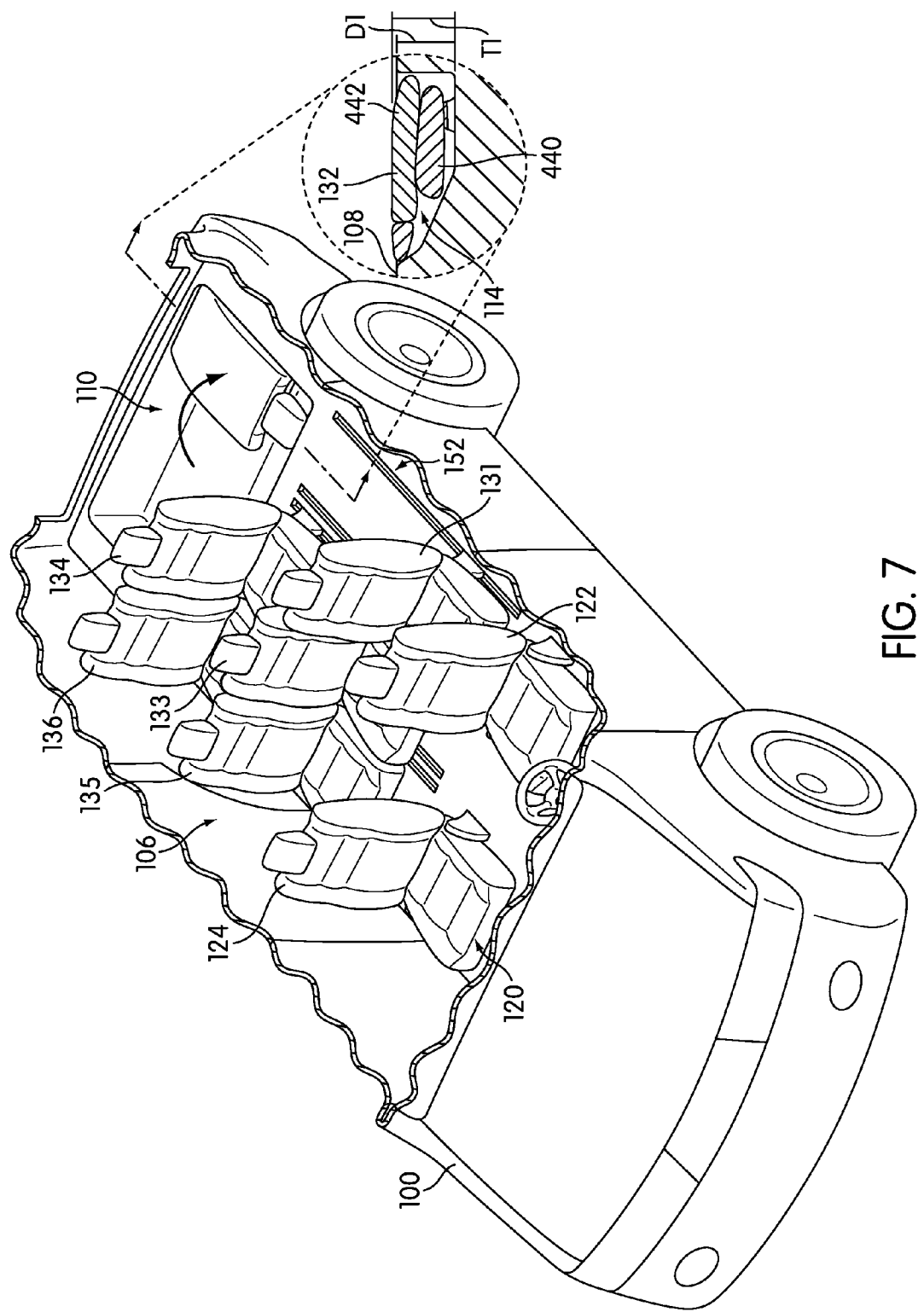
FIG. 7 is a front isometric view of the vehicle seating system of FIG. 1 with a third row seat being placed in a stored position.

Referring to FIGS. 6 and 7, second seat 132 may be stored within first storage space 114 of storage region 110 in order to increase the available floor space within rearward interior portion 106. Initially, second seat 132 can be removed from first set of rails 152. Then, seat cushion 440 of second seat 132 may be folded against seat back 442 of second seat 132. Finally, as seen in FIG. 7, second seat 132 may be placed within first storage space 114 of storage region 110. In an exemplary embodiment, second seat 132 may be configured so that seat back 442 is substantially flush with floor 108 when second seat 132 is disposed within first storage space 114. In particular, second seat 132 may have a maximum thickness T1 in the folded position that is substantially less than or equal to depth D1 of storage region 110. In other embodiments, however, seat back 442 may not be flush with floor 108 and instead may extend vertically higher than floor 108. In still other embodiments, seat back 442 may be disposed below floor 108 in the vertical direction.

Figure 8:
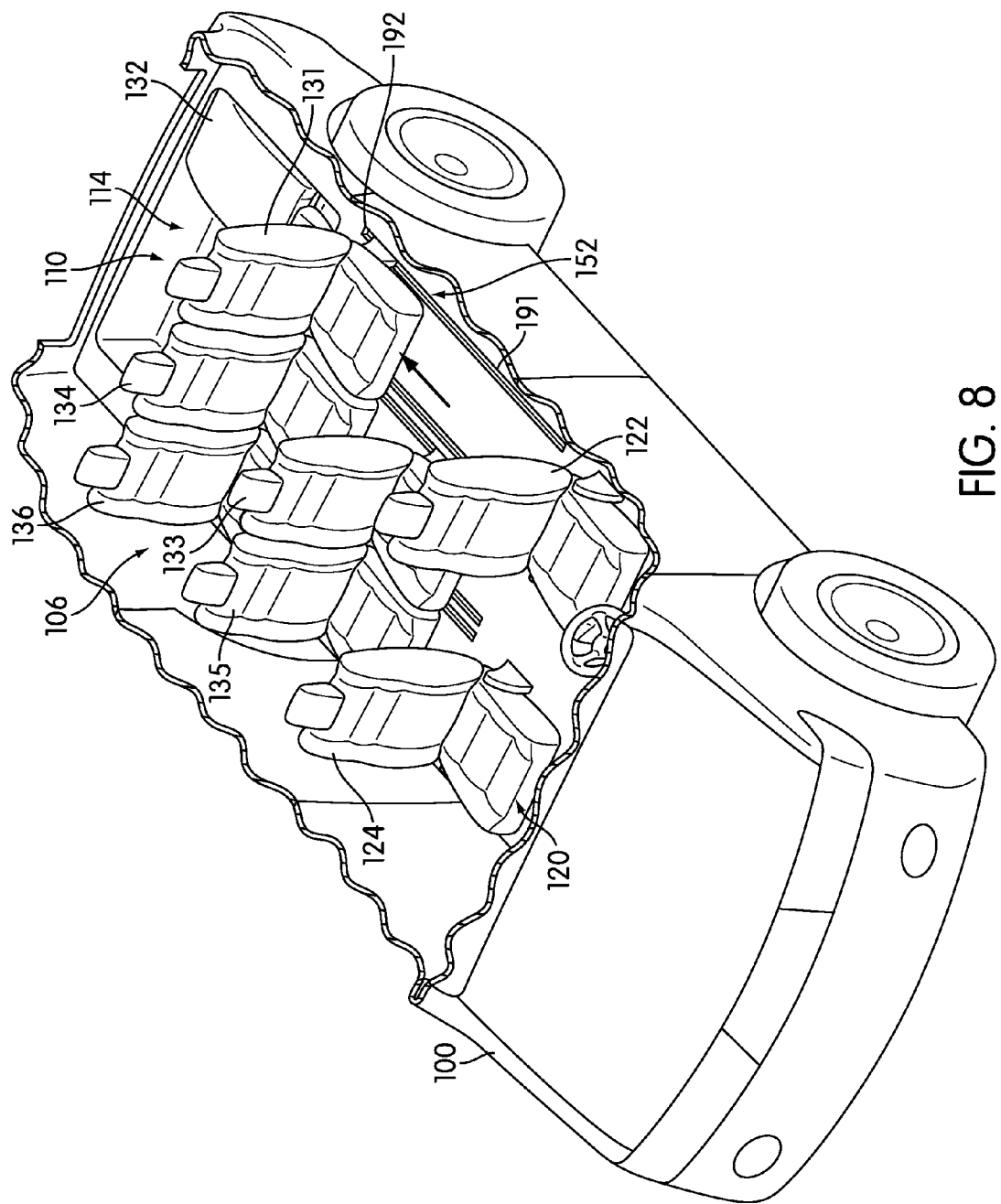
FIG. 8 is a front isometric view of the vehicle seating system of FIG. 7 with a second row seat slid rearwardly on a set of rails to a third row position.

In some cases, with second seat 132 stored within first storage space 114, first seat 131 may be moved rearwardly along first set of rails 152, as seen in FIG. 8. In particular, first seat 131 may be moved from forward portion 191 of first set of rails 152 to rearward portion 192 of first set of rails 152. In this position, first seat 131 may be disposed adjacent to storage region 110 and second seat 132, which is stored within first storage space 114. This configuration may provide increased room in front of first seat 131.

Figure 9:
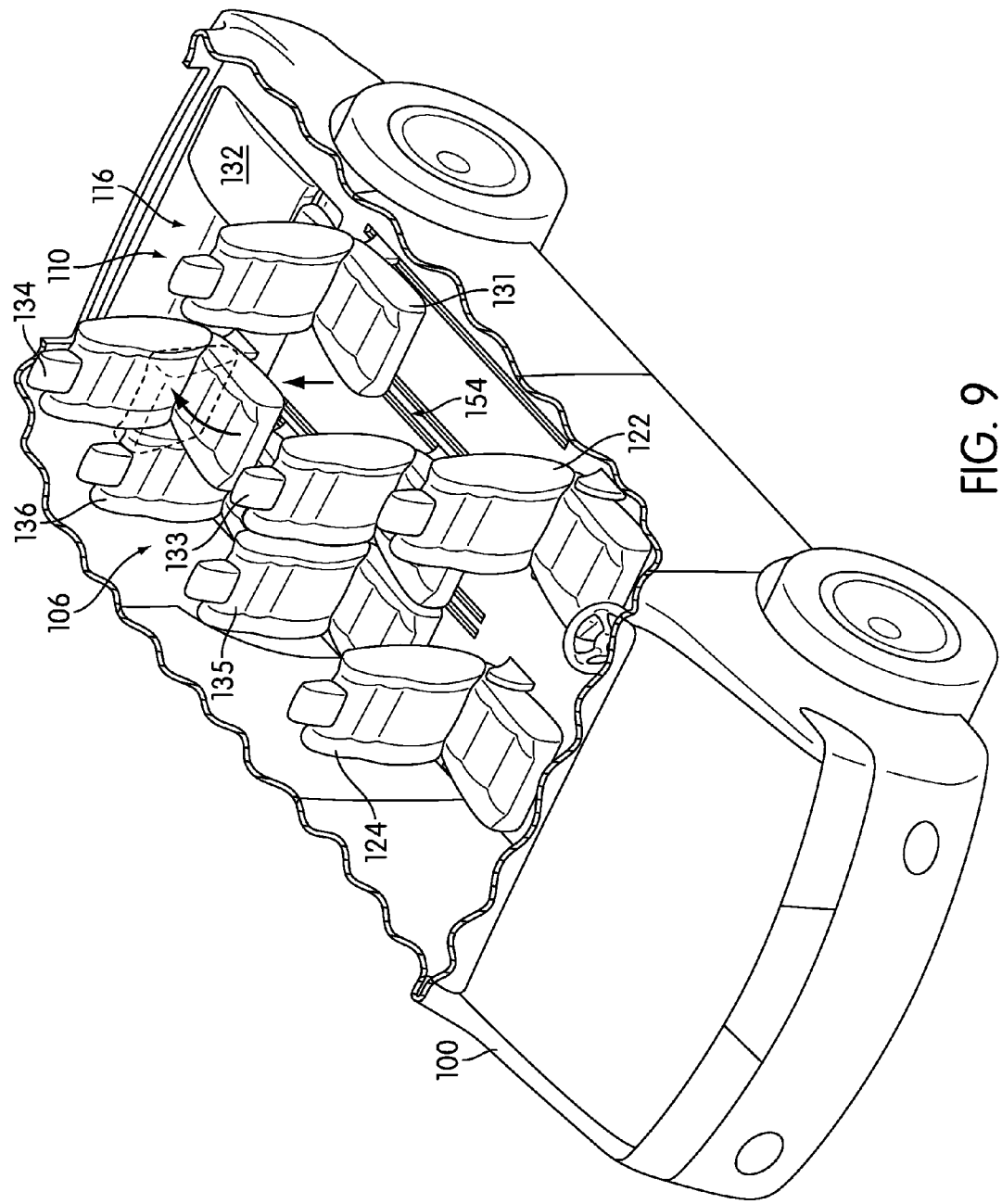
FIG. 9 is a front isometric view of the vehicle seating system of FIG. 8 with a third row seat being removed from a set of rails.
Figure 10:
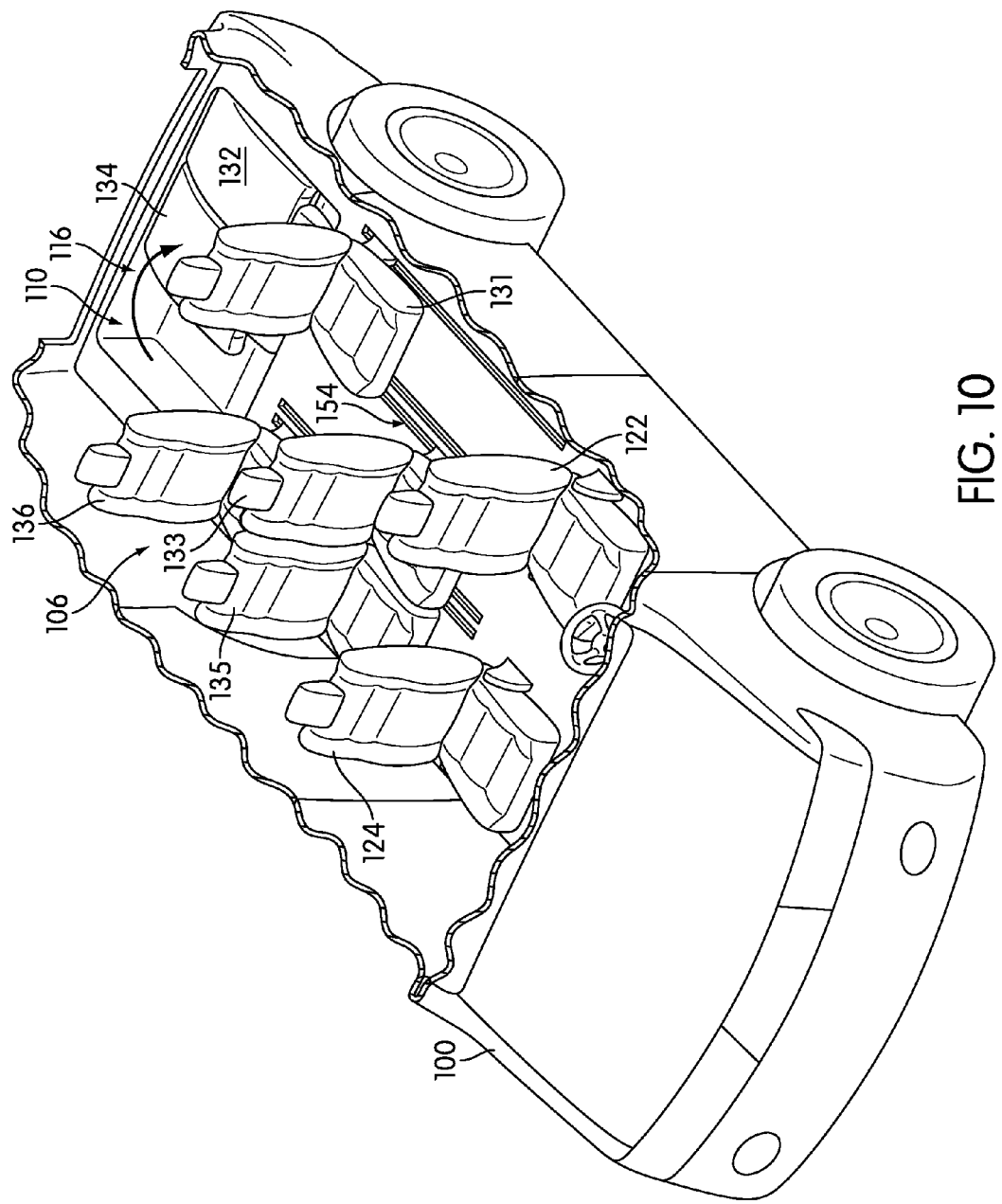
FIG. 10 is a front isometric view of the vehicle seating system of FIG. 9 showing two third row seats placed in a stored position.
Figure 11:
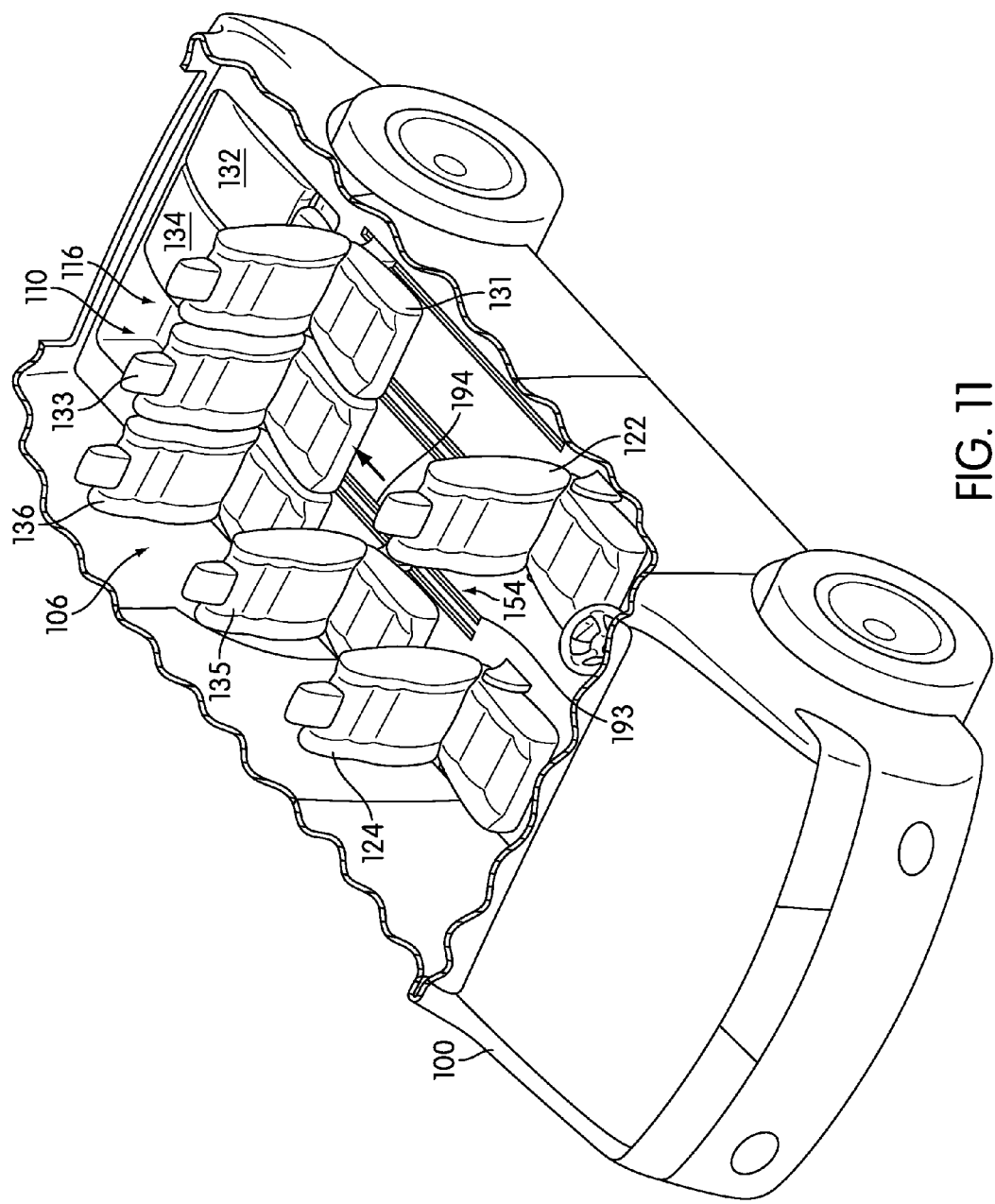
FIG. 11 is a front isometric view of the vehicle seating system of FIG. 10 with two second row seats slid rearwardly to a third row position on a set of rails.
Figure 12:
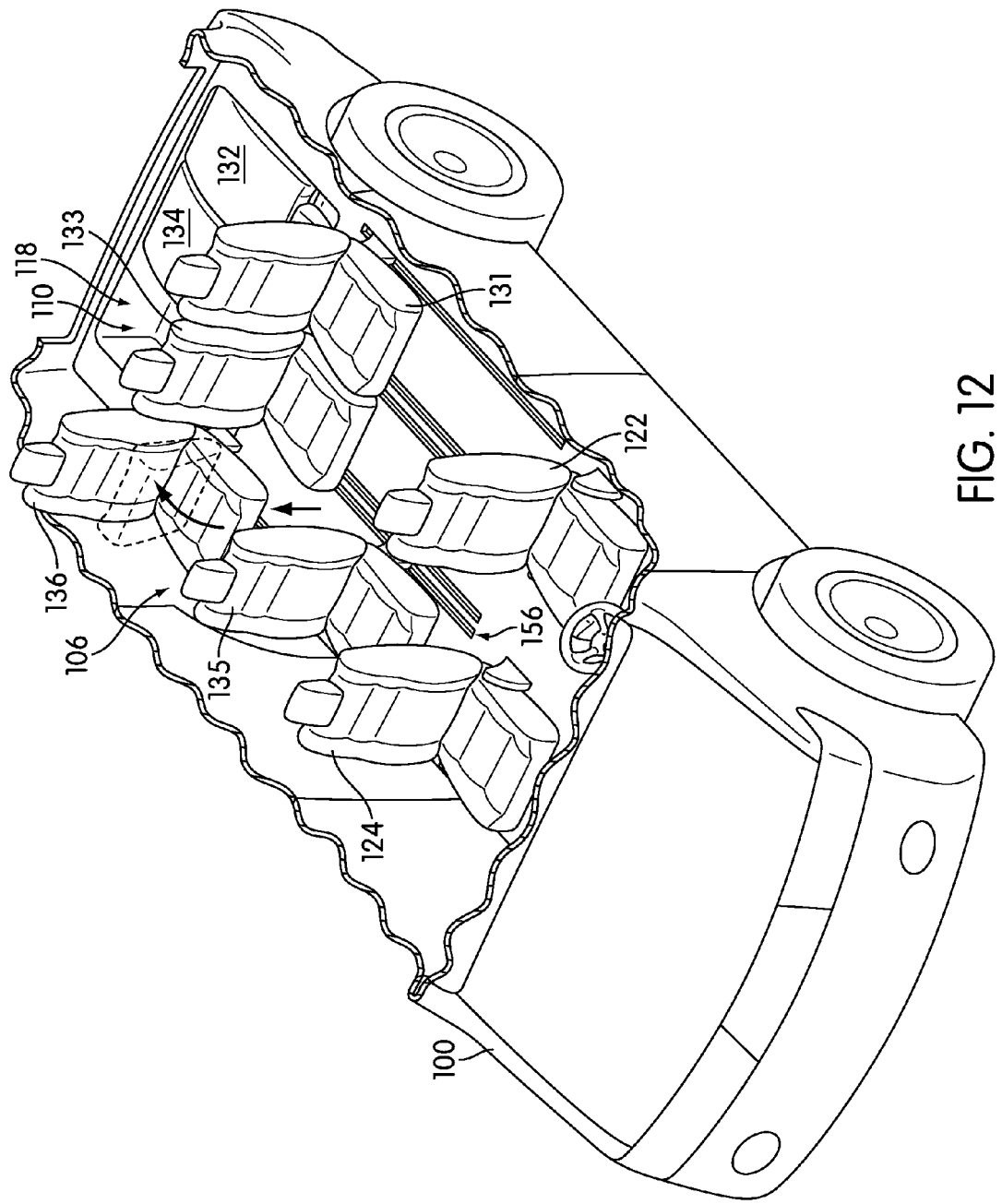
FIG. 12 is a front isometric view of the vehicle seating system of FIG. 11 with a third row seat being removed from a set of rails.
Figure 13:
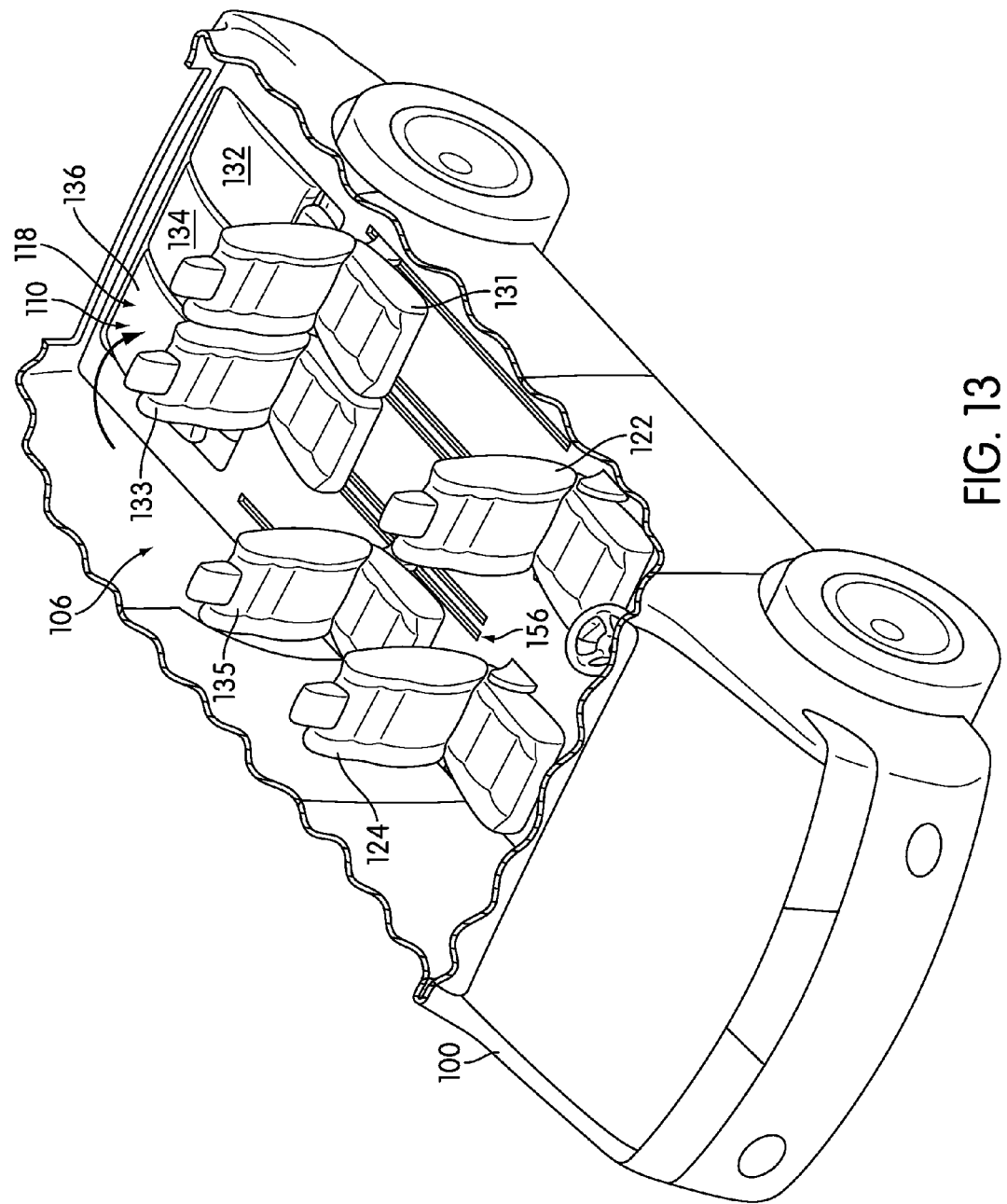
FIG. 13 is a front isometric view of the vehicle seating system of FIG. 12 showing three third row seats placed in a stored position.
Figure 14:
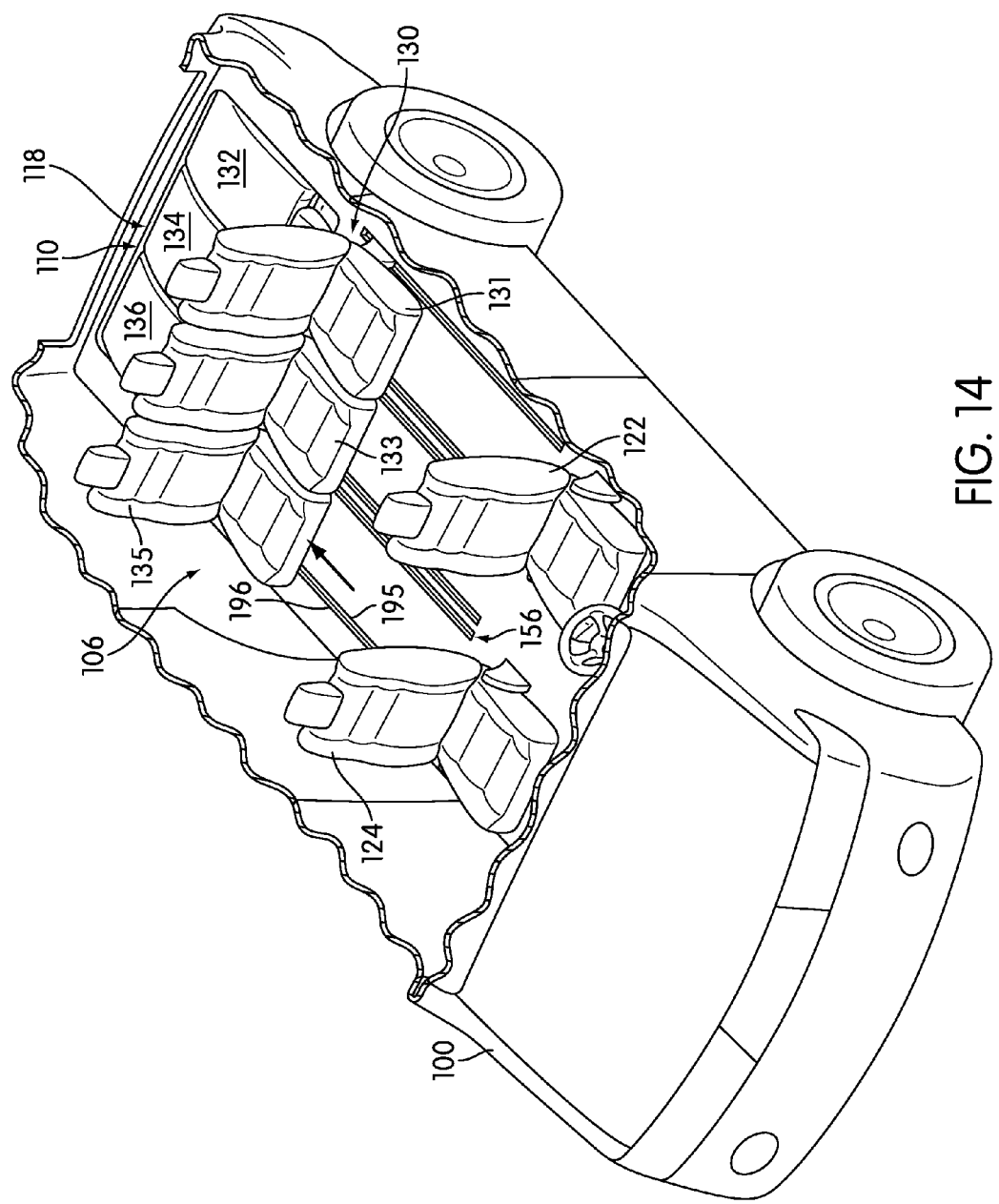
FIG. 14 is a front isometric view of the vehicle seating system of FIG. 13 showing three second row seats slid rearwardly on a set of rails.

Referring to FIGS. 9 through 14, fourth seat 134 and sixth seat 136 can also be stored within storage region 110 to provide increased space within rearward interior portion 106. For example, fourth seat 134 can be removed from second set of rails 154 and placed in a stored position within second storage space 116, as seen in FIGS. 9 and 10. Furthermore, third seat 133 may be moved from forward portion 193 of second set of rails 154 to rearward portion 194 of second set of rails 154, as seen in FIG. 11. In this position, third seat 133 may be disposed adjacent to storage region 110 and fourth seat 134, which is stored within second storage space 116. This configuration may provide for increased room in front of third seat 133. Additionally, as seen in FIGS. 12 and 13, sixth seat 136 can be removed from third set of rails 156 and placed in a stored position within third storage space 118, as seen in FIGS. 12 and 13. Furthermore, fifth seat 135 may be moved from forward portion 195 to rearward portion 196 of third set of rails 156, as seen in FIG. 14. In this position, fifth seat 135 may be disposed adjacent to storage region 110 and sixth seat 136, which is disposed within third storage space 118.

Using this arrangement, each seat of plurality of vehicle seats 130 can be stored independently from every other seat within storage region 110. For example, second seat 132 can be in a stored position while fourth seat 134 is in a deployed position. Likewise, second seat 132 and fourth seat 134 can both be stored while sixth seat 136 is in the deployed position on third set of rails 156. This allows for increased versatility over designs that require multiple seats to be stored together.

In some embodiments, each seat of plurality of rear seats 130 can be configured in a folded deployed position to reduce the amount of space occupied by the seat within interior portion 102 of motor vehicle 100. In some cases, one or more seats in the folded deployed position can be moved along rail system 150 to increase the number of available seating configurations.

Figure 15:
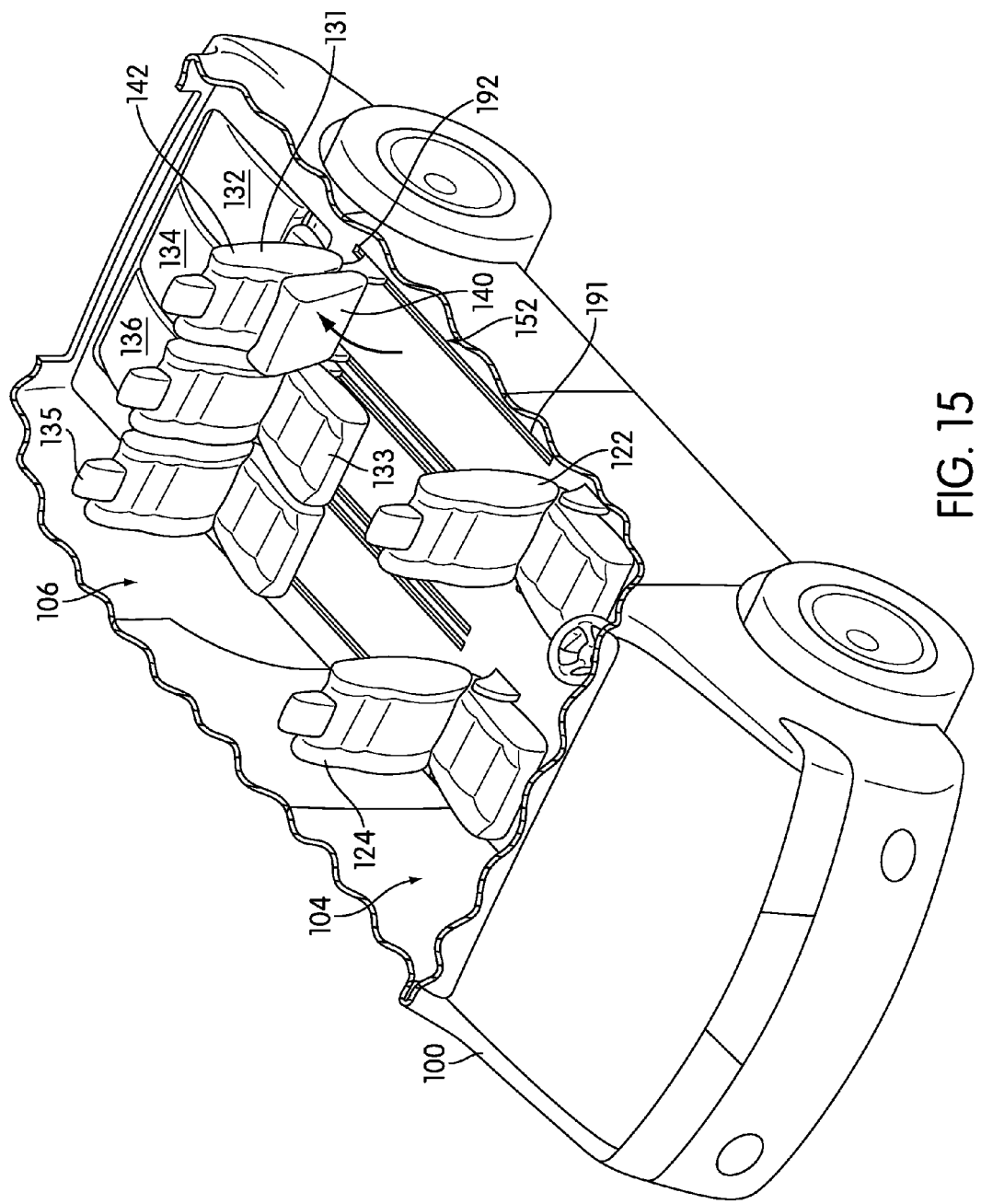
FIG. 15 is a front isometric view of the vehicle seating system of FIG. 14 showing a seat in a folded deployed position.
Figure 16:
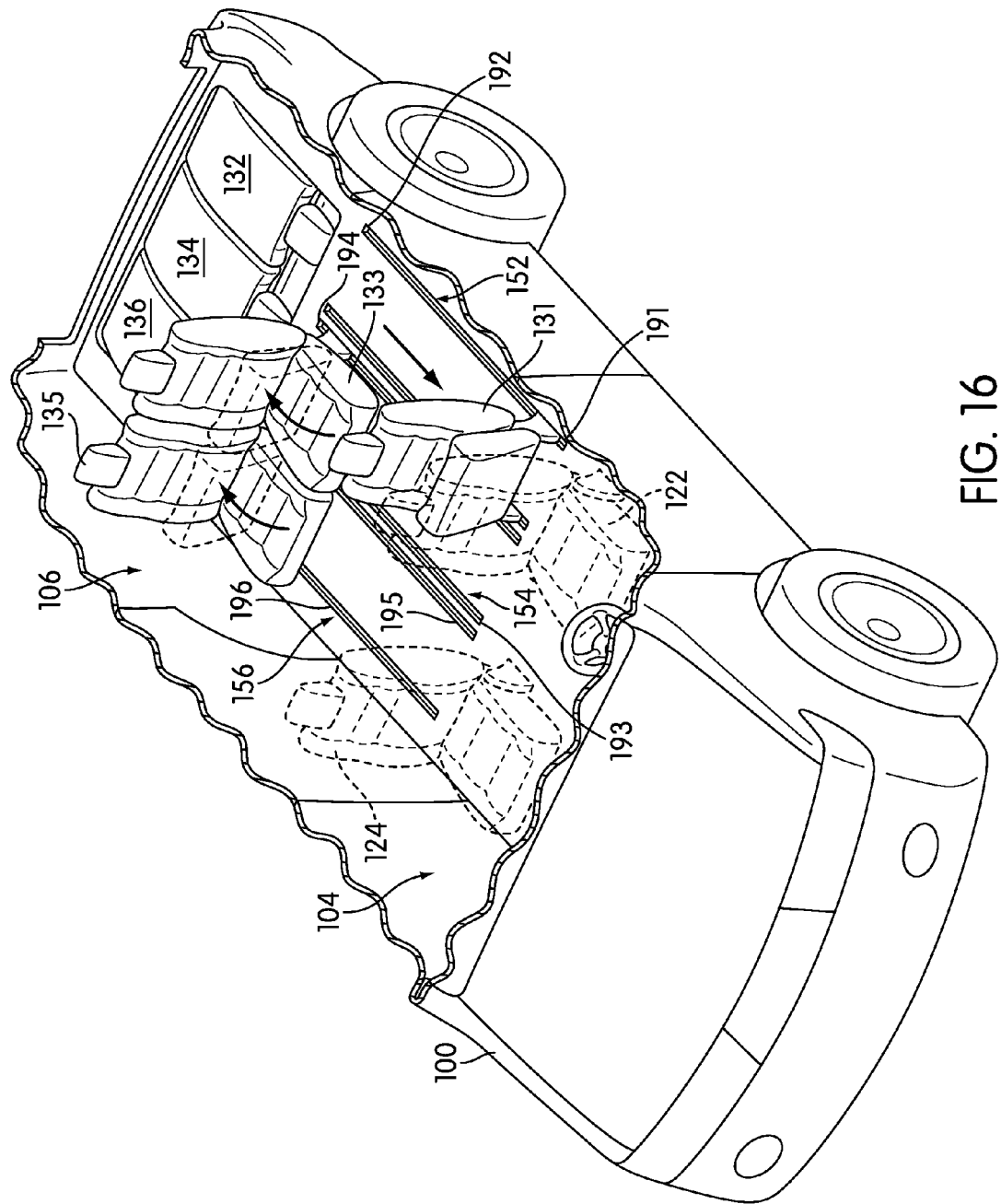
FIG. 16 is a front isometric view of the vehicle seating system of FIG. 15 illustrating with multiple seats in folded deployed positions and one of the folded deployed seats moved forwardly on a set of rails.
Figure 17:
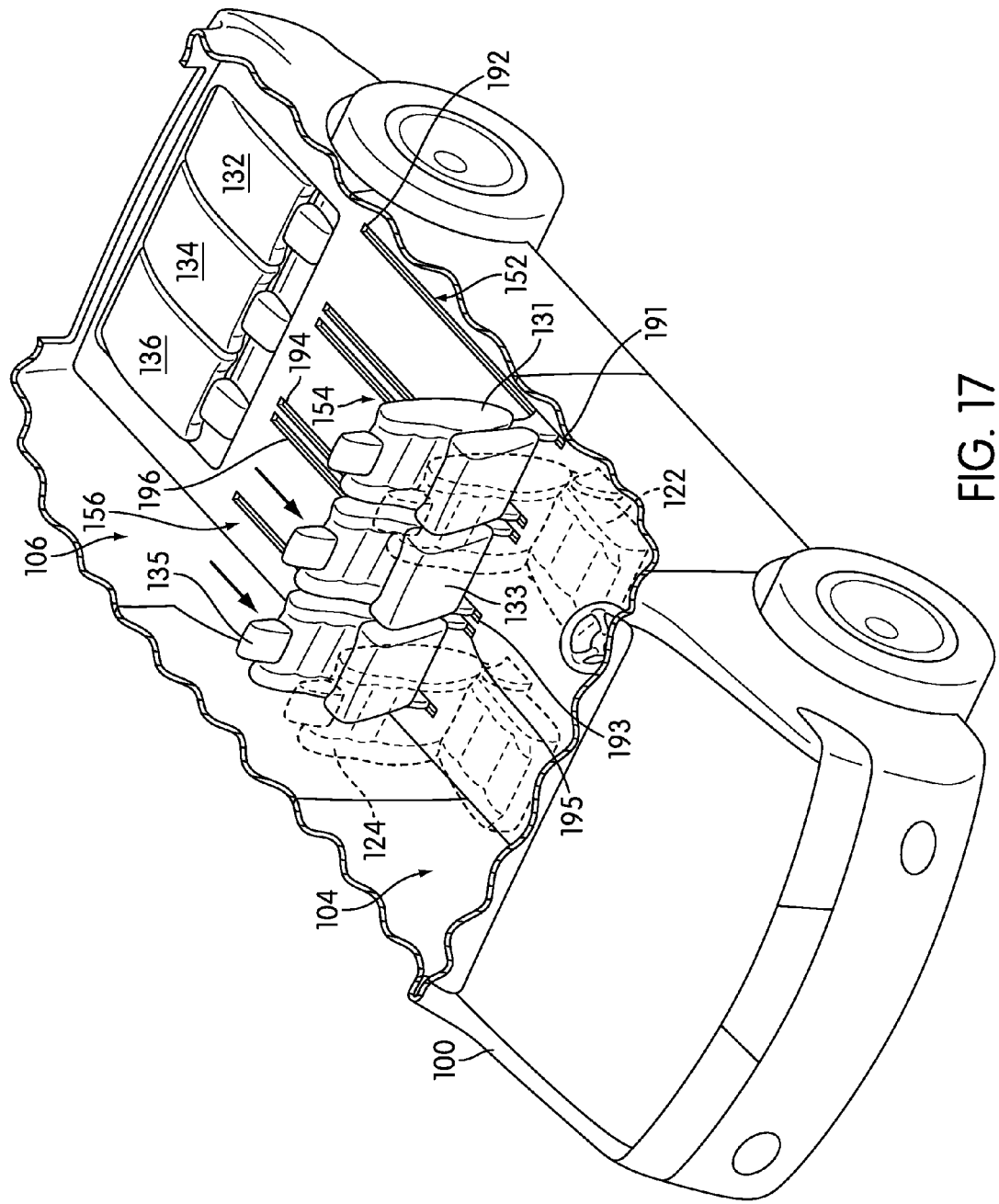
FIG. 17 is a front isometric view of the vehicle seating system of FIG. 15 illustrating multiple seats in folded deployed positions and moved forwardly.

FIGS. 15 through 17 illustrate an embodiment of several seats in a folded deployed position. Referring to FIGS. 15 through 17, first seat 131, third seat 133 and fifth seat 135 can each be placed in a folded deployed position. For example, seat cushion 140 of first seat 131 may be folded upwardly against seat back 142, as seen in FIG. 15. In this folded deployed position, first seat 131 may be moved forward from rearward portion 192 to forward portion 191 of first set of rails 152. In this case, first seat 131 may be moved to a position that is directly behind driver seat 122. In a similar manner, the seat cushions of third seat 133 and fifth seat 135 may be placed in folded deployed positions so that third seat 133 and fifth seat 135 can be moved forward on second set of rails 154 and third set of rails 156, respectively. In particular, third seat 133 may be moved from rearward portion 194 of second set of rails 154 to forward portion 193 of second set of rails 154. Likewise, fifth seat 135 may be moved from rearward portion 196 to forward portion 195 of third set of rails 156. In an exemplary embodiment, first seat 131, third seat 133 and fifth seat 135 may be disposed adjacent to forward interior portion 104 of motor vehicle 100. This configuration may provide for increased space within rearward interior portion 106 that allows for multi-purpose storage.

Figure 18:
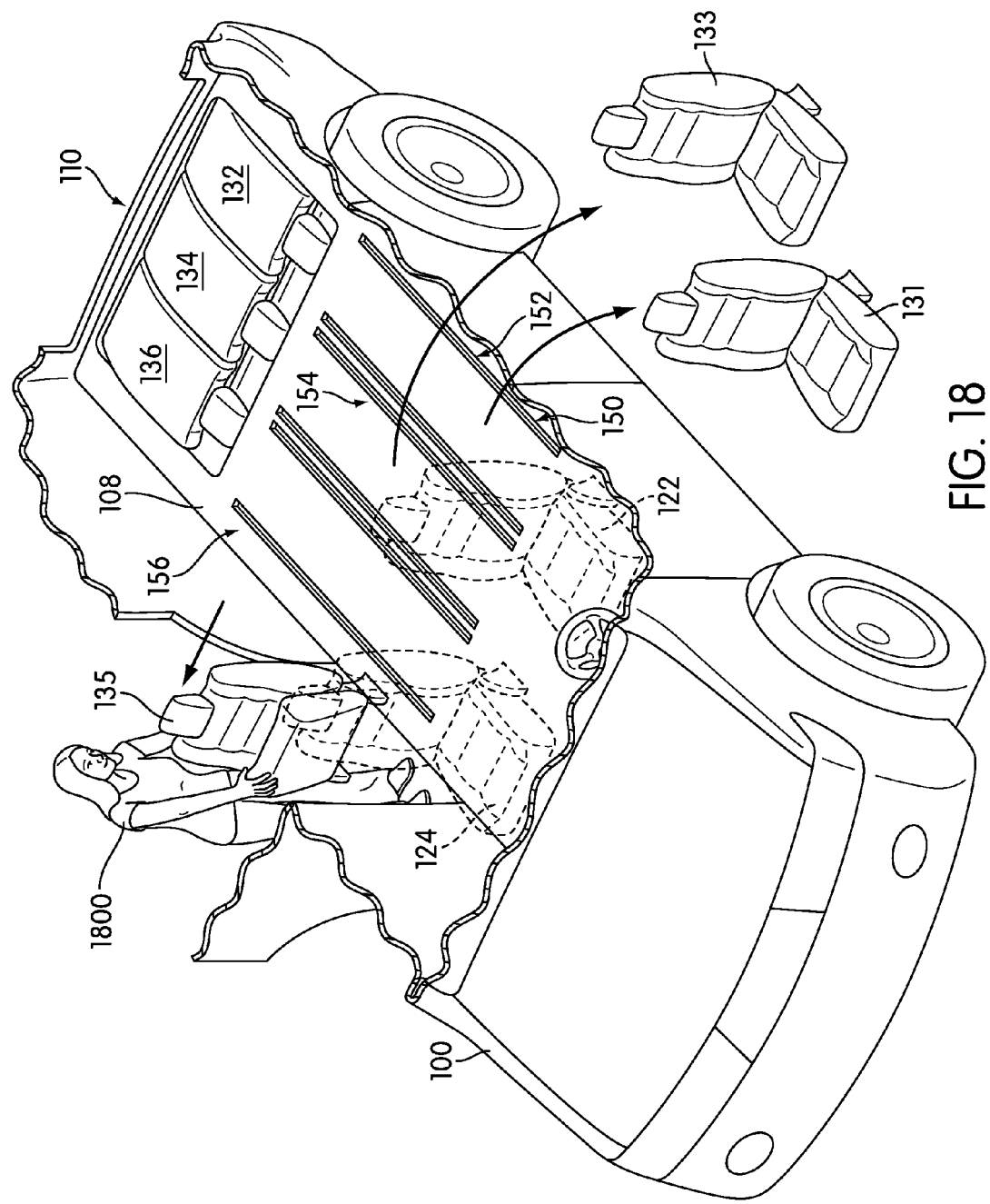
FIG. 18 is a front isometric view of the vehicle seating system of FIG. 1 with seats being removed from the motor vehicle.
Figure 19:
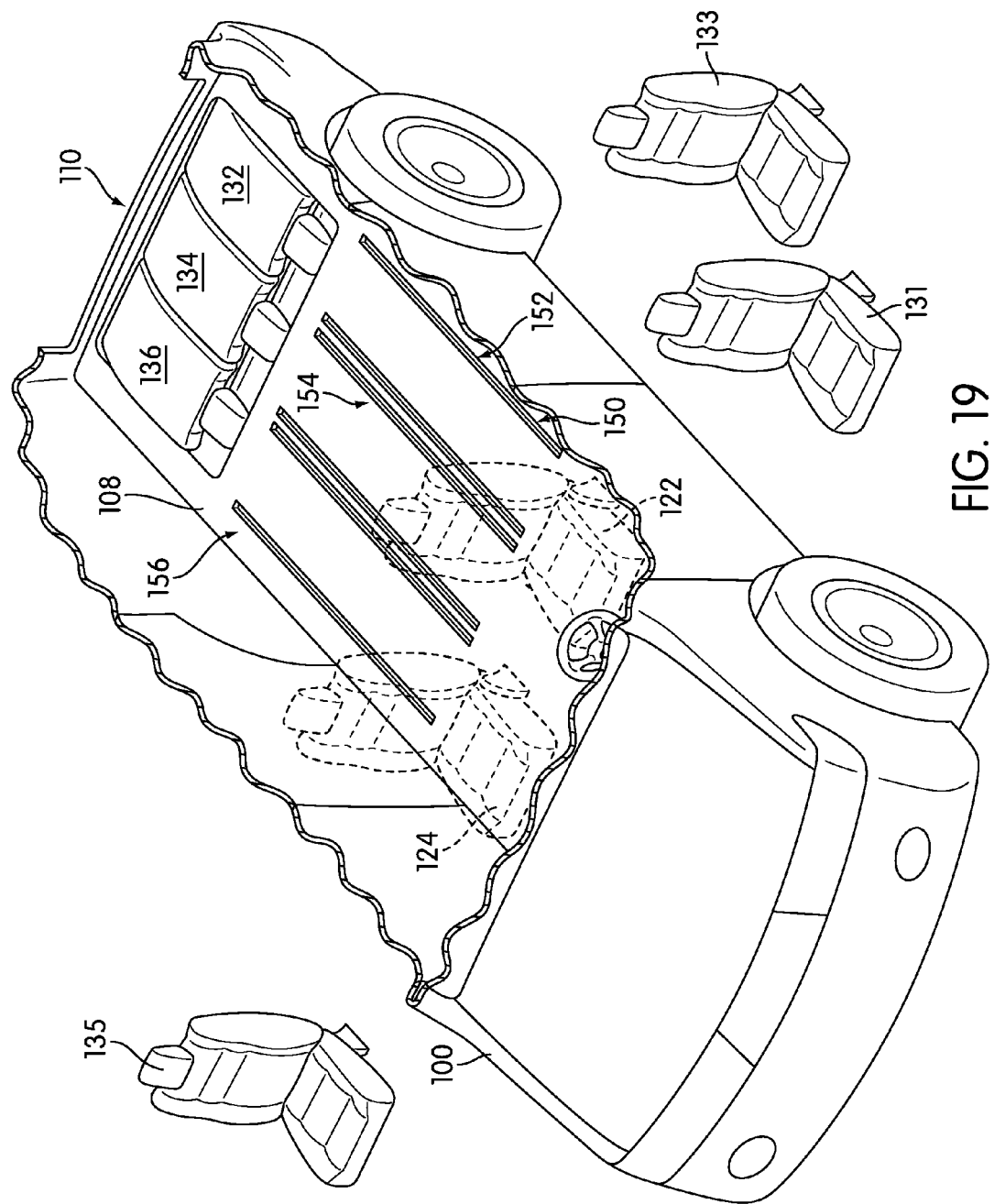
FIG. 19 is a front isometric view of the vehicle seating system of FIG. 18 with seats removed from the motor vehicle.

In some embodiments, to maximize the amount of space within rearward interior portion 106, a user could remove one or more three seats from motor vehicle 100, as illustrated in FIGS. 18 and 19. In this case, first seat 131, third seat 133 and fifth seat 135 may be removed from motor vehicle 100 by user 1800. In particular, first seat 131, third seat 133 and fifth seat 135 may be disengaged from first set of rails 152, second set of rails 154 and third set of rails 156, respectively. Furthermore, second seat 132, fourth seat 134 and sixth seat 136 may be stored within storage region 110 so that all seats are removed from rail system 150. With this arrangement, floor 108 provides a substantially flat surface for storing various kinds of cargo.

Figure 20:
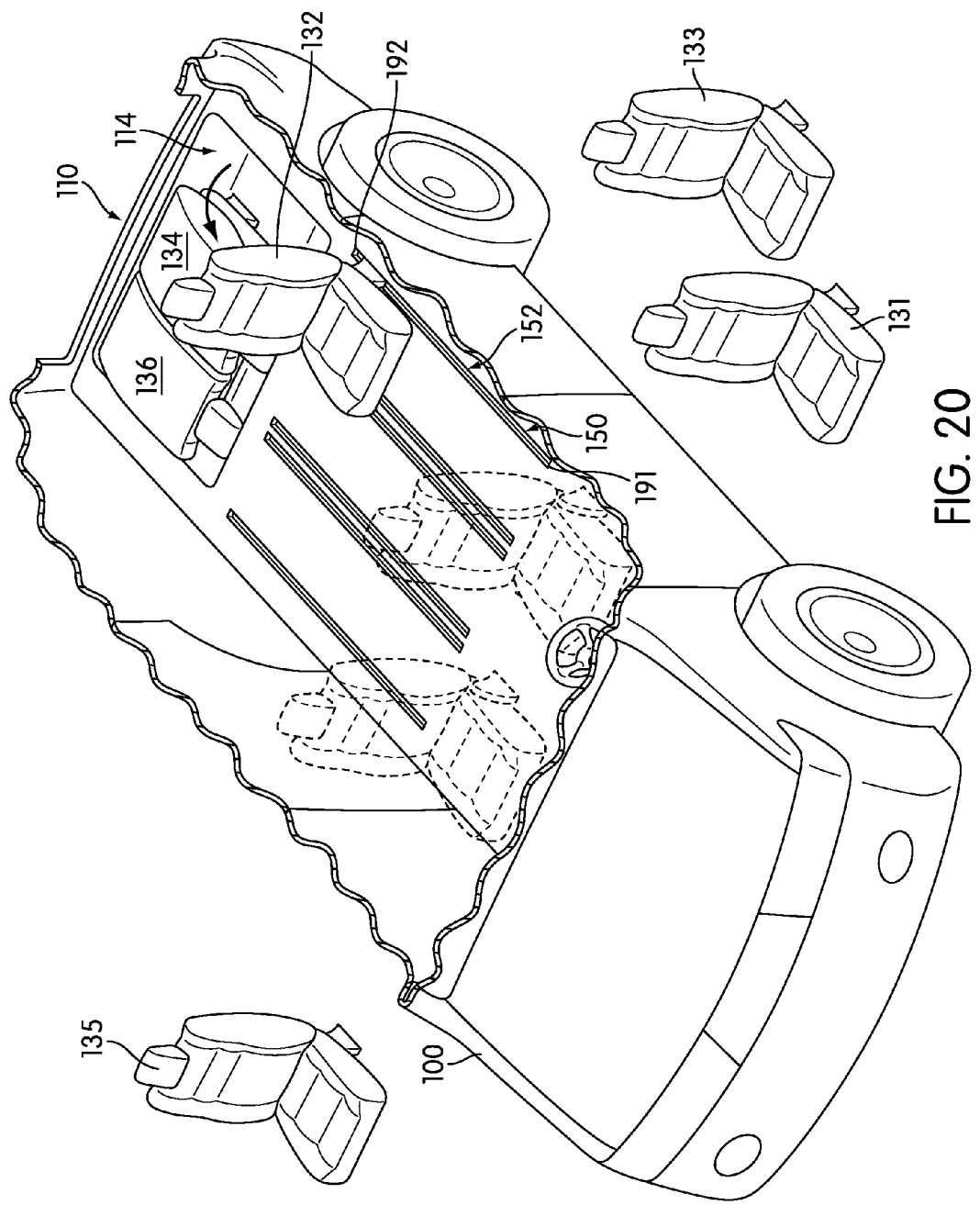
FIG. 20 is a front isometric view of the vehicle seating system of FIG. 19 illustrating one of the stored seats returned to a third row position on one of the sets of rails.
Figure 21:
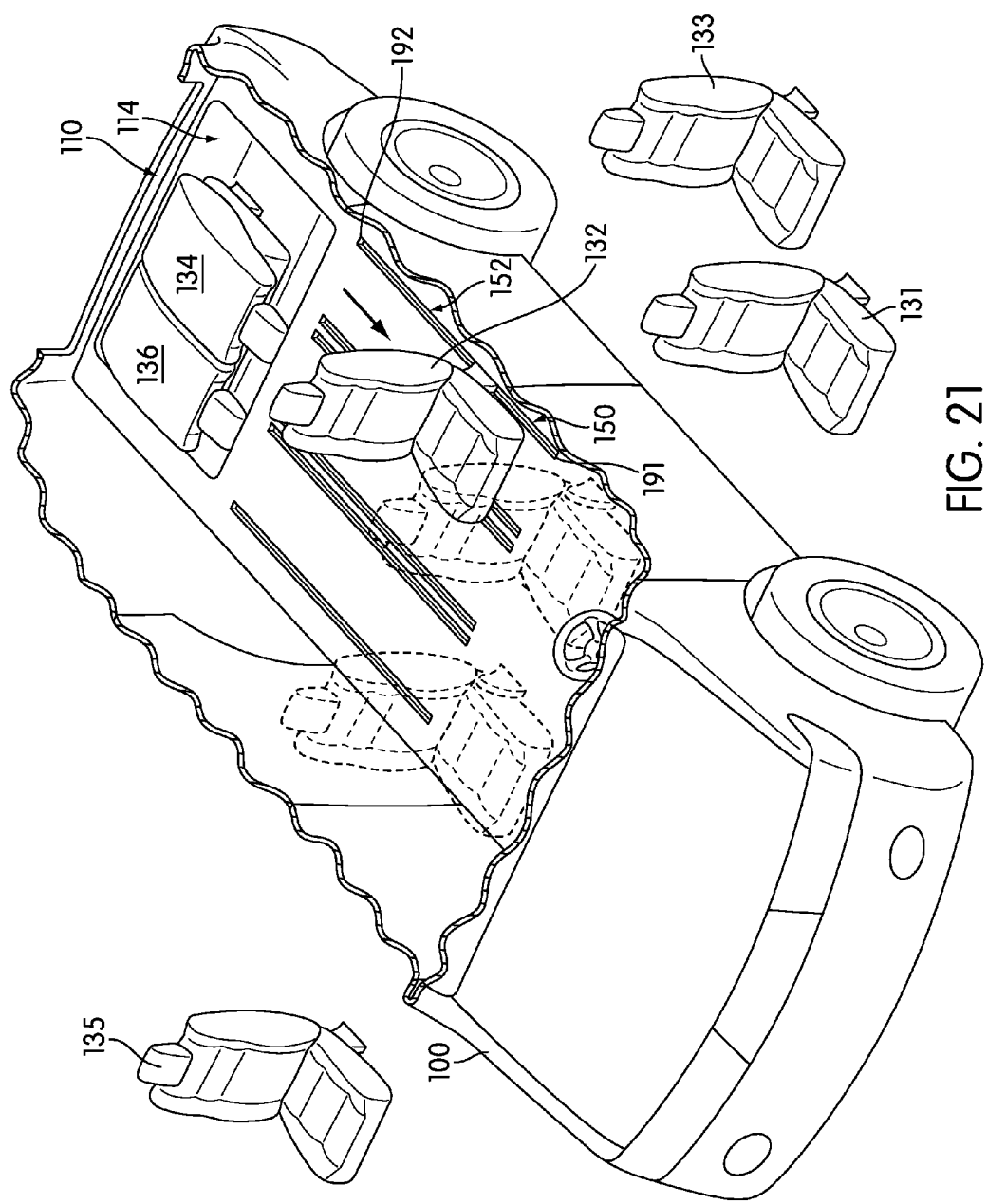
FIG. 21 is a front isometric view of the vehicle seating system of FIG. 20 illustrating the returned seat moved forwardly to a second row position.
Figure 22:
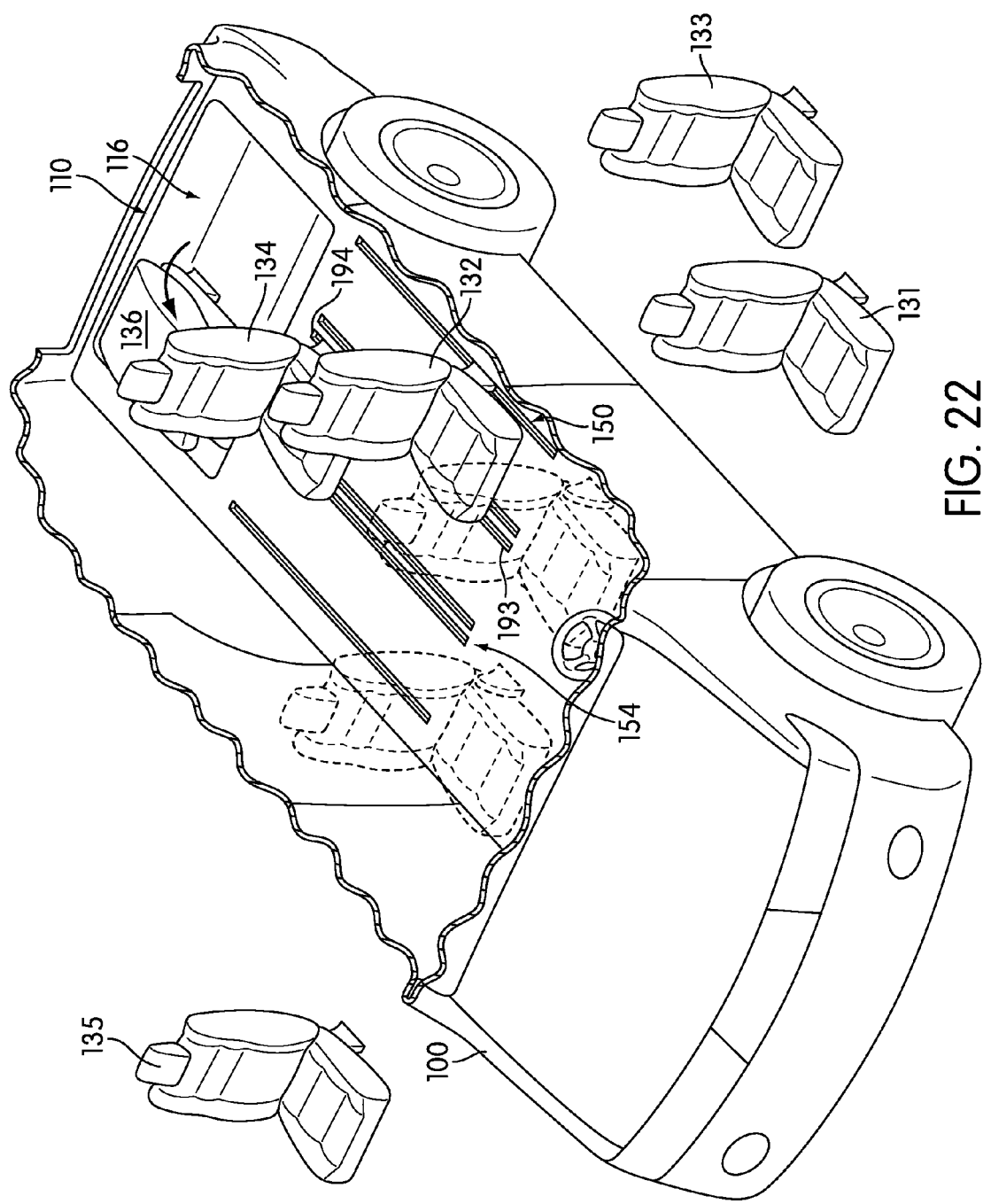
FIG. 22 is a front isometric view of the vehicle seating system of FIG. 21 illustrating a second one of the stored seats returned to a third row position.
Figure 23:
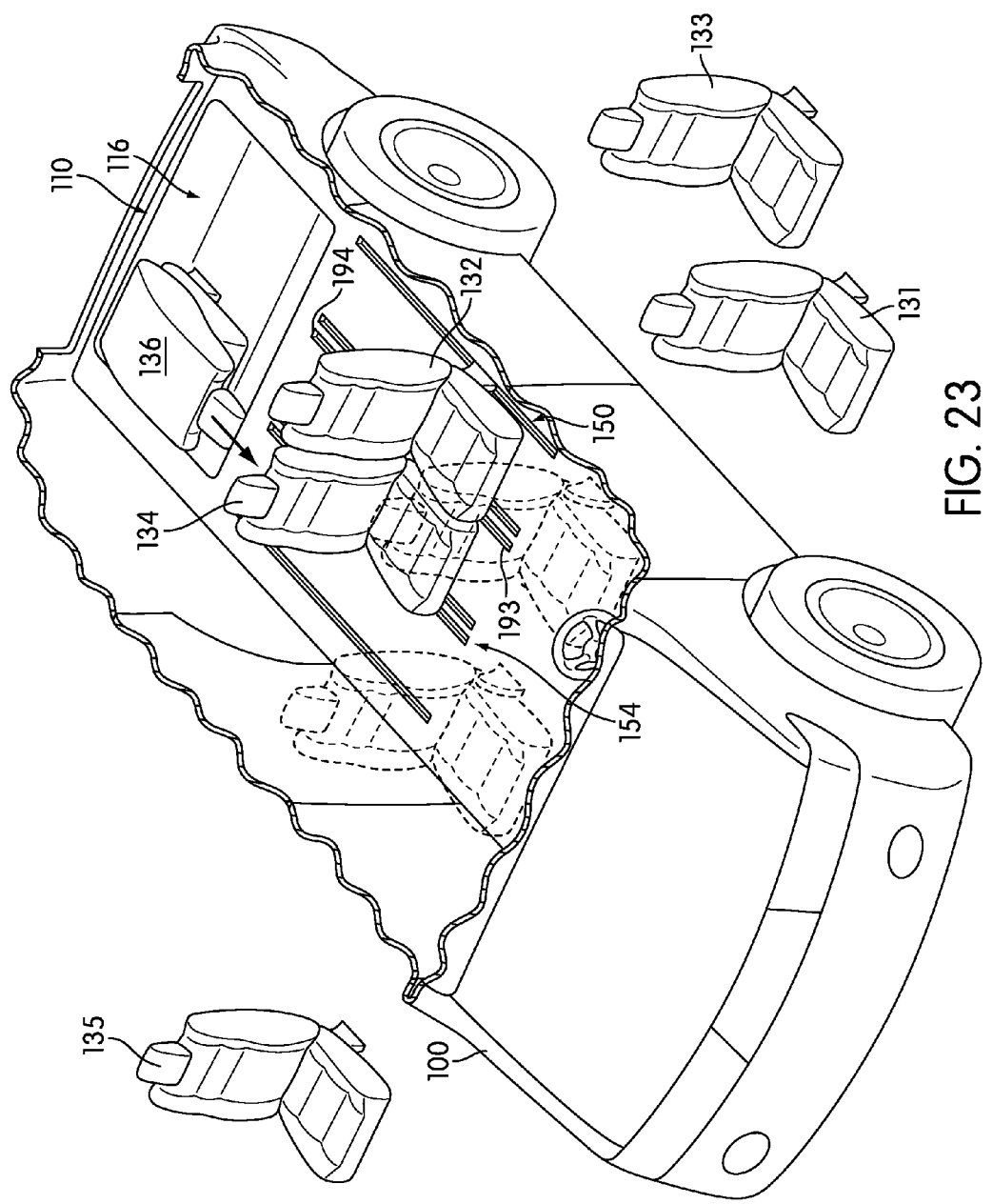
FIG. 23 is a front isometric view of the vehicle seating system of FIG. 22 illustrating the second returned seat moved forwardly to a second row position.
Figure 24:
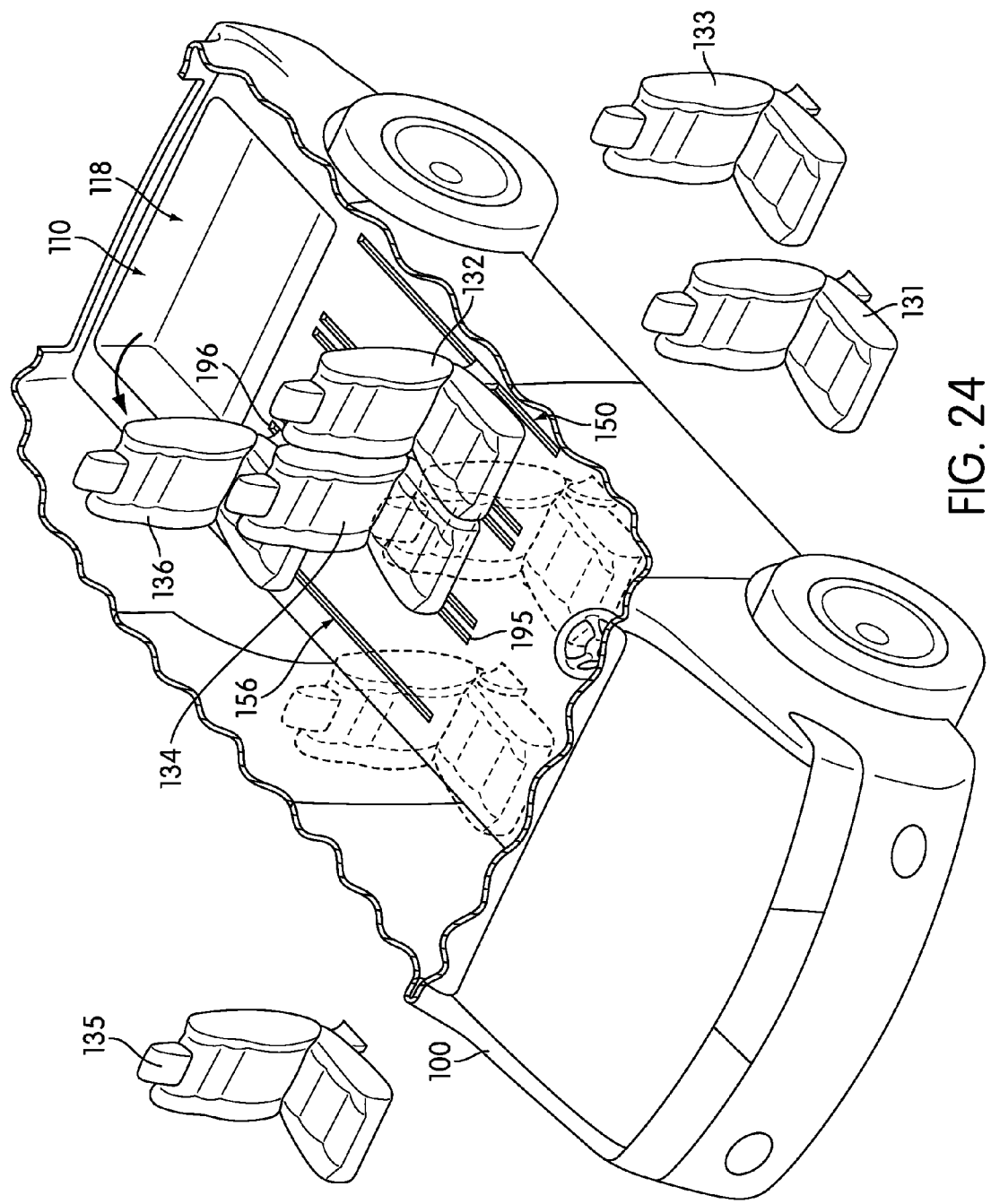
FIG. 24 is a front isometric view of the vehicle seating system of FIG. 23 illustrating a third one of the stored seats returned to a third row position.
Figure 25:
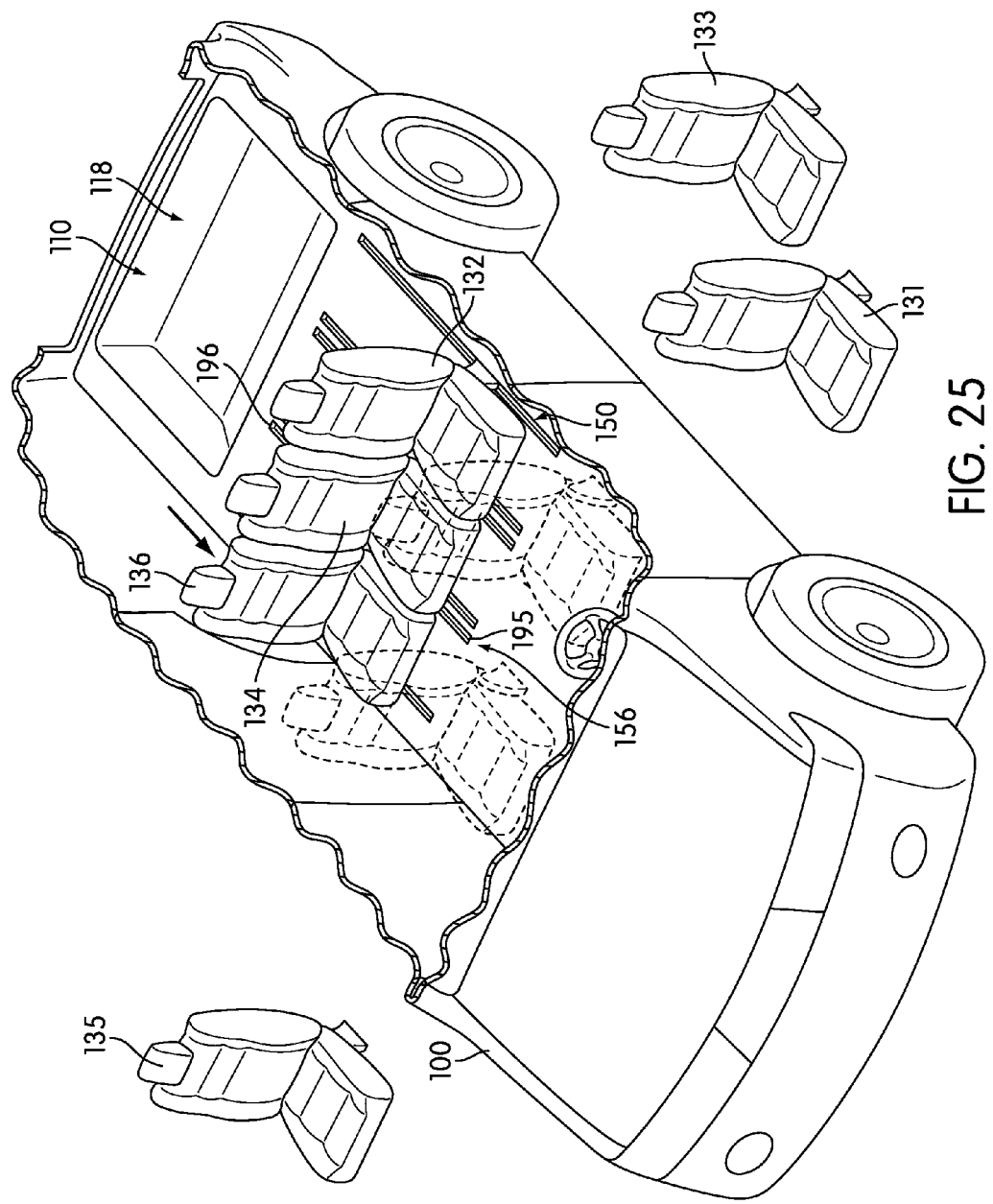
FIG. 25 is a front isometric view of the vehicle seating system of FIG. 24 illustrating the third returned seat moved forwardly to a second row position.

Referring to FIGS. 20 through 25, a user may place second seat 132, fourth seat 134 and sixth seat 136 on rail system 150 while first seat 131, third seat 133 and fifth seat 135 are disposed outwardly of motor vehicle 100. In particular, second seat 132 may be removed from first storage space 114 of storage region 110 and placed on first set of rails 152 as seen in FIGS. 20 and 21. In some cases, after being mounted to first set of rails 152, second seat 132 may be moved from rearward portion 192 to forward portion 191 of first set of rails 152 to provide increased storage room behind second seat 132. In a similar manner, fourth seat 134 may be removed from second storage space 116 of storage region 110 and placed on second set of rails 154 as seen in FIGS. 22 and 23. In some cases, after being mounted to second set of rails 154, fourth seat 134 may be moved from rearward portion 194 to forward portion 193 of second set of rails 154 to provide increase storage room behind fourth seat 134. In addition, sixth seat 136 may be removed from third storage space 118 of storage region 110 and placed on third set of rails 156 as seen in FIGS. 24 and 25. In some cases, after being mounted to third set of rails 156, sixth seat 136 may be moved from rearward portion 196 to forward portion 195 of third set of rails 156 to provide increased storage room being sixth seat 136. With this configuration, storage region 110 can be used for storing various types of cargo. In addition, the space behind second seat 132, fourth seat 134 and sixth seat 136 can be used for additional storage as well.

FIGS. 26 through 43 are intended to illustrate embodiments of different configurations for vehicle seating system 120. It will be understood that the following seating configurations are only intended to be exemplary and in other embodiments additional seating configurations are possible.

Figure 26:
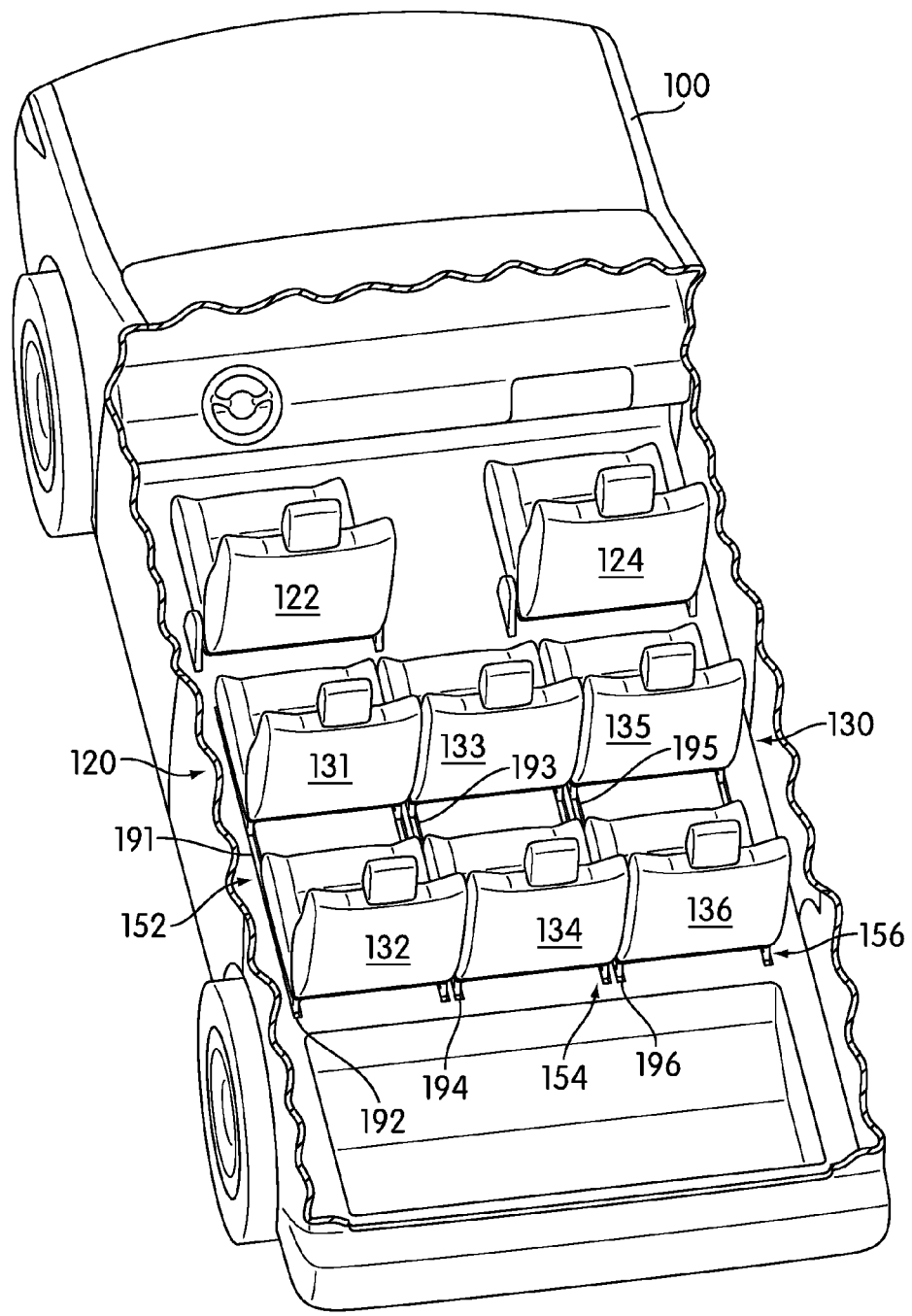
FIG. 26 is a rear isometric view of an embodiment of a seating configuration for a vehicle seating system.

FIG. 26 is an embodiment of a configuration for vehicle seating system 120 that provides maximum seating. In this case, each seat of plurality of rear seats 130 is disposed in a deployed position. In addition, first seat 131, third seat 133 and fifth seat 135 are disposed in a middle row while second seat 132, fourth seat 134 and sixth seat 136 are disposed in a rear row. In particular, first seat 131, third seat 133 and fifth seat 135 are disposed in forward portion 191 of first set of rails 152, forward portion 193 of second set of rails 154 and forward portion 195 of third set of rails 156, respectively. Likewise, second seat 132, fourth seat 134 and sixth seat 136 are disposed in rearward portion 192 of first set of rails 152, rearward portion 194 of second set of rails 154 and rearward portion 196 of third set of rails 156, respectively. This configuration allows motor vehicle 100 to transport eight occupants and could be useful for carpooling or other situations that require high occupancy.

Figure 27:
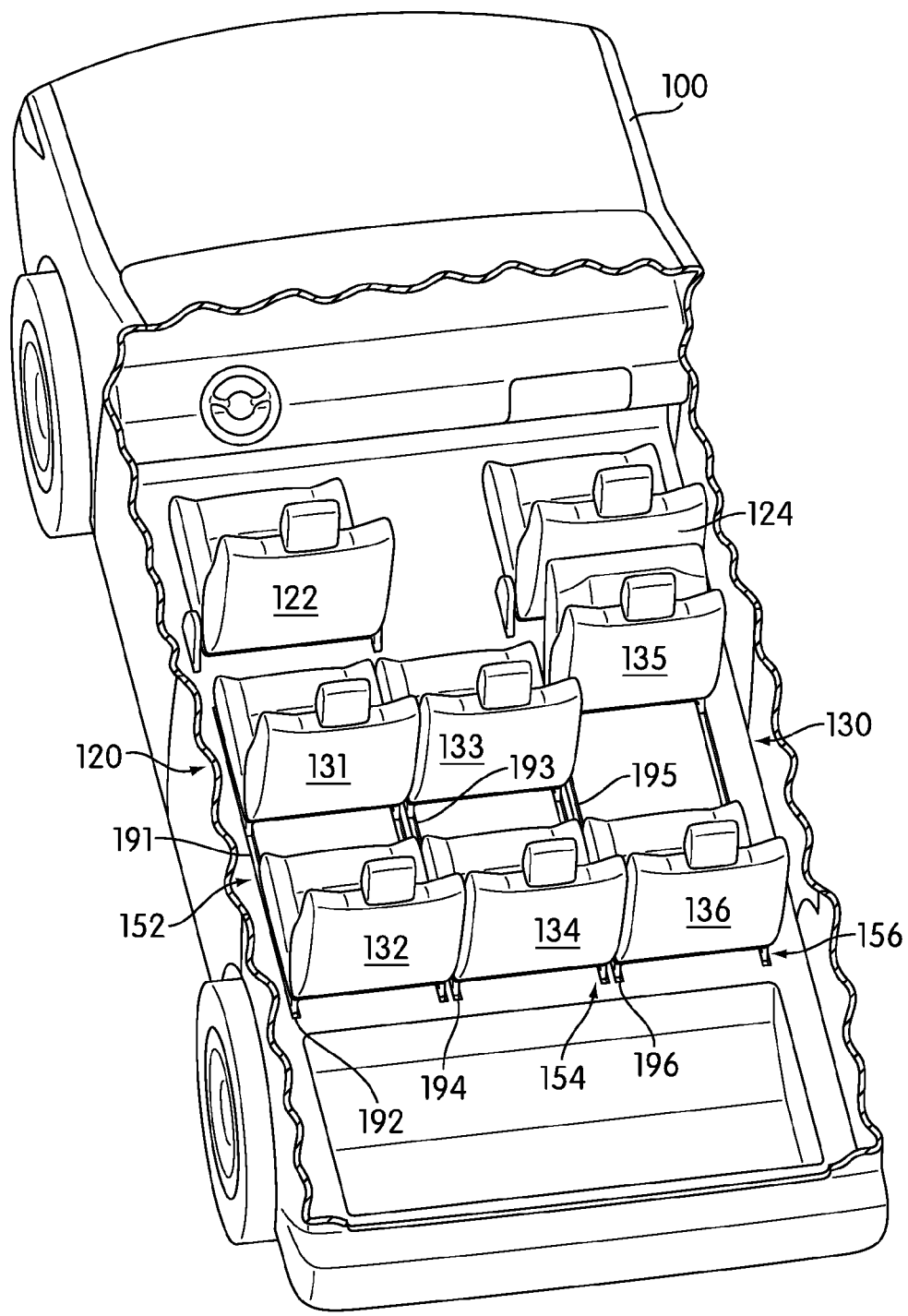
FIG. 27 is a rear isometric view of an embodiment of a seating configuration for a vehicle seating system, in which a second row seat is moved to a folded deployed position.

FIG. 27 is an embodiment of a configuration for vehicle seating system that provides seating for seven occupants as well as extended foot room for one occupant. In this case, first seat 131, second seat 132, third seat 133, fourth seat 134 and sixth seat 136 are all in deployed positions. First seat 131 and third seat 133 form a middle row of seating, while second seat 132, fourth seat 134 and sixth seat 136 form a rear row of seating in a similar manner to the configuration shown in FIG. 26. Moreover, fifth seat 135 is in a folded deployed position and is pushed forward on third set of rails 156 directly behind front passenger seat 124. In particular, fifth seat 135 is disposed at a forward most portion of forward portion 195 of third set of rails 156. This arrangement provides additional space in front of sixth seat 136 for storing objects or increasing the amount of foot space for an occupant of sixth seat 136.

Figure 28:
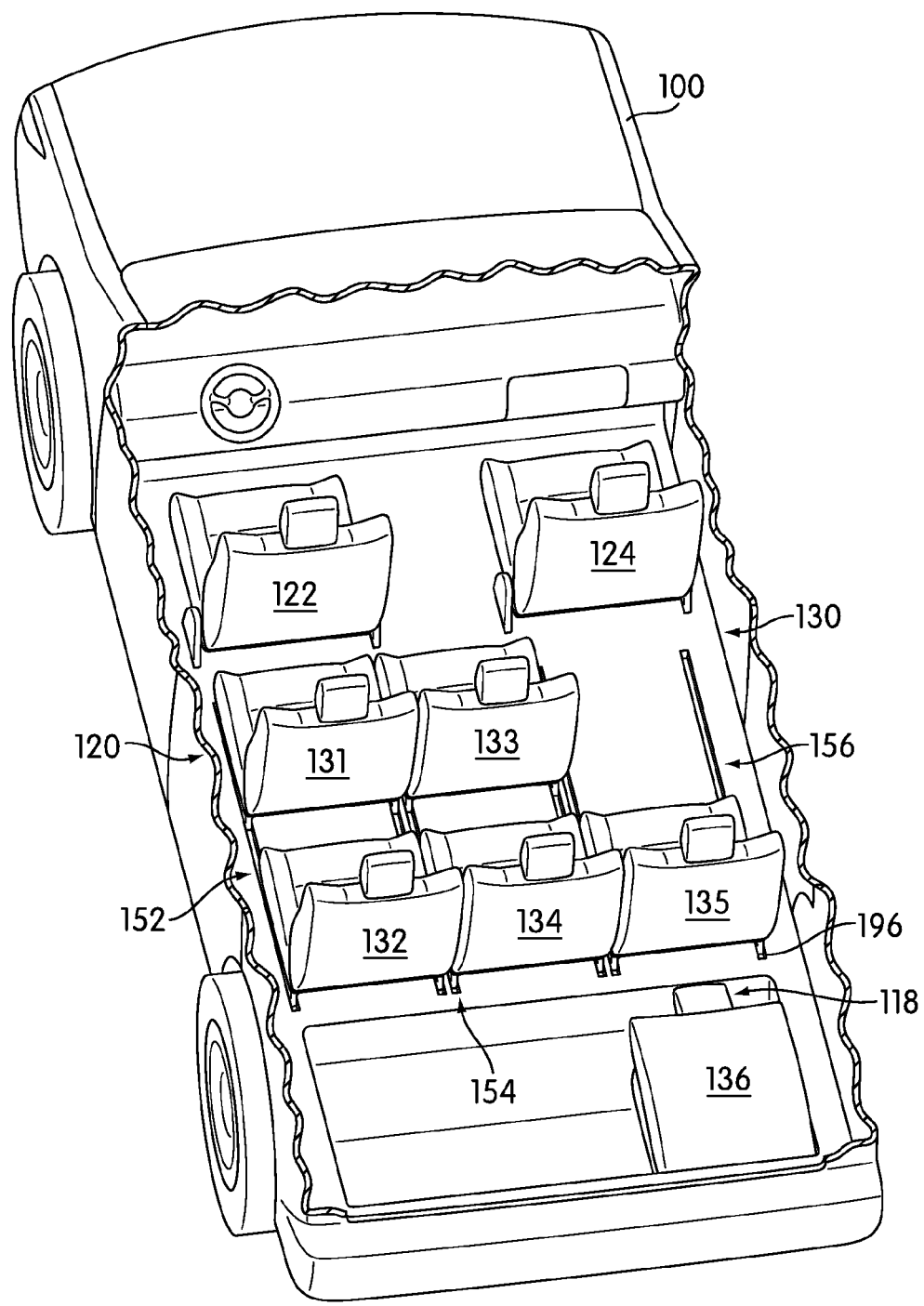
FIG. 28 is a rear isometric view of an embodiment of a seating configuration for a vehicle seating system, in which a third row seat is in a stored position and a second row seat is moved rearwardly to a third row position.

FIG. 28 illustrates an embodiment of a configuration for vehicle seating system 120 that provides increased space in front of fifth seat 135. In this case, first seat 131, second seat 132, third seat 133 and fourth seat 134 are all deployed in a similar configuration to that shown in FIG. 27. However, in this case sixth seat 136 is disposed in a stored position within third storage space 118. Furthermore, fifth seat 135 is disposed in rearward portion 196 of third set of rails 156. This arrangement may provide a limousine like configuration for motor vehicle 100.

Figure 29:
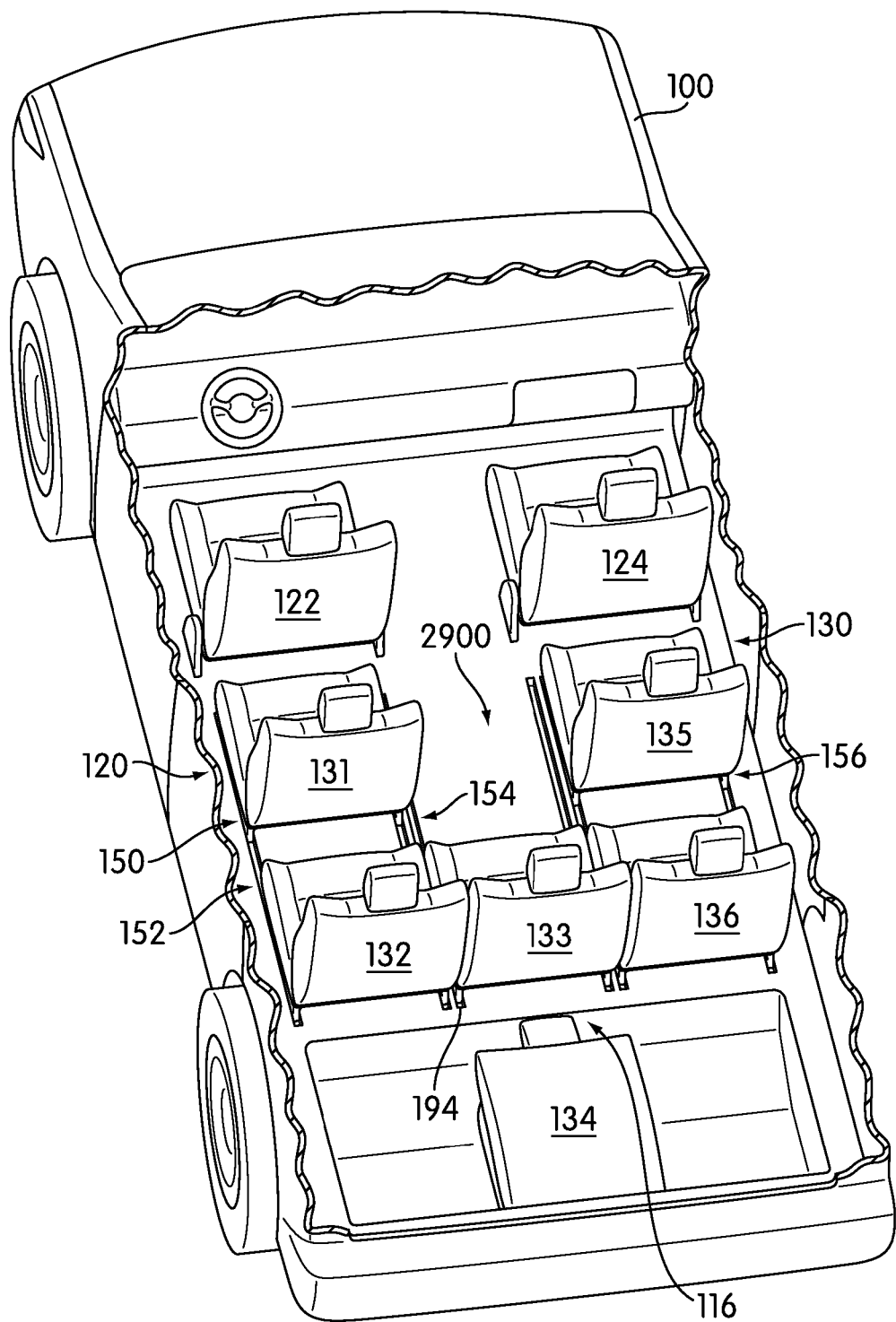
FIG. 29 is a rear isometric view of an embodiment of a seating configuration for a vehicle seating system, in which a third row seat is in a stored position and a second row seat is moved rearwardly to a third row position.

FIG. 29 illustrates an embodiment of a configuration for vehicle seating system 120 that provides an aisle between first seat 131 and fifth seat 135. In this case, first seat 131, second seat 132, third seat 133, fifth seat 135 and sixth seat 136 are all deployed. Furthermore, fourth seat 134 is disposed in a stored position within second storage space 116. First seat 131 and second seat 132 are both disposed on first set of rails 152. In addition, third seat 133 is disposed in rearward portion 194 of second set of rails 154. Additionally, both fifth seat 135 and sixth seat 136 are disposed on third set of rails 156. This arrangement may provide gap 2900 between first seat 131 and fifth seat 135 that is configured as an aisle.

Figure 30:
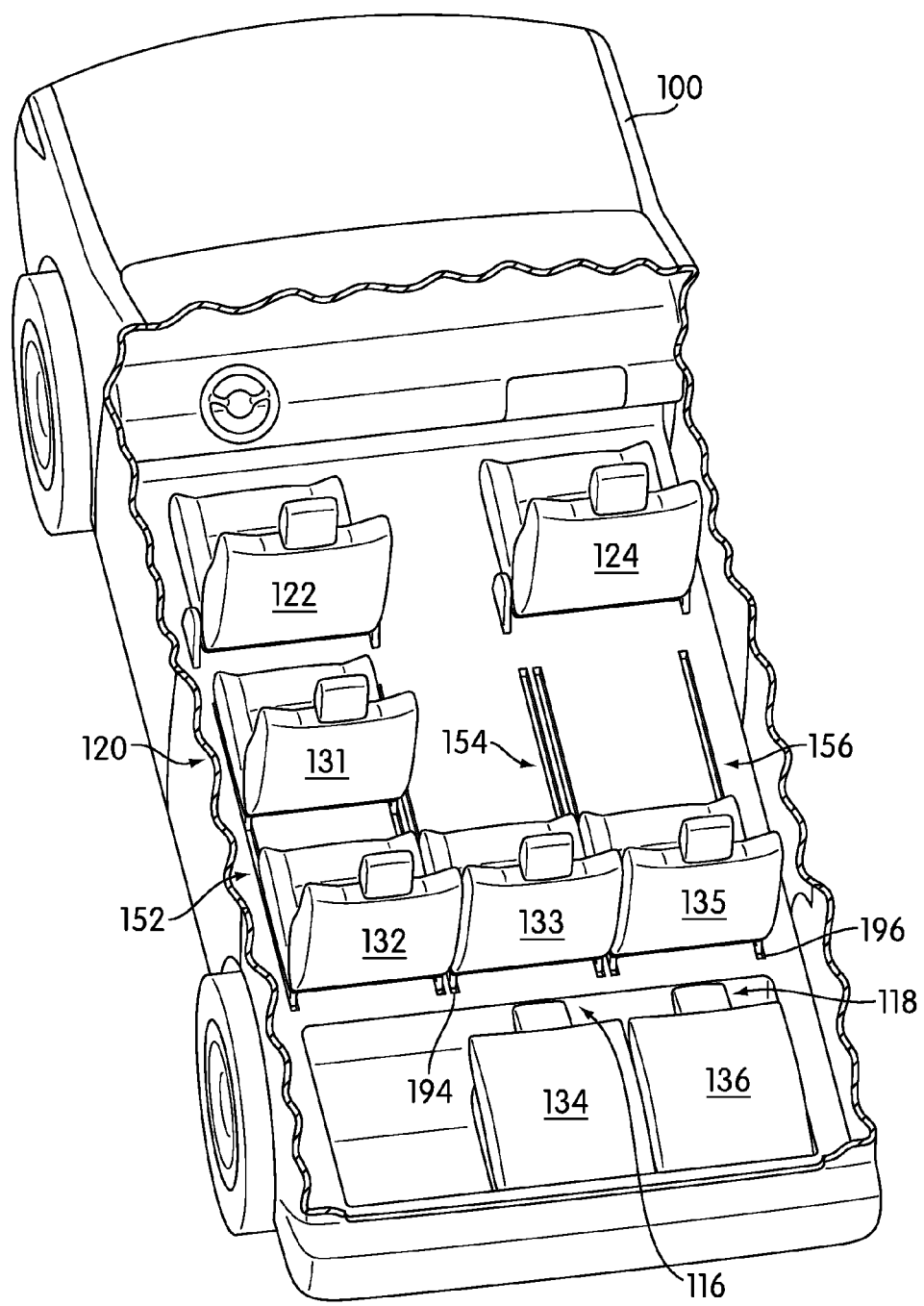
FIG. 30 is a rear isometric view of an embodiment of a seating configuration for a vehicle seating system, in which two third row seats are in a stored position and two second row seats are moved rearwardly to a third row position.

FIG. 30 illustrates an embodiment of a configuration for vehicle seating system 120 that provides increased spacing behind front passenger seat 124. In this case, first seat 131 and second seat 132 are deployed on first set of rails 152. In addition, third seat 133 is deployed in rearward portion 194 of second set of rails 154 and fifth seat 135 is deployed in rearward portion 196 of third set of rails 156. Additionally, fourth seat 134 and sixth seat 136 are disposed in stored positions within second storage space 116 and third storage space 118, respectively.

Figure 31:
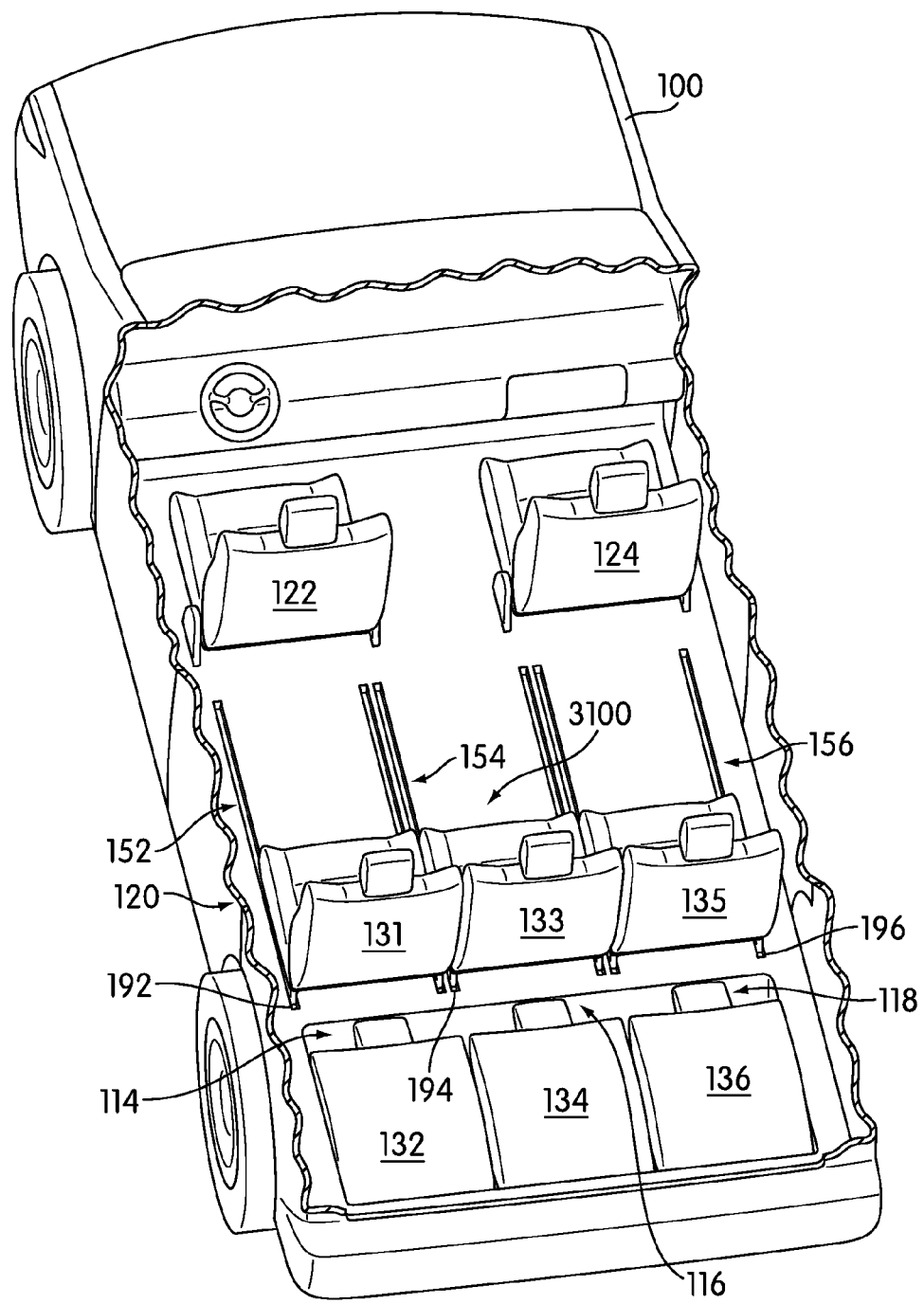
FIG. 31 is a rear isometric view of an embodiment of a seating configuration for a vehicle seating system, in which three third row seats are in a stored position and three second row seats are moved rearwardly.

FIG. 31 illustrates an embodiment of a living room like configuration for vehicle seating system 120. In this case, second seat 132, fourth seat 134 and sixth seat 136 are all in stored positions in first storage space 114, second storage space 116 and third storage space 118, respectively. Additionally, first seat 131, third seat 133 and fifth seat 135 are disposed on first set of rails 152, second set of rails 154 and third set of rails 156, respectively. Moreover, first seat 131, third seat 133 and fifth seat 135 are disposed in rearward portion 192, rearward portion 194 and rearward portion 196, respectively. This configuration provides intermediate space 3100 behind driver seat 122 and front passenger seat 124.

Figure 32:
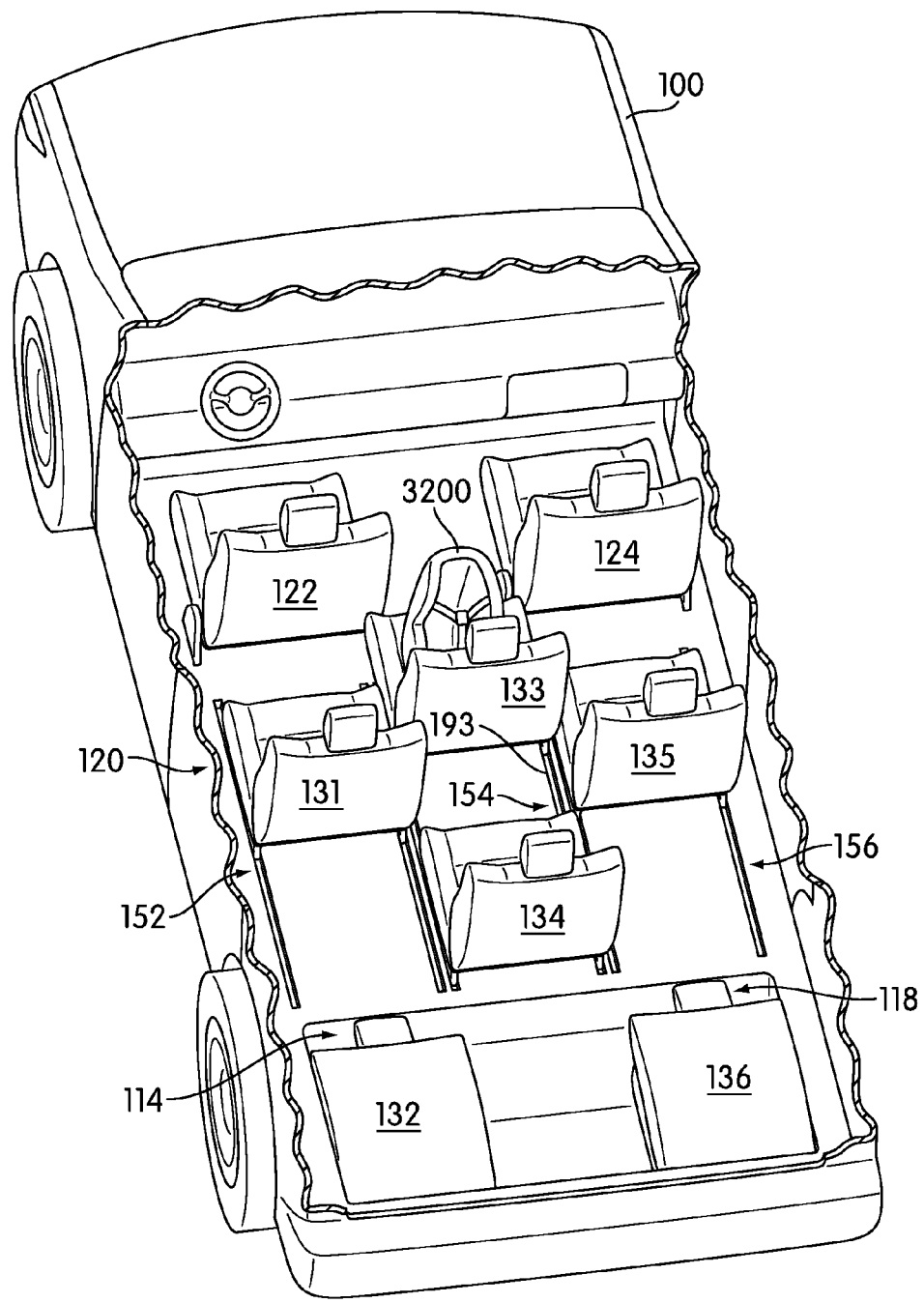
FIG. 32 is a rear isometric view of an embodiment of a seating configuration for a vehicle seating system, in which two third row seats are in stored positions and one second row seat and one third row seat are in staggered positions.

FIG. 32 illustrates an embodiment of a staggered configuration for vehicle seating system 120. In this case, first seat 131, third seat 133, fourth seat 134 and fifth seat 135 are all deployed on first set of rails 152, second set of rails 154 and third set of rails 156, respectively. In addition, second seat 132 and sixth seat 136 are in stored positions in first storage space 114 and third storage space 118, respectively. Moreover, third seat 133 has been moved to the very end of forward portion 193 so that third seat 133 is disposed near driver seat 122 and front passenger seat 124. In this case, car seat 3200 is placed on third seat 133. This arrangement allows a driver or front side passenger direct access to car seat 3200.

Figure 33:
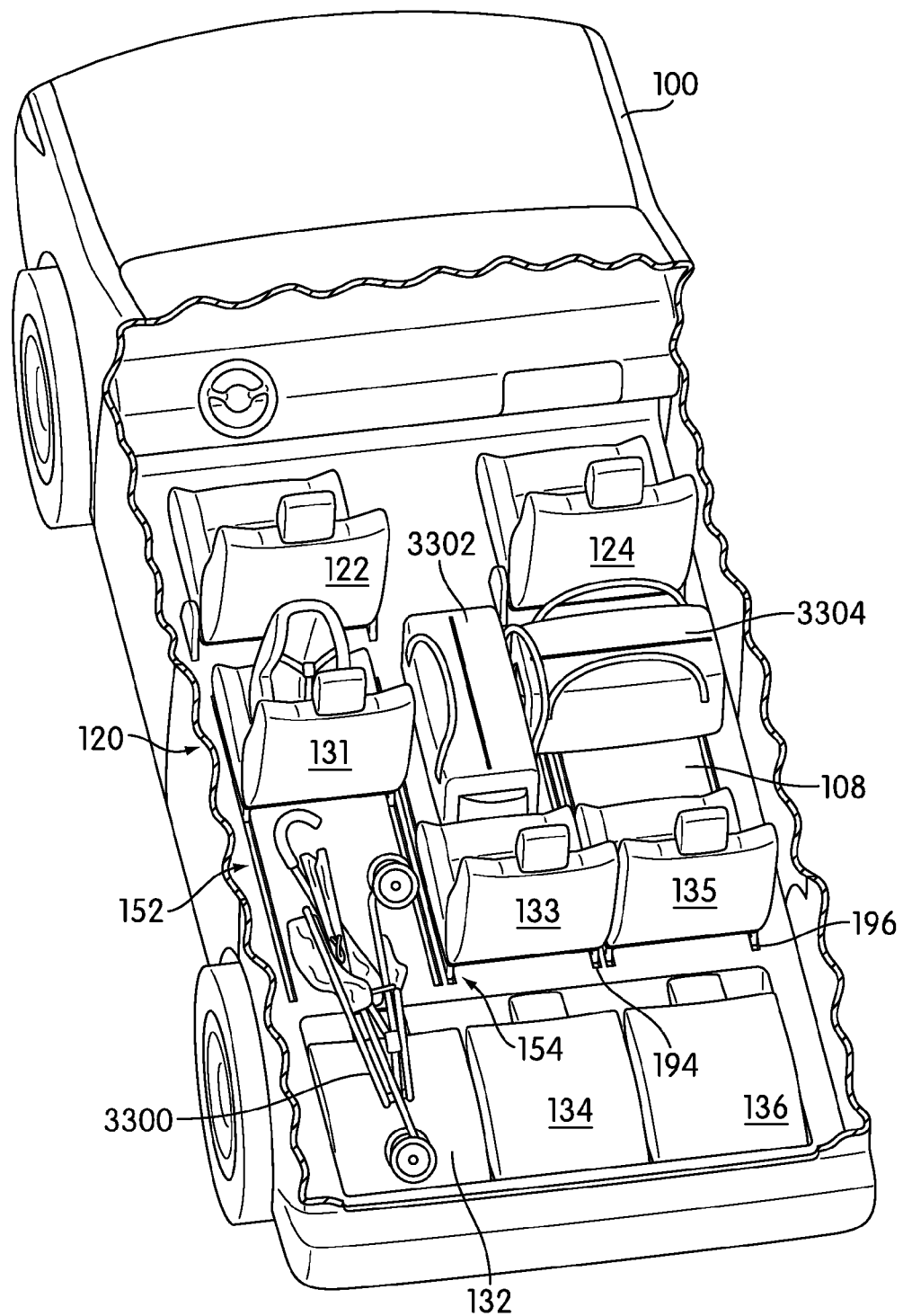
FIG. 33 is a rear isometric view of an embodiment of a seating configuration for a vehicle seating system, in which three third row seats are in stored positions, one second row seat is moved forwardly and two second row seats are moved rearwardly.

FIG. 33 illustrates another embodiment of a configuration for vehicle seating system 120. In this case, second seat 132, fourth seat 134 and sixth seat 136 are all in stored positions. In addition, first seat 131 is disposed behind driver seat 122, while third seat 133 and fifth seat 135 are disposed in rearward portion 194 and rearward portion 196, respectively. This arrangement provides for two distinct locations on floor 108 for storing items. In this case, stroller 3300 is stored behind first seat 131, while first bag 3302 and second bag 3304 are stored in front of third seat 133 and fifth seat 135, respectively.

Figure 34:
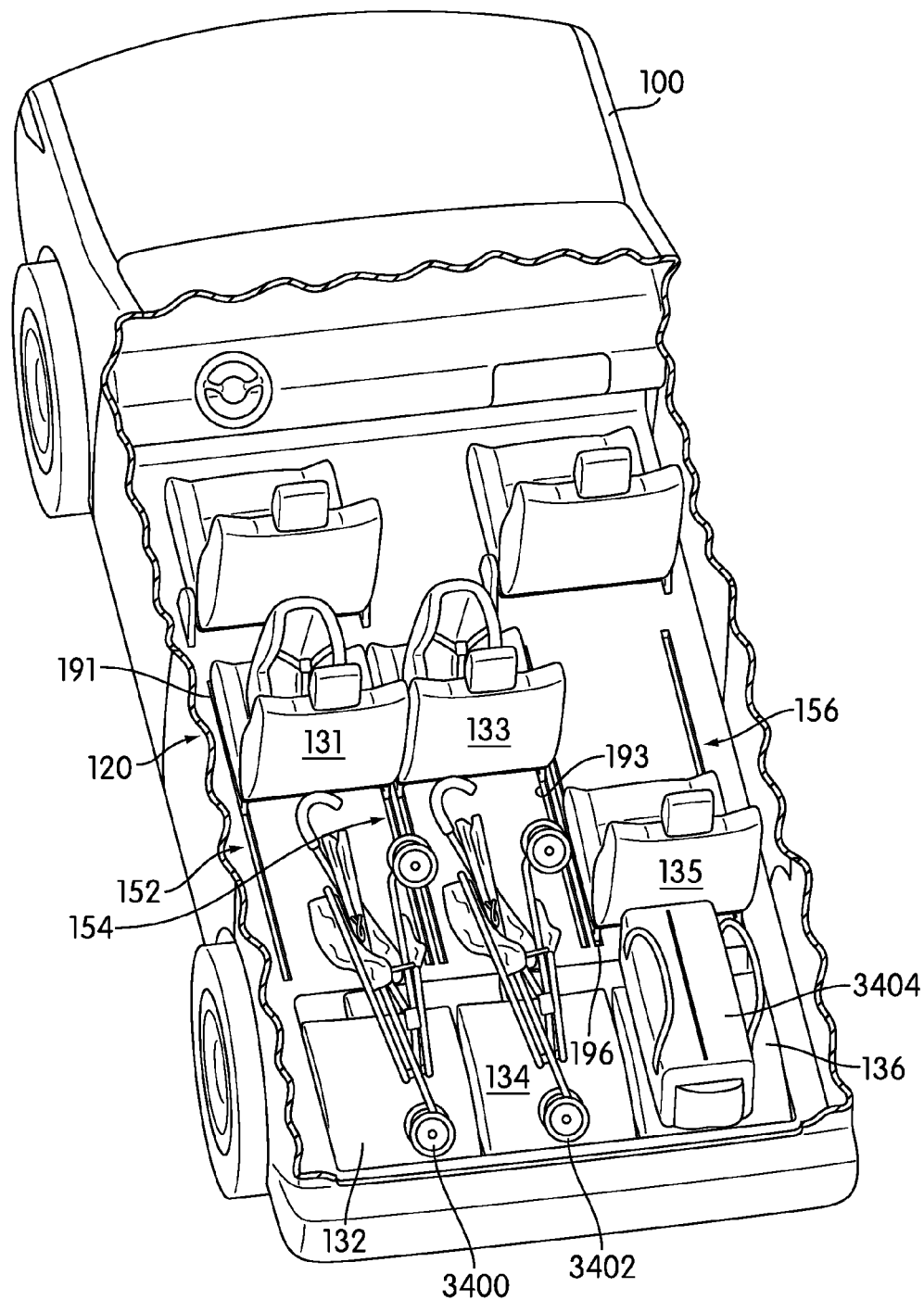
FIG. 34 is a rear isometric view of an embodiment of a seating configuration for a vehicle seating system, in which three third row seats are in stored positions, two second row seats are moved forwardly and one second row seat is moved rearwardly.
Figure 35:
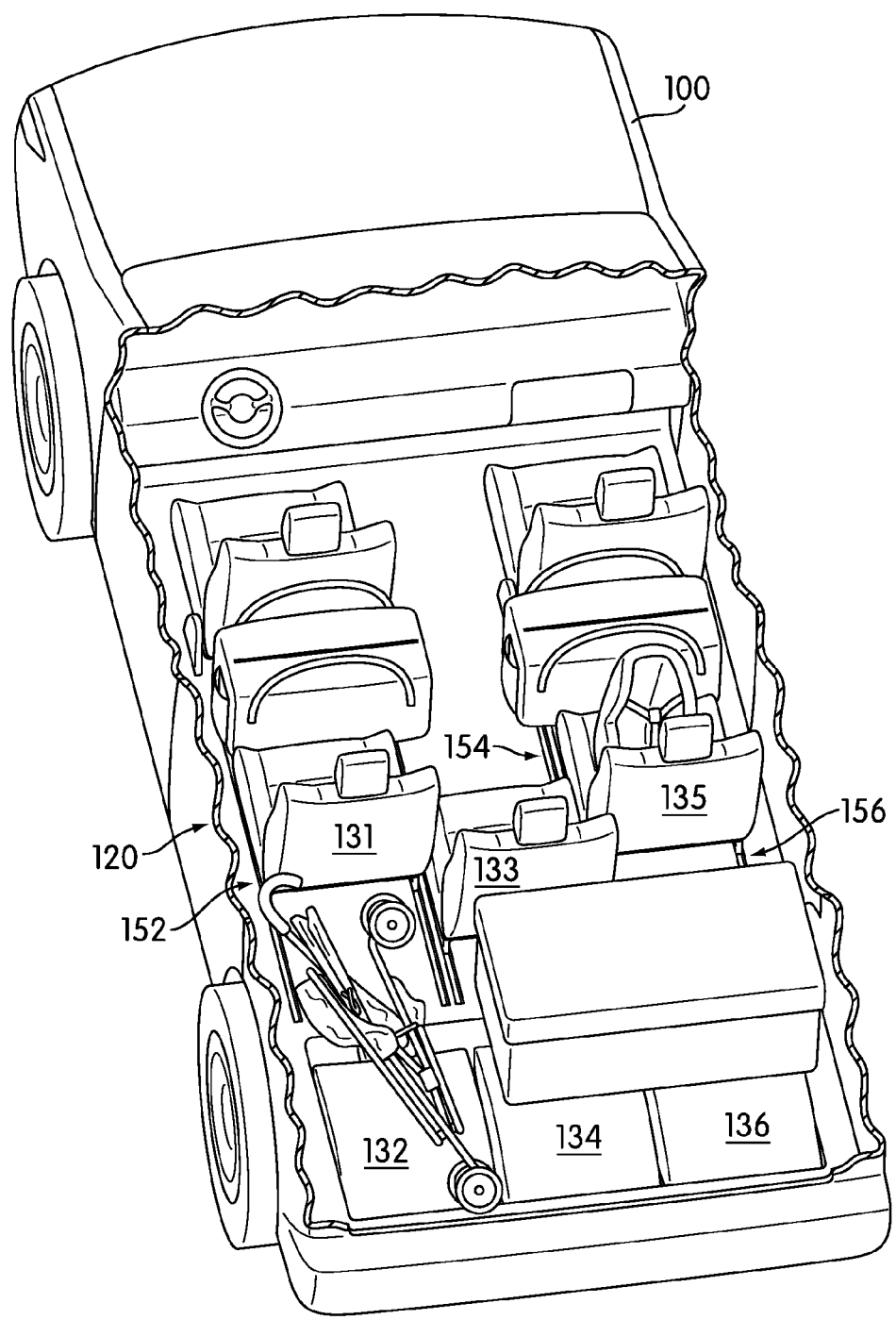
FIG. 35 is a rear isometric view of an embodiment of a seating configuration for a vehicle seating system, in which three third row seats are in stored positions, two second row seats are moved forwardly and one second row seat is in a staggered position between the two front row seats.
Figure 36:
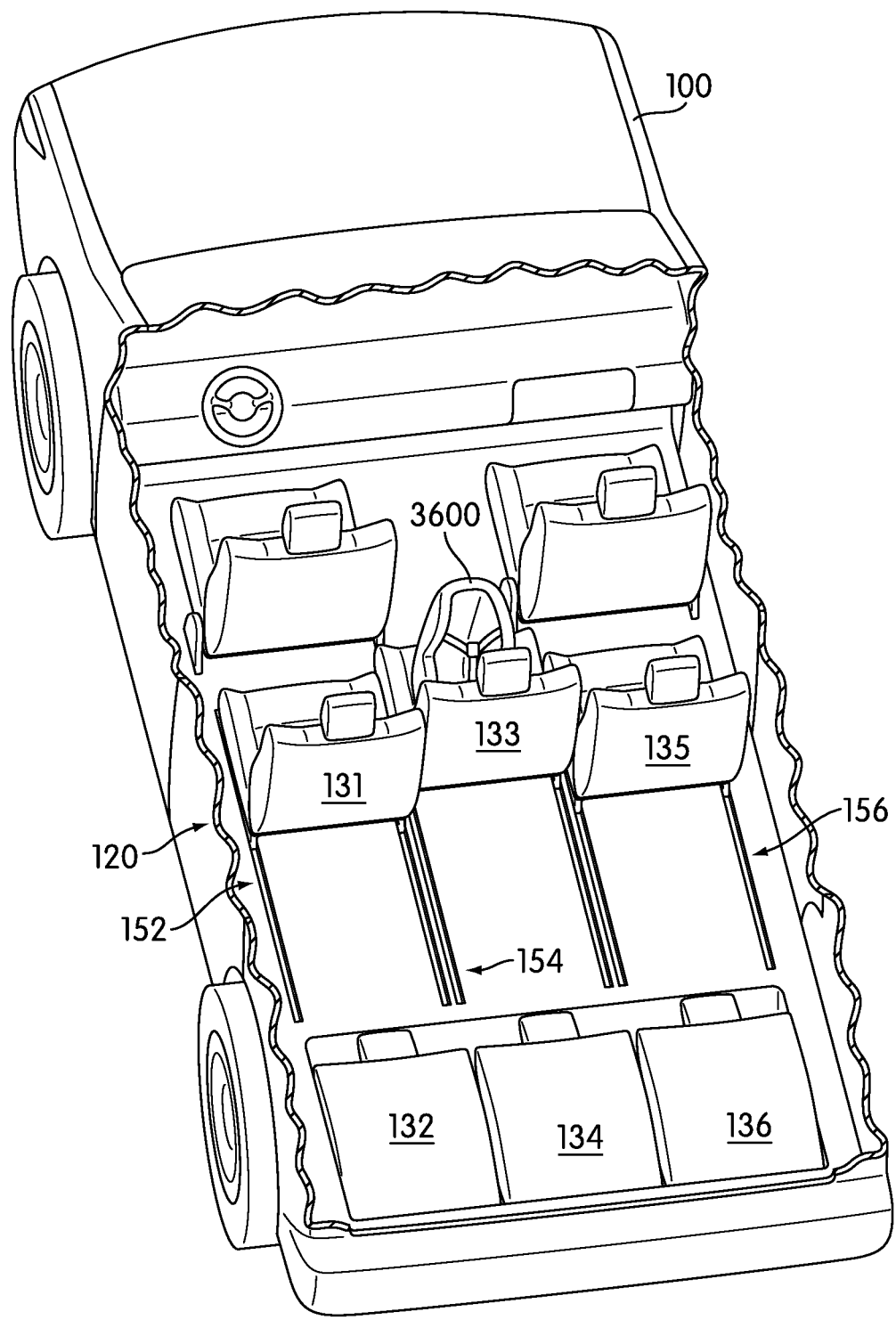
FIG. 36 is a rear isometric view of an embodiment of a seating configuration for a vehicle seating system, in which three third row seats are in stored positions and three second row seats are moved forwardly such that one of the second row seats is moved to a staggered position that is slightly forwards of the remaining two second row seats.
Figure 37:
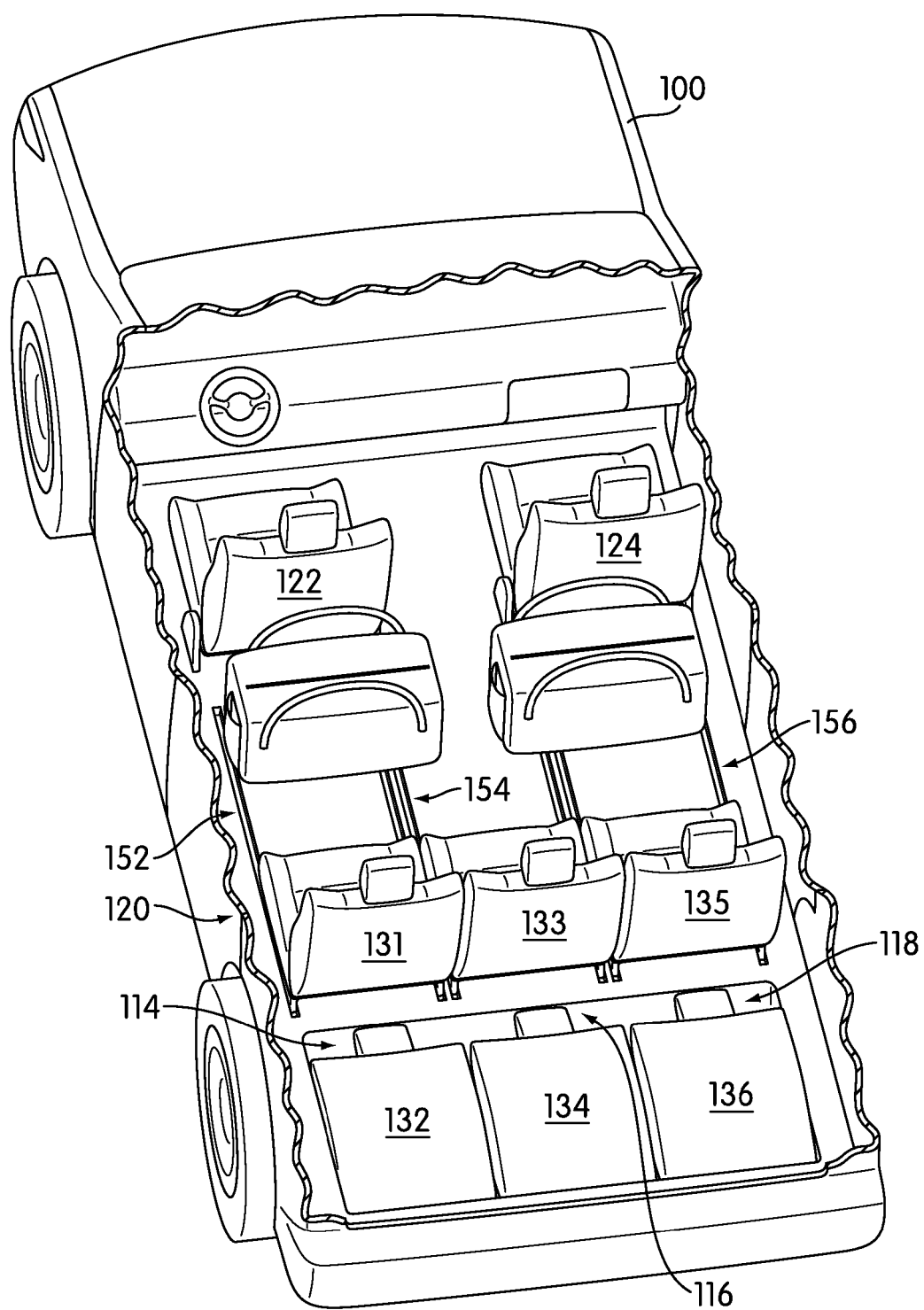
FIG. 37 is a rear isometric view of an embodiment of a seating configuration for a vehicle seating system, in which three third row seats are in stored positions and three second row seats are moved rearwardly.
Figure 38:
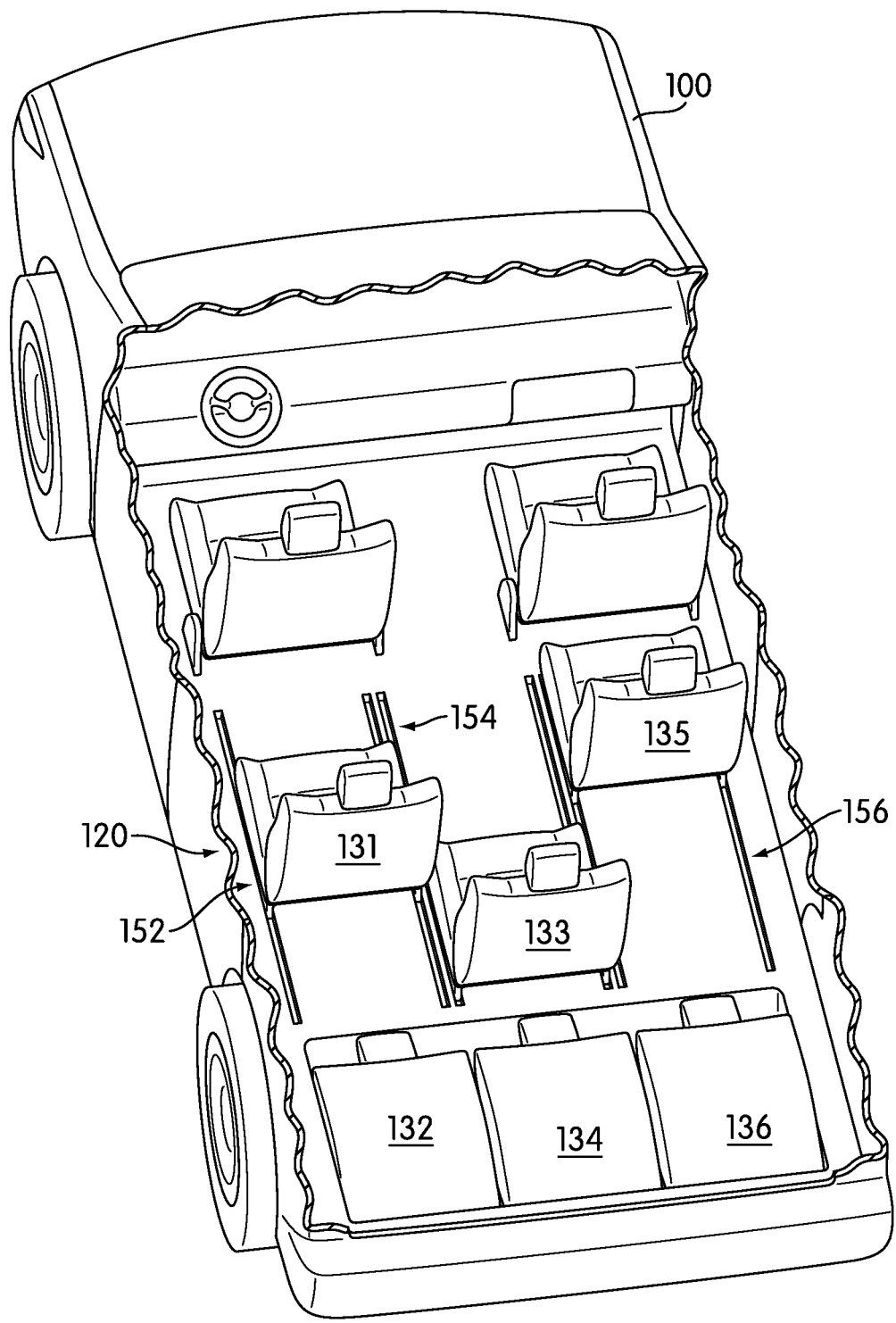
FIG. 38 is a rear isometric view of an embodiment of a seating configuration for a vehicle seating system, in which three third row seats are in stored positions and three second row seats are arranged in a staggered configuration.

FIG. 34 illustrates another embodiment of a configuration for vehicle seating system 120. In this case, second seat 132 and fourth seat 134 are in stored positions. First seat 131 and third seat 133 are in deployed positions in forward portion 191 of first set of rails 152 and forward portion 193 of second set of rails 154, respectively. In contrast, fifth seat 135 is in a deployed position and located in rearward portion 196 of third set of rails 156. In this case, first stroller 3400 and second stroller 3402 may be stored behind first seat 131 and third seat 133, respectively. In addition, bag 3404 may be stored behind fifth seat 135.

FIGS. 35 through 38 illustrate various embodiments of configurations for vehicle seating system 120 in which second seat 132, fourth seat 134 and sixth seat 136 are all in stored positions. Referring to FIGS. 35 through 38, first seat 131, third seat 133 and fifth seat 135 may be disposed at varying locations of first set of rails 152, second set of rails 154 and third set of rails 156 in order to accommodate various cargo items. One example, shown in FIG. 35, includes first seat 131, third seat 133 and fifth seat 135 staggered on first set of rails 152, second set of rails 154 and third set of rails 156, respectively. As another example, shown in FIG. 36, third seat 133 may be disposed in a forward most position of second set of rails 154 to provide a driver or passenger access to baby seat 3600. As still another example, shown in FIG. 37, first seat 131, third seat 133 and sixth seat 136 may be disposed directly adjacent to first storage space 114, second storage space 116 and third storage space 118 to provide room for storing cargo behind driver seat 122 and front passenger seat 124. In still another example, shown in FIG. 38, first seat 131, third seat 133 and fifth seat 135 may be staggered on first set of rails 152, second set of rails 154 and third set of rails 156 in order to provide each occupant with increased space to spread out.

Figure 39:
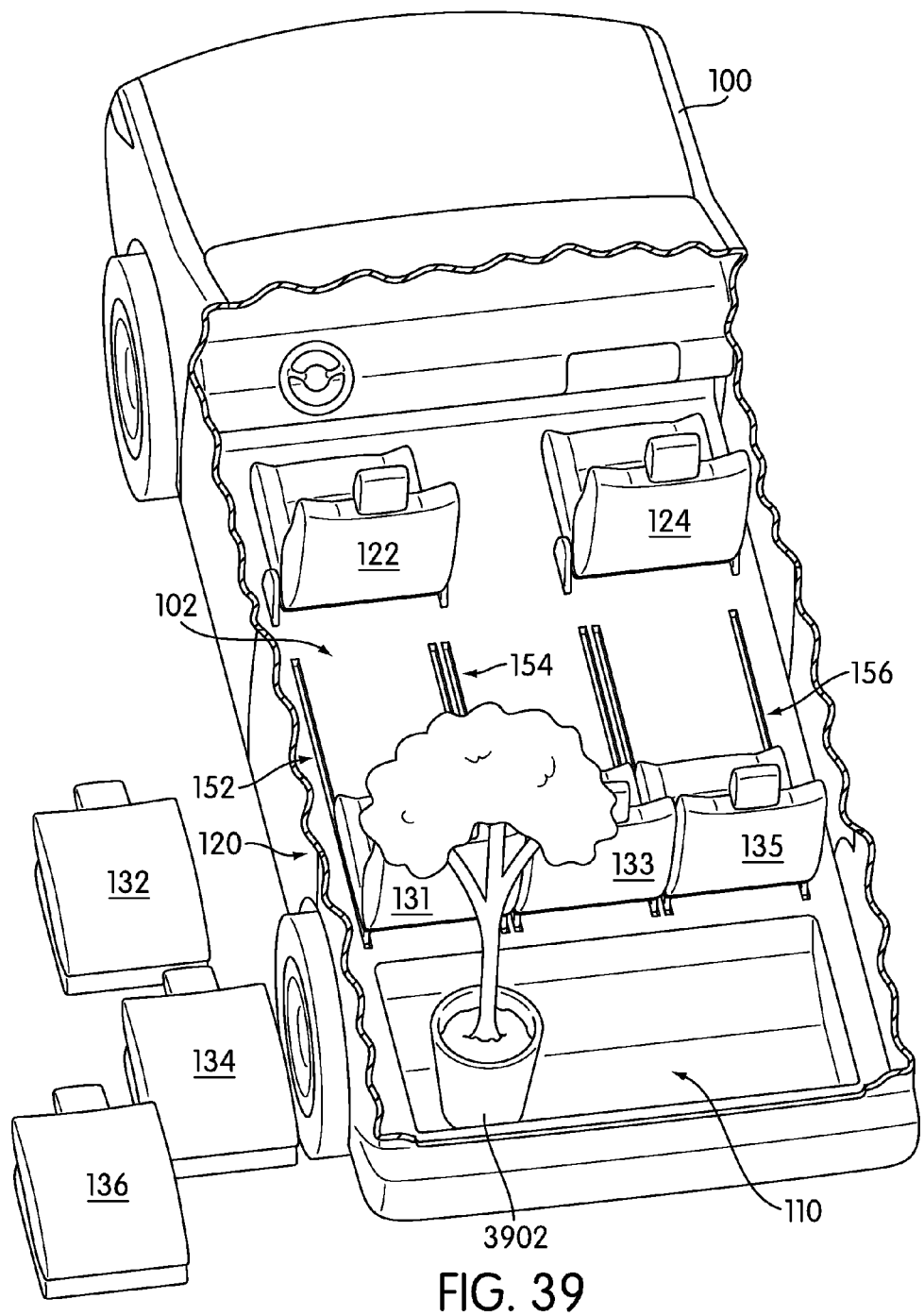
FIG. 39 is a rear isometric view of an embodiment of a seating configuration for a vehicle seating system, in which three third row seats have been removed from the motor vehicle and where three second row seats are moved rearwardly to third row positions.

FIG. 39 illustrates an embodiment of a configuration for vehicle seating system 120 that accommodates the storage of tall items within interior portion 102. In this case, second seat 132, fourth seat 134 and sixth seat 136 have all been removed from motor vehicle 100. In addition, first seat 131, third seat 133 and sixth seat 136 are in deployed positions on first set of rails 152, second set of rails 154 and third set of rails 156. This arrangement provides extra clearance to fit tree 3902 by placing tree 3902 within storage region 110 while also maintaining increased spacing in front of first seat 131, third seat 133 and fifth seat 135.

Figure 40:
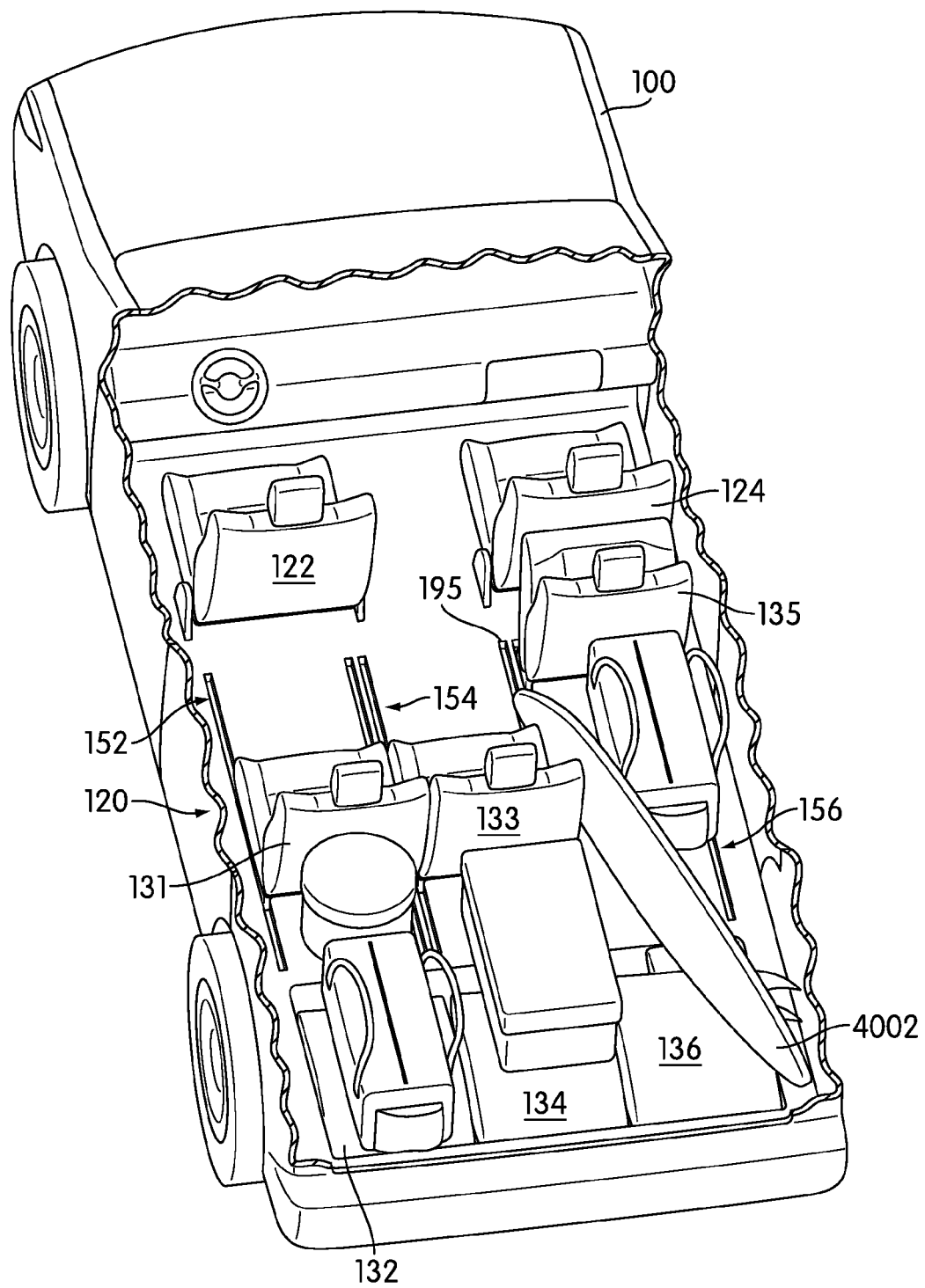
FIG. 40 is a rear isometric view of an embodiment of a seating configuration for a vehicle seating system, in which three third row seats are in stored positions, two second row seats are moved to a midway location along their respective sets of rails and one second row seat is in a folded deployed position and moved forwardly.
Figure 41:
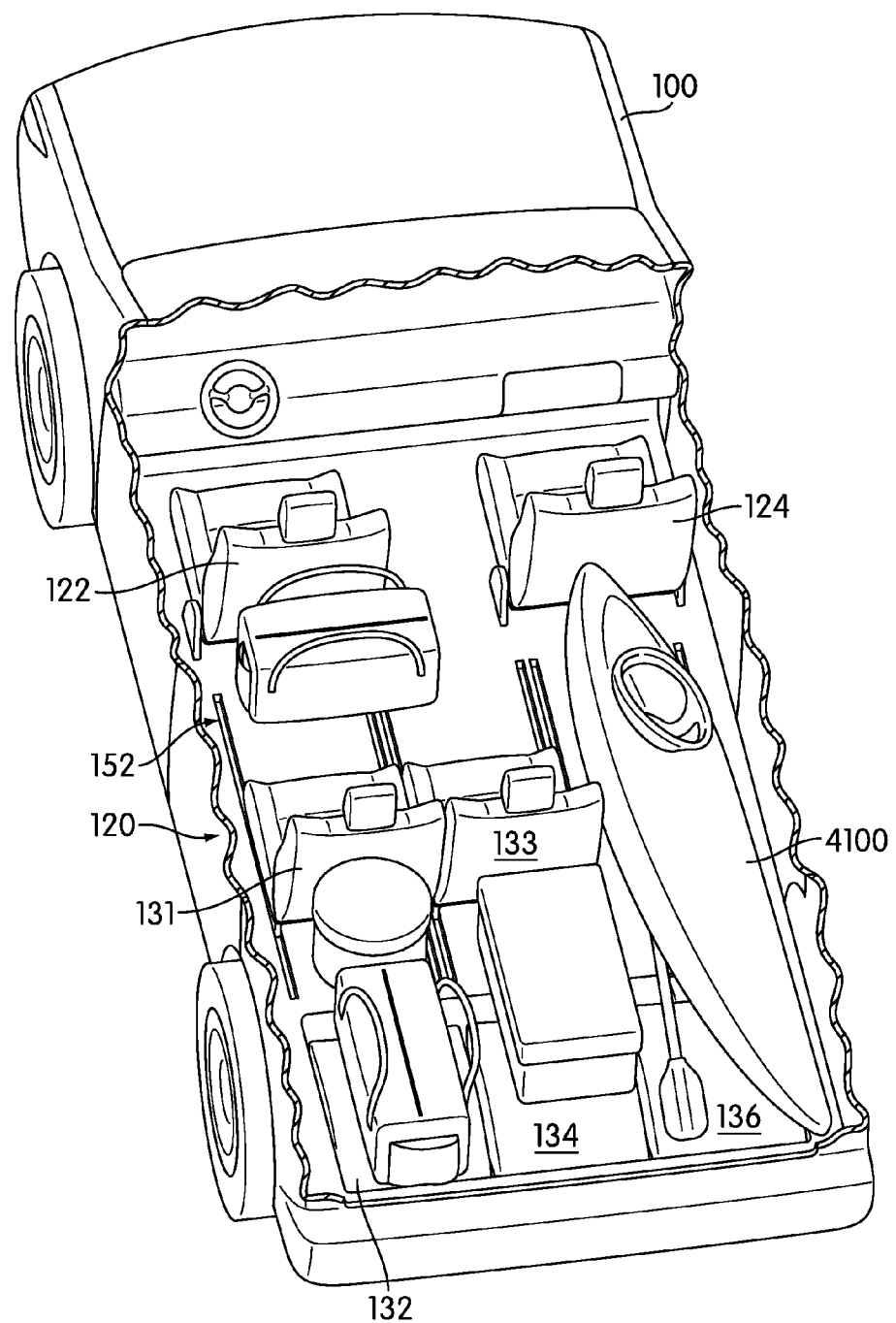
FIG. 41 is a rear isometric view of an embodiment of a seating configuration for a vehicle seating system, in which three third row seats are in stored positions, two second row seats are moved to a midway location along their respective sets of rails and one second row seat is removed from the motor vehicle.

FIG. 40 illustrates another embodiment of a configuration for vehicle seating system 120. In this case, first seat 131, third seat 133 and fifth seat 135 are in deployed positions on first set of rails 152, second set of rails 154 and third set of rails 156. Furthermore, second seat 132, fourth seat 134 and sixth seat 136 are all in stored positions. To accommodate surfboard 4002, fifth seat 135 is disposed in a folded deployed position and moved to a forward most position of forward portion 195 on third set of rails 156. A similar configuration, illustrated in FIG. 41, includes similar positions for first seat 131, second seat 132, third seat 133, fourth seat 134 and sixth seat 136. In contrast to the previous configuration, however, fifth seat 135 has been removed from motor vehicle 100 in the current configuration to accommodate canoe 4100 behind front passenger seat 124.

Figure 42:
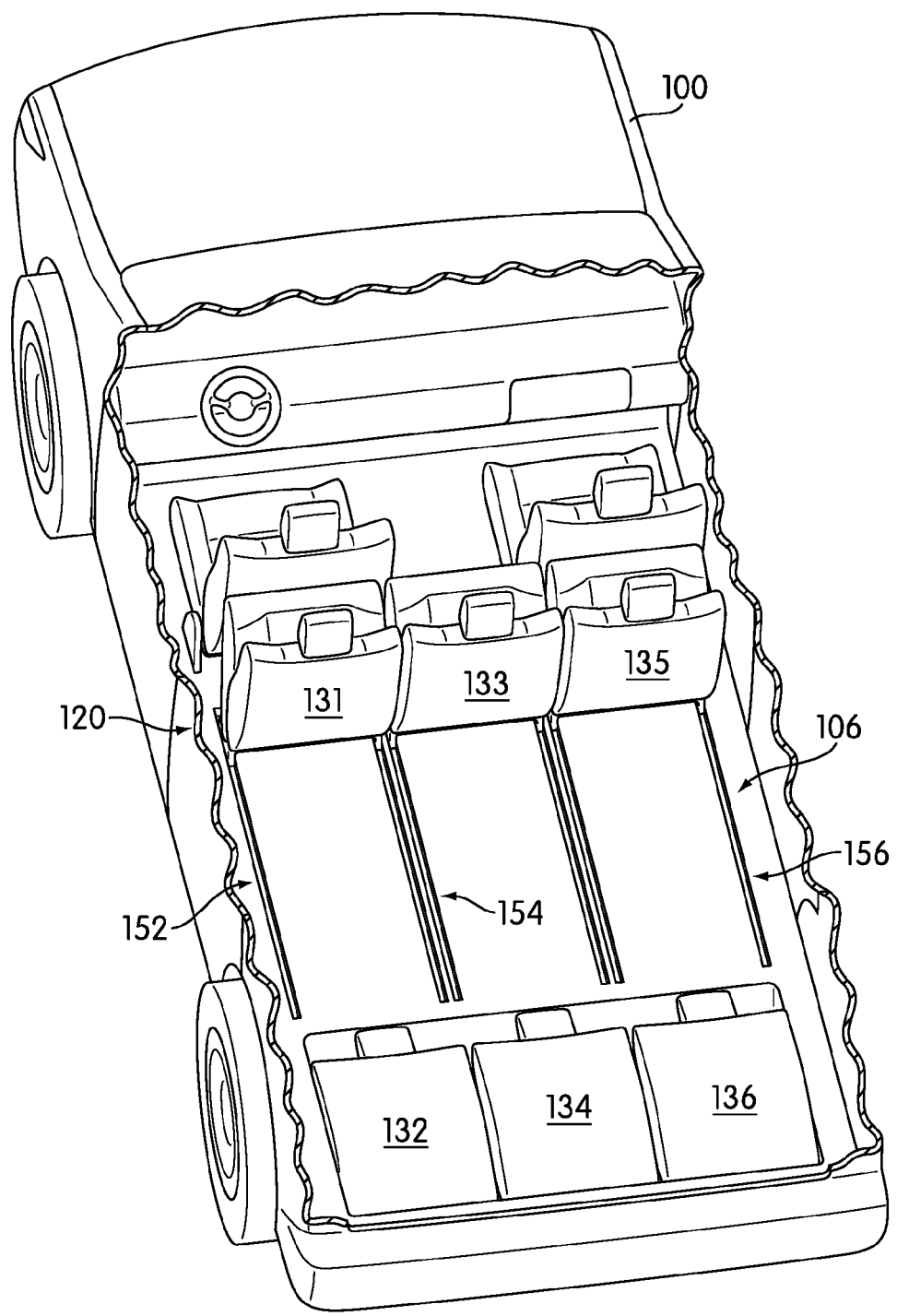
FIG. 42 is a rear isometric view of an embodiment of a seating configuration for a vehicle seating system, in which three third row seats are in stored positions and where three second row seats are in folded deployed positions and moved forwardly.
Figure 43:
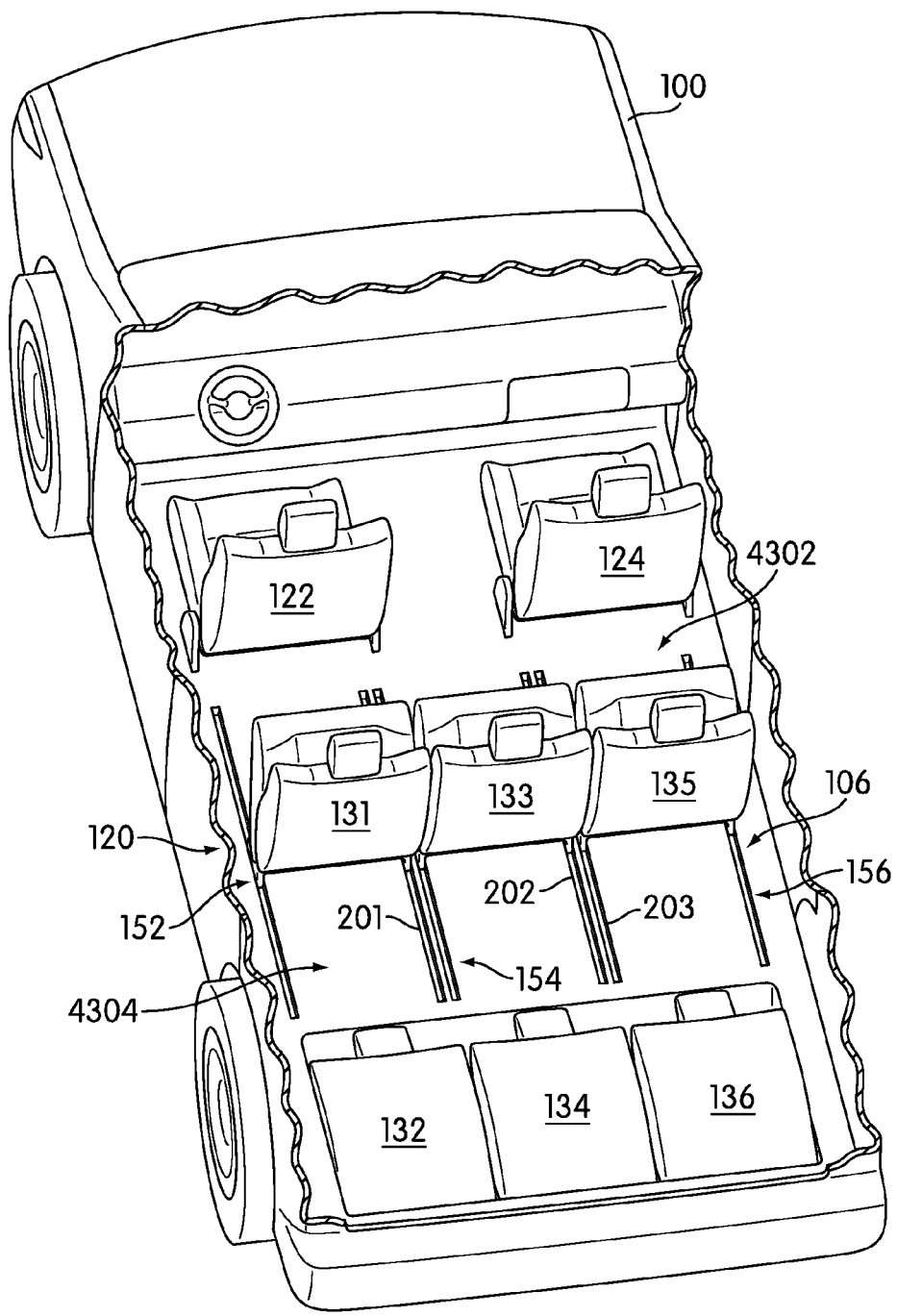
FIG. 43 is a rear isometric view of an embodiment of a seating configuration for a vehicle seating system, in which three third row seats are in stored positions and three second row seats are in folded deployed positions.

FIGS. 42 and 43 illustrate embodiments of various configurations for vehicle seating system 120. Referring to FIGS. 42 and 43, second seat 132, fourth seat 134 and sixth seat 136 are all in stored positions. Furthermore, first seat 131, third seat 133 and fifth seat 135 are in folded deployed positions on first set of rails 152, second set of rails 154 and third set of rails 156. In the configuration illustrated in FIG. 42, first seat 131, third seat 133 and fifth seat 135 are disposed in a single row that is disposed directly adjacent to driver seat 122 and front passenger seat 124. This arrangement provides for increased space in rearward interior portion 106. In the configuration illustrated in FIG. 43, first seat 131, third seat 133 and fifth seat 135 are disposed within center portion 201 of first set of rails 152, center portion 202 of second set of rails 154 and center portion 203 of third set of rails 156, respectively. This arrangement provides for a division of rearward interior portion 106 into first region 4302 and second region 4304. In other words, first seat 131, third seat 133 and fifth seat 135 may act as a divider within rearward interior portion 106.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:
1. A motor vehicle, comprising:
an interior portion having a longitudinal direction extending from a forward portion to a rearward portion of the motor vehicle and a lateral direction extending from a first side portion to a second side portion of the motor vehicle;

a driver seat disposed in the forward portion of the motor vehicle;

the interior portion further comprising a first set of rails, a second set of rails, and a third set of rails each mounted to a floor of the motor vehicle and generally extending side-by-side in the longitudinal direction, wherein the second set of rails is disposed between the first set of rails and the third set of rails;

a first seat, a second seat, a third seat, a fourth seat, a fifth seat, and a sixth seat;

a first storage space disposed within the floor and in the rearward portion of the motor vehicle, rearwardly of the first set of rails;

a second storage space disposed within the floor and in the rearward portion of the motor vehicle, rearwardly of the second set of rails;

each of the first seat, second seat, third seat, fourth seat, fifth seat, and sixth seat having a deployed position where the respective seat is slidably mounted to one of the first set of rails, the second set of rails, and the third set of rails;

each of the first seat, second seat, third seat, fourth seat, fifth seat, and sixth seat having a stored position where the respective seat is disposed in one of the first storage space the second storage space, and the third storage space without being mounted to any one of the first, second, and third set of rails;

each of the first seat, second seat, third seat, fourth seat, fifth seat, and sixth seat having a folded deployed position where the respective seat is slidably mounted to one of the first set of rails, the second set of rails, and the third set of rails and a seat cushion of the respective seat is folded up away from the respective set of rails and against a seat back of the respective seat;

wherein the floor is continuously flat from the driver seat to the first storage space; and wherein the motor vehicle has a staggered seating configuration in which the first seat is slidably mounted to the first set of rails, the second seat is slidably mounted to the second set of rails, the third seat is slidably mounted to the third set of rails, and the fourth seat is slidably mounted to the second set of rails in a position behind the second seat, wherein the second seat is disposed in a position that is closer to the forward portion of the motor vehicle than where the first, third, and fourth seats are positioned and the fourth seat is disposed in a position that is closer to the rearward portion of the motor vehicle than where the first, second, and third seats are positioned.

2. The motor vehicle according to claim 1, wherein the first storage space has a size and shape sufficient to receive the second seat when the first seat is in the deployed position and the second storage space has a size and shape sufficient to receive the fourth seat when the third seat is in the deployed position.

3. The motor vehicle according to claim 1, wherein the first set of rails has a length that is the same or longer than the combined lengths of the first seat and the second seat.

4. The motor vehicle according to claim 1, wherein the floor has a floor section with a length defined between the driver seat and the first storage space and the first set of rails extend along a majority of the length of the floor section.

5. The motor vehicle according to claim 1, wherein the fifth seat and sixth seat are each in the stored position when the motor vehicle is in the staggered seating configuration.

6. The motor vehicle according to claim 5, wherein, in the staggered seating configuration, a first space is defined between a first lateral side of the fourth seat and the first side portion of the motor vehicle and a second space is defined between a second lateral side of the fourth seat and the second side portion of the motor vehicle.

7. A motor vehicle, comprising:

an interior portion having a longitudinal direction extending from a forward portion to a rearward portion of the motor vehicle and a lateral direction extending from first side portion to a second side portion of the motor vehicle;

a driver seat disposed in the forward portion of the motor vehicle;

a first seat, a second seat, a third seat, a fourth seat, a fifth seat, and a sixth seat;

the interior portion comprising a first set of rails, a second set of rails, and a third set of rails each mounted to a floor of the motor vehicle and generally extending side-by-side in the longitudinal direction, wherein the second set of rails is disposed between the first set of rails and the third set of rails;

each of the first set of rails, the second set of rails, and the third set of rails beginning behind a rear side of the driver seat and extending to and terminating at a point between the rear side of the driver seat and the rear portion of the motor vehicle;

a first storage space disposed within the floor and in the rearward portion of the motor vehicle, rearwardly of the first set of rails;

a second storage space disposed within the floor and in the rearward portion of the motor vehicle, rearwardly of the second set of rails;

a third storage space disposed within the floor and in a rearward portion of the motor vehicle, rearwardly of the third set of rails;

each of the first seat, second seat, third seat, fourth seat, fifth seat, and sixth seat having a deployed position where the respective seat is slidably mounted to one of the first set of rails, the second set of rails, and the third set of rails;

each of the first seat, second seat, third seat, fourth seat, fifth seat, and sixth seat having a stored position where the respective seat is disposed in one of the first storage space, the second storage space, and the third storage space without being mounted to any one of the first, second, and third set of rails; and wherein the motor vehicle has a first seating configuration in which the first seat is slidably mounted to the first set of rails, the second seat is slidably mounted to the second set of rails, the third seat is slidably mounted to the third set of rails, and the fourth seat is slidably mounted to the first set of rails in a position behind the first seat, wherein the second seat, third seat, and fourth seat are aligned in a row that is closer to the rearward portion of the motor vehicle than the first seat such that a first space is defined between a forward end of the fourth seat and a rearward end of a front passenger seat, and wherein the first space is further defined between a lateral side of the first seat and the second side portion of the motor vehicle.

8. The motor vehicle according to claim 7, wherein the fifth seat is in the stored position in the first seating configuration.

9. The motor vehicle according to claim 8, wherein the sixth seat is in the stored position when the motor vehicle is in the first seating configuration.

10. The motor vehicle according to claim 7, further comprising a second seating configuration in which the first seat is slidably mounted to the first set of rails, the second seat is slidably mounted to the second set of rails, the third seat is slidably mounted to the third set of rails, the fourth seat is slidably mounted to the first set of rails in a position behind the first seat, and the fifth seat is slidably mounted to the third set of rails in a position behind the third seat, wherein the second seat, fourth seat, and fifth seat are aligned in a row that is closer to the rearward portion of the motor vehicle than the first seat and the third seat.

11. The motor vehicle according to claim 10, wherein, in the second seating configuration, a first space is defined between a lateral side of the first seat and a lateral side of the third seat.

12. The motor vehicle according to claim 7, further comprising a second seating configuration in which the first seat is slidably mounted to the first set of rails, the second seat is slidably mounted to the second set of rails, the third seat is slidably mounted to the third set of rails, the fourth seat is slidably mounted to the first set of rails, and the fifth seat is slidably mounted to the second set of rails, wherein the first seat is aligned with the second seat to form a row in a position that is closer toward the forward portion of the motor vehicle than the third seat, fourth seat, and fifth seat are positioned, and wherein the third seat, fourth seat, and fifth seat are aligned to form a row.

13. The motor vehicle according to claim 12, wherein, in the second seating configuration, the sixth seat is disposed in one of the first storage space, second storage space, and third storage space.

14. A motor vehicle, comprising:
an interior portion having a longitudinal direction extending from a forward portion to a rearward portion of the motor vehicle and a lateral direction extending from first side portion to a second side portion of the motor vehicle;
a storage region disposed in the rearward portion of the motor vehicle;
a first seat, a second seat, a third seat, a fourth seat, a fifth seat, and a sixth seat;
a driver seat and a passenger seat both disposed in the forward portion of the motor vehicle, wherein the driver seat is aligned with the front passenger seat;
the interior portion further comprising a floor having a floor section with a length defined between the driver seat and the storage region;
the interior portion further comprising a first set of rails, a second set of rails, and a third set of rails each mounted to the floor of the motor vehicle and generally extending side-by-side in the longitudinal direction along a majority of the length of the floor section, wherein the second set of rails is disposed between the first set of rails and the third set of rails;
each of the first seat, second seat, third seat, fourth seat, fifth seat, and sixth seat having a stored position where the respective seat is disposed in the storage region without being mounted to any one of the first, second, and third set of rails;
each of the first seat, second seat, third seat, fourth seat, fifth seat, and sixth seat having a deployed position where the seat is mounted to one of the first set of rails, the second set of rails, and the third set of rails;
each of the first seat, second seat, third seat, fourth seat, fifth seat, and sixth seat having a folded deployed position where a seat cushion of the respective seat is folded up away from one of the first set of rails, second set of rails, and third set of rails and against a seat back of the corresponding seat while simultaneously being slidably mounted to one of the first set of rails, second set of rails, and third set of rails;
wherein the motor vehicle has a first seating configuration in which the first seat, second seat, and third seat are each in the folded deployed position, and the fourth seat, fifth seat, and sixth seat are in the stored position; and
wherein the motor vehicle has a second seating configuration in which the first seat is slidably mounted to the first set of rails, the second seat is slidably mounted to the second set of rails, and the third seat is slidably mounted to the third set of rails, wherein the first seat is aligned with the second seat to form a row in a position that is closer to the forward portion of the motor vehicle than the third seat is positioned such that a first space is defined between a forward end of the third seat and a rearward end of the front passenger seat, and wherein the first space is further defined between a lateral side of the second seat and the second side portion of the motor vehicle.

15. The motor vehicle according to claim 14, wherein, in the first seating configuration, the first seat, second seat, and third seat are disposed at a forward end of the first set of rails, second set of rails, and third set of rails, respectively.

16. The motor vehicle according to claim 15, further comprising a second seating configuration in which the first seat is slidably mounted to the first set of rails, the second seat is slidably mounted to the second set of rails, and the third seat is slidably mounted to the third set of rails, and wherein the second seat is disposed in a position that is closer toward the forward portion of the motor vehicle than where the first seat and the third seat are positioned.

17. The motor vehicle according to claim 16, wherein the fourth seat, fifth seat, and sixth seat are in the stored position in the second seating configuration.

18. The motor vehicle according to claim 14 further comprising a second seating configuration in which four seats of the first seat, second seat, third seat, fourth seat, fifth seat, and sixth seat are in the deployed position and wherein two seats of the first seat, second seat, third seat, fourth seat, fifth seat, and sixth seat are in the stored position.

19. The motor vehicle according to claim 18, further comprising a third seating configuration in which three seats of the first seat, second seat, third seat, fourth seat, fifth seat, and sixth seat are in the deployed position and wherein three seats of the first seat, second seat, third seat, fourth seat, fifth seat, and sixth seat are in the stored position.

20. The motor vehicle according to claim 14, wherein the first set of rails is disposed behind the driver seat and the third set of rails is disposed behind a front passenger seats.

21. The motor vehicle according to claim 14, wherein the first set of rails has a length that is the same or longer than the combined lengths of the first seat and the second seat.

22. The motor vehicle according to claim 21, further comprising a second seating configuration in which the first seat is disposed on the first set of rails, the third seat is disposed on the second set of rails, and the fifth seat is disposed on the third set of rails, and wherein the first seat is staggered from the third seat and wherein the third seat is staggered from the fifth seat.

23. The motor vehicle according to claim 14, further comprising a second seating configuration in which three seats of the first seat, second seat, third seat, fourth seat, fifth seat, and sixth seat are in the deployed position and wherein three seats of the first seat, second seat, third seat, fourth seat, fifth seat, and sixth seat are disposed outside of the motor vehicle.

24. The motor vehicle according to claim 23 further comprising a third seating configuration in which the first seat, second seat, third seat, fourth seat, fifth seat, and sixth seat are disposed in the deployed position.

25. The motor vehicle according to claim 24, further comprising a fourth seating configuration in which two seats of the first seat, second seat, third seat, fourth seat, fifth seat, and sixth seat are disposed in the folded deployed position.

26. The motor vehicle according to claim 25, wherein, in the fourth seating configuration, three seats of the first seat, second seat, third seat, fourth seat, fifth seat, and sixth seat are disposed in the stored position.

* * * * *